(12) United States Patent
Wang et al.

(10) Patent No.: US 10,680,508 B2
(45) Date of Patent: Jun. 9, 2020

(54) CONTROL TO OUTPUT DYNAMIC RESPONSE AND EXTEND MODULATION INDEX RANGE WITH HYBRID SELECTIVE HARMONIC CURRENT MITIGATION-PWM AND PHASE-SHIFT PWM FOR FOUR-QUADRANT CASCADED H-BRIDGE CONVERTERS

(71) Applicant: University of Florida Research Foundation, Inc., Gainesville, FL (US)

(72) Inventors: Shuo Wang, Gainesville, FL (US); Hui Zhao, Cambridge (GB); Amirhossein Moeini, Rolla, MO (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 16/270,180

(22) Filed: Feb. 7, 2019

(65) Prior Publication Data
US 2019/0305667 A1    Oct. 3, 2019

Related U.S. Application Data

(63) Continuation-in-part of application No. 15/883,390, filed on Jan. 30, 2018.
(Continued)

(51) Int. Cl.
*H02M 1/12* (2006.01)
*H02M 3/158* (2006.01)

(52) U.S. Cl.
CPC ........... *H02M 1/12* (2013.01); *H02M 3/1584* (2013.01); *H02M 3/1588* (2013.01); *H02M 2003/1586* (2013.01)

(58) Field of Classification Search
CPC ........ Y02B 70/126; H02M 1/08; H02M 1/12; H02M 1/4208; H02M 1/4225; H02M 7/49;
(Continued)

(56) References Cited

U.S. PATENT DOCUMENTS

| | | | |
|---|---|---|---|
| 8,687,388 B2 * | 4/2014 | Jang | H02M 1/4216 363/44 |
| 8,891,261 B2 * | 11/2014 | Jang | H02M 1/4216 363/44 |

(Continued)

OTHER PUBLICATIONS

"IEEE Recommended Pratice and Requirements for Harmonic Control in Electric Power Systems," IEEE Std 519TM-2014, Revision of IEEE Std 519-1992, 29 pages, (2014).
(Continued)

*Primary Examiner* — Yemane Mehari
(74) *Attorney, Agent, or Firm* — Alston & Bird LLP

(57) ABSTRACT

A hybrid Cascaded H-Bridge (CHB) converter includes a selective harmonic current mitigation pulse width modulation (SHCM-PWM) unit coupled to an input current and providing an output signal $SW_{SHCM}$, a phase shift pulse width modulation (PSPWM) unit coupled to the input current and providing an output signal $SW_{PS}$, a modulation selector coupled to the output signal $SW_{SHCM}$ of the SHCM-PWM unit and the output signal $SW_{PS}$ of the PSPWM unit and providing an output signal SW, and a CHB converter coupled to the output signal SW of the modulation selector. The modulation selector can select one of the output signals ($SW_{SHCM}$ and $SW_{PS}$) as the output signal SW based on the input current. The hybrid technique is for cascaded multi-level converters which utilizes asymmetric SHCM to mitigate the harmonics generated from PS-PWM to meet har-
(Continued)

monic limits with a smaller number of switching transitions and smaller inductance than the conventional PS-PWM technique.

18 Claims, 35 Drawing Sheets

Related U.S. Application Data

(60) Provisional application No. 62/454,997, filed on Feb. 6, 2017.

(58) Field of Classification Search
CPC .... H02M 7/219; H02M 7/487; H02M 7/5395; H02M 2001/0077; H02M 2001/123; H02M 3/1584; H02M 2003/1586; H02J 3/01
USPC ..................................................... 363/39, 44
IPC ...................................................... H02M 1/12
See application file for complete search history.

(56) References Cited

U.S. PATENT DOCUMENTS

| | | | | |
|---|---|---|---|---|
| 10,218,285 | B2* | 2/2019 | Mihalache | H02M 5/4585 |
| 10,243,446 | B2* | 3/2019 | Wang | H02M 1/126 |
| 2008/0144342 | A1* | 6/2008 | Du | H02M 7/49 363/71 |
| 2009/0102436 | A1* | 4/2009 | Escobar Valderrama | H02J 3/1857 323/207 |
| 2015/0200602 | A1* | 7/2015 | Narimani | H02M 5/4585 363/37 |
| 2017/0110977 | A1* | 4/2017 | Mihalache | H02M 5/4585 |
| 2018/0226879 | A1* | 8/2018 | Wang | H02M 1/126 |

OTHER PUBLICATIONS

"IEEE recommended practices and requirements for harmonic control in electrical power systems," IEEE Std 519-1992, pp. 1-100, (1993).

Agelidis et al., "A five-level symmetrically defined selective harmonic elimination PWM strategy: analysis and experimental validation," IEEE Transactions on Power Electronics, 23(1):19-26, (2008).

Cai et al., "Phase-Shifted Carrier Pulse Width Modulation Based on Particle Swarm Optimization for Cascaded H-bridge Multilevel Inverters with Unequal DC Voltages," Energies, 8:9670-9687, doi:10. 3390/en8099670, (2015).

Dahidah et al., "A Review of Multilevel Selective Harmonic Elimination PWM: Formulations, Solving Algorithms, Implementation and Applications," IEEE Transactions on Power Electronics, 30(8):4091-4106, (2015).

Franquelo et al., "A flexible selective harmonic mitigation technique to meet grid codes in three-level PWM converters," IEEE Transactions on Industrial Electronics, 54(6):3022-3029, (2007).

He et al., "High-performance indirect current control scheme for railway traction four-quadrant converters," IEEE Transactions on Industrial Electronics, 61(12):6645-6654, (2014).

Moeini et al., "A current-reference-based selective harmonic current mitigation PWM technique to improve the performance of cascaded h-bridge multilevel active rectifiers," IEEE Transactions on Industrial Electronics, 65(1):727-737, (2018).

Moeini et al., "High efficiency, hybrid selective harmonic elimination phase-shift PWM technique for cascaded h-fridge inverters to improve dynamic response and operate in complete normal modulation indices," Applied Power Electronics Conference and Exposition, pp. 2019-2026, (2016).

Moeini et al., "Selective harmonic mitigation-pulse-width modulation technique with variable DC-link voltages in single and three-phase cascaded H-bridge inverters," IET Power Electronics, pp. 1-9, (2014).

Moeini et al., "A Cascaded Hybrid Phase Shift-PWM and Asymmetric Selective Harmonic Mitigation-PWM Modulation Technique for Grid-Tied Converter to Reduce the Switching Frequency and Meet the Grid Current Harmonic Requirement," IEEE Applied Power Electronics Conference and Exposition (APEC), pp. 3486-3493, (2017).

Moeini et al., "Improve Control to Output Dynamic Response and Extend Modulation Index Range With Hybrid Selective Harmonic Current Mitigation-PWM and Phase-Shift PWM for Four-Quadrant Cascaded H-Bridge Converters," IEEE Transactions on Industrial Electronics, 64(9):6854-6863, (2017).

Reyes-Sierra et al., "Multi-objective particle swarm optimizers: a survey of the state-of-the-art," International Journal of Computational Intelligence Research, 2(3):287-308, (2006).

Wang et al., "Investigating the power architectures and circuit topologies for megawatt superfast electric vehicle tharging stations with enhanced grid support functionality," IEEE International Electric Vehicle Conference, pp. 1-8, (2012).

Watson et al., "A complete harmonic elimination approach to DC link voltage balancing for a cascaded multilevel rectifier," IEEE Transactions on Industrial Electronics, 54(6):2940-2953, (2007).

Zhao et al., "A four-quadrant modulation technique for cascaded multilevel inverters to extend solution range for selective harmonic elimination/ compensation," Applied Power Electronics Conference and Exposition, pp. 3603-3610, (2016).

U.S. Appl. No. 15/883,390, Non-Final Office Action dated Mar. 5, 2019.

U.S. Appl. No. 15/883,390, filed Jan. 30, 2018, Pending.

U.S. Patent and Trademark Office, Notice of Allowance for U.S. Appl. No. 15/883,390, dated Nov. 6, 2019, (11 pages), USA.

* cited by examiner

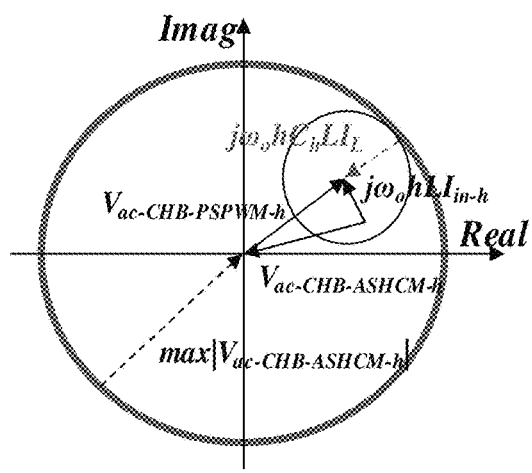
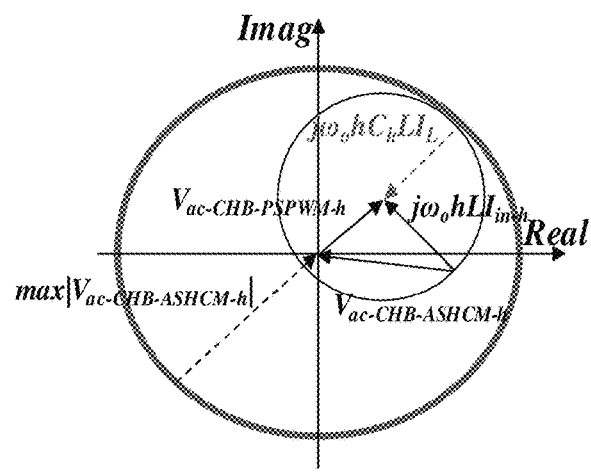
Fig. 21(a)                              Fig. 21(b)

US 10,680,508 B2

CONTROL TO OUTPUT DYNAMIC RESPONSE AND EXTEND MODULATION INDEX RANGE WITH HYBRID SELECTIVE HARMONIC CURRENT MITIGATION-PWM AND PHASE-SHIFT PWM FOR FOUR-QUADRANT CASCADED H-BRIDGE CONVERTERS

CROSS-REFERENCE TO RELATED APPLICATION

This application is a Continuation-in-Part application of U.S. application Ser. No. 15/883,390 filed Jan. 30, 2018, which claims priority to U.S. Application Ser. No. 62/454,997 filed Feb. 6, 2017, all of which are incorporated herein by reference in their entireties, including any figures, tables, and drawings.

GOVERNMENT FUNDING

This invention was made with government support under grant number 1540118 awarded by the National Science Foundation. The government has certain rights in the invention.

BACKGROUND

Multilevel power converters have drawn a lot of attention recently. The modulation technique used in multilevel converters must have high efficiency, reduced passive filter cost, and fast transient response under different dynamic conditions. High efficiency is a critical metric for multilevel converters. Because low switching frequencies lead to low switching power losses, low switching frequency modulation techniques such as selective harmonic elimination-PWM (SHE-PWM), selective harmonic mitigation-PWM (SHM-PWM), and selective harmonic current mitigation-PWM (SHCM-PWM) are promising to increase converter efficiencies. In conventional SHE-PWM or SHM-PWM techniques, only the low order harmonics are eliminated or mitigated to meet voltage harmonic limits. Hence, the conventional SHE-PWM and SHM-PWM techniques cannot ensure that current harmonic limits are met, and these limits are more important than the voltage harmonic limits for the grid tied converters. In addition, the grid voltage harmonics can lead to unmitigated current harmonics for SHE-PWM and SHM-PWM techniques, but this information is not included in the equations of these modulation techniques.

These two problems can be considered by introducing a SHCM-PWM technique that can meet the current harmonic limits of IEEE-519 by including the effects of the grid voltage harmonics in the optimization process. In this technique, the coupling inductance between the converter and the grid can be significantly reduced in comparison to SHE-PWM and SHM-PWM techniques. Moreover, a higher number of current harmonics than SHE-PWM and SHM-PWM techniques can be mitigated with the same number of switching transitions. In He et al., based on the dynamic equations of the grid-tied converters, a high performance dynamic response can be achieved for a four-quadrant grid-tied converter. In addition, an indirect controller is used to change the active and reactive currents four times in each fundamental cycle. The modulation technique used in He et al. is phase-shift PWM (PSPWM), which uses a high switching frequency to control low order harmonics. It is important to note that the SHCM-PWM technique could not be used with the indirect controller technique to obtain high dynamic performance. Because SHCM-PWM is an offline modulation technique and the switching angles are calculated and stored in look-up tables, it needs to use fast Fourier transform (FFT), which results in time delays, to apply switching angles to the converters. In addition, the number of switching transitions is very low in SHCM-PWM, so it results in high ripple currents. As a result, it can cause intrinsic weak dynamic performance. When active or reactive power are controlled with SHCM-PWM in four-quadrant converters, because the switching angles need one fundamental cycle to get updated, a DC offset remains on the injected currents for several cycles under dynamic conditions.

A new selective harmonic mitigation-pulse amplitude modulation (SHM-PAM) was proposed to eliminate the triplet harmonics of the CHB converter by controlling the switching angles and the DC-link voltages of cells of the CHB. Also, low-order non-triplet harmonics of the CHB voltage are controlled to meet the power quality voltage requirements. However, this technique needs to change all DC-link voltages of the CHB converter for different modulation indices which can increase the complexity and the cost of the converter.

Recently, a fault-tolerant asymmetric selective harmonic elimination-PWM (asymmetric SHE-PWM) technique for the CHB inverter was proposed in to generate a balanced AC voltage with the three-phase CHB converter when one of the cells has a fault. A real-time selective harmonic elimination technique is also proposed in to find the solutions of switching angles of the low-frequency modulation technique in real-time. An indirect controller was proposed for having a transient-free dynamic response when the active and reactive current of the grid-tied converter is changed twice in a fundamental period. To reach this goal a high switching frequency modulation technique (PS-PWM) was used to change the AC voltage of a grid-tied converter. So similar to using the PS-PWM technique in the transient period, the active and reactive current is changed twice in a fundamental cycle. This leads to the lower speed of changing the AC current during dynamic conditions. So it is necessary to find a single time instant to change the active and reactive current at the same time. Also, the worst scenario for changing the active and reactive current is not discussed. Moreover, the effect of low-order harmonics on the DC transient offset of the grid-tied converter for both low- and high-switching frequency were not discussed.

BRIEF SUMMARY

Embodiments of the subject invention provide novel and advantageous hybrid Cascaded H-Bridge (CHB) converters that selectively use a selective harmonic current mitigation pulse width modulation (SHCM-PWM) unit and a phase shift pulse width modulation (PSPWM) unit.

In an embodiment, a hybrid CHB converter can include a selective harmonic current mitigation pulse width modulation (SHCM-PWM) unit coupled to an input current and providing an output signal $SW_{SHCM}$, a phase shift pulse width modulation (PSPWM) unit coupled to the input current and providing an output signal $SW_{PS}$, and a CHB converter selectively coupled to the SHCM-PWM and the PSPWM.

In another embodiment, a hybrid CHB converter can include a selective harmonic current mitigation pulse width modulation (SHCM-PWM) unit coupled to an input current and providing an output signal $SW_{SHCM}$, a phase shift pulse width modulation (PSPWM) unit coupled to the input current and providing an output signal $SW_{PS}$, a modulation selector coupled to the output signal $SW_{SHCM}$ of the SHCM-PWM unit and the output signal $SW_{PS}$ of the PSPWM unit and providing an output signal SW, and a CHB converter coupled to the output signal SW of the modulation selector.

In yet another embodiment, a four-quadrant CHB converter can include a selective harmonic current mitigation pulse width modulation (SHCM-PWM) unit receiving an active power and a reactive power from a power grid, a phase shift pulse width modulation (PSPWM) unit receiving the active power and the reactive power from the power grid, and a CHB converter selectively coupled to the SHCM-PWM unit at steady state and the PSPWM unit at transient state.

In another embodiment, the voltage harmonics due to the PS-PWM technique are mitigated with the harmonics generated from the low-frequency asymmetric SHCM-PWM technique. Consequently, the switching frequency is reduced.

In another embodiment, the best and worst scenarios for changing the active and reactive current of the grid-tied converter are derived. Using high-switching frequency modulation techniques such as PS-PWM can achieve a high-dynamic performance due to eliminating the low-order harmonics and simplicity of controlling the fundamental and low-order harmonics of the CHB.

In another embodiment, an asymmetric selective harmonic current mitigation pulse width modulation (ASHCM-PWM) unit coupled to an input current and providing an output signal $SW_{ASHCM}$; a phase shift pulse width modulation (PSPWM) unit coupled to the input current and providing an output signal $SW_{PS}$; a P-cell H-Bridge coupled to the output signal $SW_{ASHCM}$ of the ASHCM-PWM unit; and a N-cell H-Bridge coupled to the output signal $SW_{PS}$ of the PSPWM unit.

BRIEF DESCRIPTION OF DRAWINGS

FIGS. 21(a) and 21(b) show phase diagrams of $h^{th}$ order harmonic, according to an embodiment of the subject invention.

DETAILED DESCRIPTION

Figure 1:
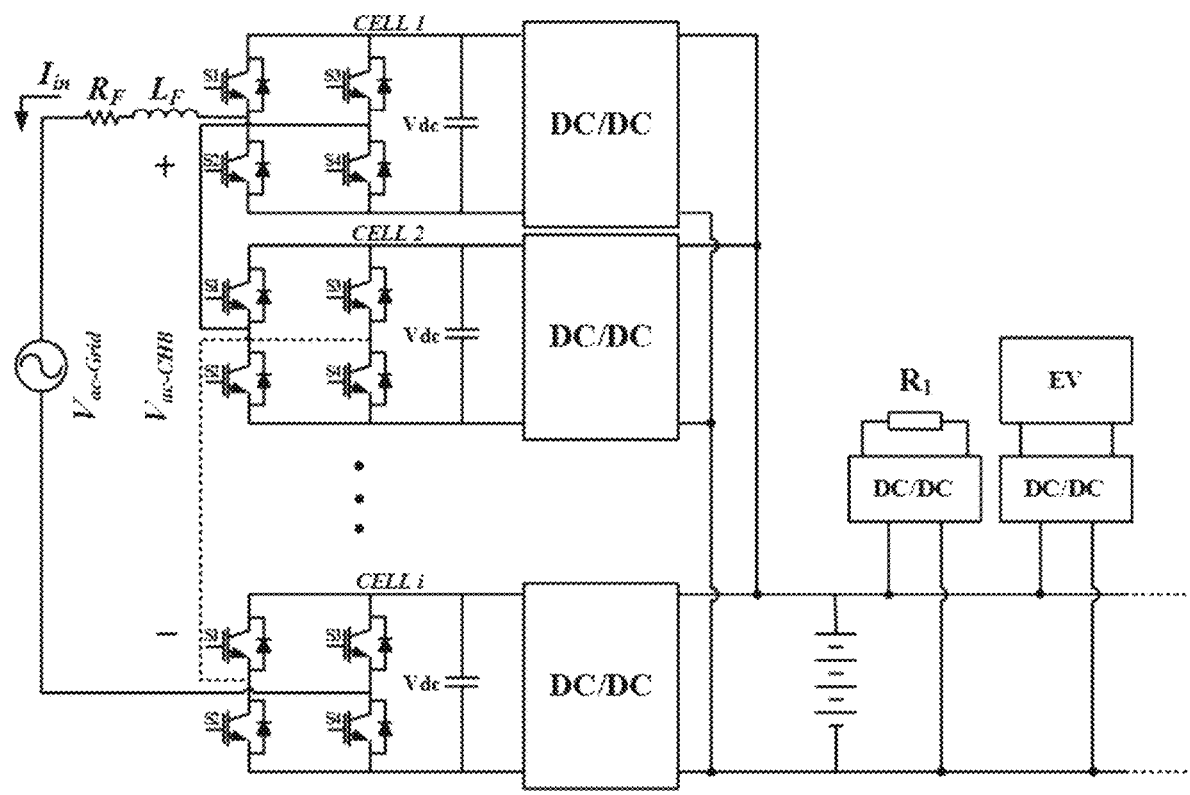
FIG. 1 shows a configuration of a four-quadrant grid-tied Cascaded H-Bridge (CHB) converter.

Embodiments of the subject invention provide novel and advantageous hybrid Cascaded H-Bridge (CHB) converters that selectively use a selective harmonic current mitigation pulse width modulation (SHCM-PWM) unit under steady state and a phase shift pulse width modulation (PSPWM) unit under transient state.

The SHCM-PWM technique can be used in cascaded multilevel converters to extend the harmonic reduction spectrum, reduce the coupling inductance and increase the efficiency. The offline SHCM-PWM technique has a low number of switching transitions, as its switching angles can only change once in a fundamental cycle, and relatively long time delays because it uses fast Fourier transform (FFT). As a result, its dynamic response leaves much to be desired. For the four-quadrant power converters to have good transient dynamic response, both active and reactive power must be controlled at least two times in a fundamental cycle. Thus, embodiments of the subject invention can use a hybrid modulation technique including SHCM-PWM under steady state and PSPWM under transient state. In addition, in order to extend the modulation index range and ensure that SHCM-PWM can process four-quadrant active and reactive power, the constraints of the switching angles for the SHCM-PWM can be modified.

A hybrid modulation technique of an embodiment of the subject invention, which combines a SHCM-PWM technique and a PSPWM technique, is able to achieve high dynamic performance for four-quadrant grid-tied converters. Under steady state condition, the SHCM-PWM technique is applied to achieve high efficiency. Under dynamic condition, the PSPWM technique is employed to update switching transitions several times in each fundamental cycle to achieve high dynamic response performance. Furthermore, a controller is designed to switch between these two modulations. In order to process four-quadrant active and reactive power, the modulation index range of the SHCM-PWM can be greatly extended by modifying the constraints of switching angles. The lowest number of switching transitions for the PSPWM technique is derived so that it does not reduce efficiency and the performance of the indirect controller.

Embodiments of the subject invention can be applied to grid-tied converters. Also, embodiments of the subject invention can be used for renewable energy sources, such as solar panels, to increase the efficiency and improve the dynamic performance. Moreover, embodiments of the subject invention can be used in ultra-fast charging stations of electrical vehicles to inject active and reactive powers to the grid.

In conventional selective harmonic elimination-PWM (SHE-PWM) or SHM-PWM techniques, only the low order harmonics are eliminated or mitigated to meet voltage harmonic limits. The conventional SHE-PWM and SHM-PWM techniques cannot ensure that the current harmonic limits are met, and these limits are more important than the voltage harmonic limits for the grid tied converters. In addition, the grid voltage harmonics can lead to unmitigated current harmonics for SHE-PWM and SHM-PWM techniques, but this information is not included in the equations of these modulation techniques. These two problems can be solved by introducing a SHCM-PWM technique. Hybrid modulation techniques of embodiments of the subject invention are able to achieve high dynamic performance for four-quadrant grid-tied converters by combining a SHCM-PWM technique and a PSPWM technique. Under steady state condition, the SHCM-PWM technique is applied in order to achieve high efficiency, and under dynamic condition, the PSPWM technique is applied to update switching transitions several times in each fundamental cycle to achieve high dynamic response performance. Further, a controller can be provided to switch between these two modulations. In order to process four-quadrant active and reactive power, the modulation index range of SHCM-PWM can be greatly extended by modifying the constraints of switching angles. The lowest number of switching transitions for PSPWM technique is derived so that it does not reduce efficiency and the performance of the indirect controller.

Grid-tied four-quadrant converters need large modulation index range to work with different active and reactive loads [8]. The modulation index range of low frequency modulation techniques depends on optimization constraints applied to the Fourier series equations. To increase modulation index range of low frequency modulation techniques, either an unequal DC link voltage technique or modified switching angle constraints can be used.

However, a hybrid modulation technique of an embodiment of the subject invention, which combines SHCM-PWM and PSPWM, achieves high dynamic performance for four-quadrant grid-tied converters, because the SHCM-PWM technique is applied under steady state to achieve high efficiency and the PSPWM technique is applied under dynamic condition to update switching transitions several times in each fundamental cycle to achieve high dynamic response performance. Further, a controller can be designed to selectively switch between these two modulations.

FIG. 1 shows a configuration of a four-quadrant CHB grid-tied converter. Referring to FIG. 1, the CHB converter is connected to a power grid with coupling inductance $L_F$ and parasitic resistance $R_F$. The CHB converter includes i number of cells. The DC link voltages are equal to $V_{dc}$, and the DC side of each cell is directly connected to the isolated DC/DC converters. The outputs of isolated DC/DC converters are in parallel to charge energy storage on a DC bus. The loads can be connected to the DC bus with bi-directional DC/DC converters in FIG. 1. Because DC link voltages of the CHB converter can be regulated with the isolated DC/DC converters, the DC links of embodiments of the subject invention can be connected to DC sources. The time domain current equation of the CHB converter on AC side is, $$v_{ac-CHB-h(t)} = L_F \frac{di_{in-h}(t)}{dt} + R_F i_{in-h}(t) + v_{ac-Grid-h}(t), \quad (1)$$

Figure 2:
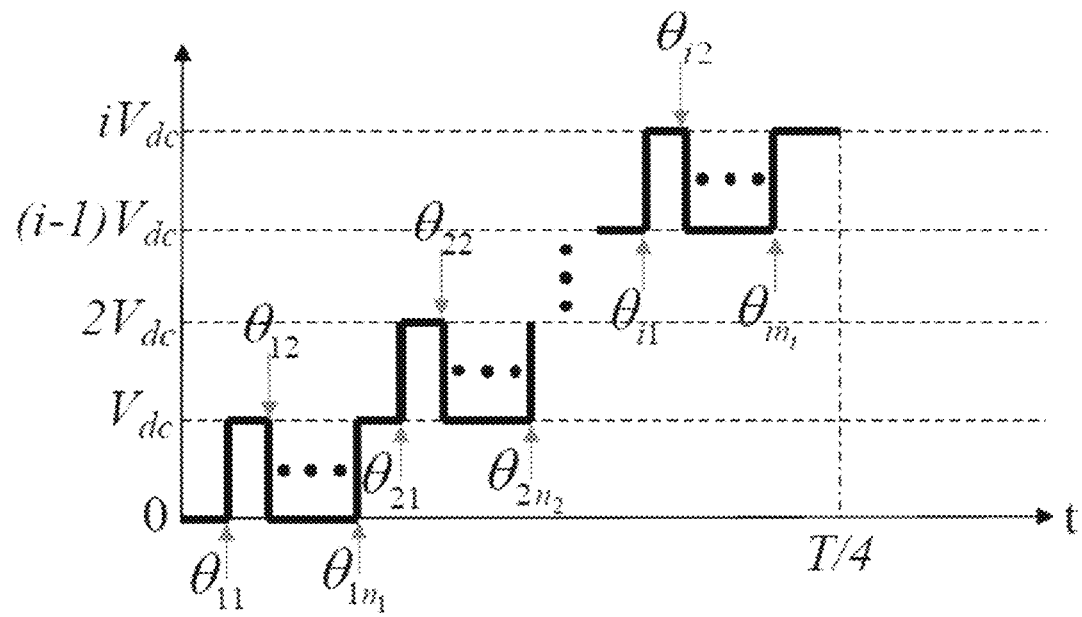
FIG. 2 shows a voltage waveform of an i-cell of a selective harmonic current mitigation pulse width modulation (SHCM-PWM) converter.

In equation (1), $v_{ac-Grid-h}$, $v_{ac-CHB-h}$, and $i_{in-h}$ are the $h^{th}$ harmonic order of the grid voltage, CHB voltage, and injected current, respectively. The relationship of fundamental frequency (60/50 Hz) component $v_{ac-Grid-1}$, $v_{ac-CHB-1}$ and $i_{in-1}$ can be obtained in equation (1). The quarter period waveform of $v_{ac-CHB-h}$ for the i-cell CHB converter in FIG. 1, when $j^{th}$ cell has $n_j$ (j=1, 2 . . . , i) switching angles in each quarter period, is shown in FIG. 2. FIG. 2 shows a voltage waveform of an i-cell of a SHCM-PWM converter. Due to quarter wave symmetry, the Fourier series equations of FIG. 2 can be written as, $$v_{ac-CHB}(t) = \sum_{h=1}^{\infty} \frac{4V_{dc}}{\pi h} b_h \sin(h\omega t), \quad (2)$$

$$b_h = (\cos(h\theta_{11}) - \cos h\theta_{12}) + \ldots + \cos(h\theta_{i(n_i)})),$$

where $\theta_{11}, \theta_{12}, \ldots, \theta_{i(n_i)}$ are the switching angles of the CHB converter in each quarter period as shown in FIG. 2. $4V_{dc}b_h/(\pi h)$ is the magnitude of the $h^{th}$ order harmonic for $v_{ac-CHB}(t)$. When h=1, the modulation index ($M_a = b_1$) of the CHB converter is obtained from equation (2).

The power quality standard that is used to meet both current and voltage harmonics is IEEE 519. The limits of both current and voltage harmonics at the point of common coupling (PCC) are provided in Table I below. In IEEE-519, $I_L$ is the maximum demand load current of the four-quadrant converter. $I_{sc}$ is the short circuit current at the PCC.

TABLE I

CURRENT AND VOLTAGE HARMONIC LIMITS OF IEEE 519 STANDARD ($I_{sc}/I_L \leq 20$) [11] FOR GRID VOLTAGE LESS THAN 69 kV.

| Harmonic order (h) | Current harmonics and total demand distortion TDD | Voltage harmonics and total harmonic distortion THD |
| --- | --- | --- |
| 3 ≤ h < 11 | 4% | 3% |
| 11 ≤ h < 17 | 2% | 3% |
| 17 ≤ h < 23 | 1.5% | 3% |
| 23 ≤ h < 35 | 0.6% | 3% |
| 35 ≤ h | 0.3% | 3% |
| TDD or THD | 5% | 5% |

The key parameters, such as the switching frequency of each switch, the number of harmonics that can be mitigated with the SHCM-PWM, and the coupling inductance between the converter and the grid, can be considered. When the grid voltage harmonics ($|V_{ac-Grid-h}|$) have the highest magnitudes under the worst scenario defined in Table I, the equation set that is used to find the solutions of SHCM-PWM to meet current harmonic limits of IEEE 519 in Table I is shown below, $$\begin{cases} M_a = \cos\theta_{11} - \cos\theta_{12} + \cos\theta_{13} + \ldots + \cos\theta_K, \\ \frac{|v_{ac-Grid-h}| + |v_{ac-CHB-h}|}{|\omega h L_T I_L|} \leq C_h, \; h=3,5,7\ldots \\ \sqrt{\left(\frac{I_{in-3}}{I_L}\right)^2 + \left(\frac{I_{in-5}}{I_L}\right)^2 + \ldots + \left(\frac{I_{in-h}}{I_L}\right)^2} \leq C_{TDD}, \end{cases} \quad (3)$$

where K is the number of switching transitions of the SHCM-PWM during a quarter fundamental period (K=$n_{11}$+$n_{12}$+ . . . $n_{i(ni)}$), and $C_h$ and $C_{TDD}$ are the current harmonics and TDD limits of $i_{in}$ in Table I. By using guidelines in Moeini et al. [6], which is hereby incorporated by reference herein in its entirety, the parameters can be calculated as shown in Table II.

TABLE II

CALCULATED CIRCUIT PARAMETERS OF SHCM-PWM TECHNIQUE

| Parameter | Symbol | Value |
| --- | --- | --- |
| Line frequency | F | 60 Hz |
| AC grid Voltage (RMS) | $V_{ac-Grid}$ | 110 V |
| Total rated power | $S_{total}$ | 1.5 kVA |
| Maximum Demand Load (RMS) | $I_L$ | 14.14 A |
| Number of H-bridge cells | i | 3 |
| Number of switching transitions | K | 9 |
| Highest order of mitigated harmonic in (3) | H | $69^{th}$ |
| DC bus voltage | $V_{dc}$ | 73 V |
| Coupling inductance | $L_F$ | 10 mH (0.485 p.u.) |
| Parasitic resistance of $L_F$ | $R_F$ | 0.6 Ω |

To ensure that the SHCM-PWM modulation technique can properly work in steady state for four-quadrant active and reactive power, the limitations for the maximum and minimum modulation indices can be obtained based on equation (1). In equation (1), the modulation index of CHB voltage is, $$M_a = \left| \frac{\pi}{4V_{dc}} (V_{ac-Grid-1} \angle 0 + (j\omega L_F + R_F) I_{in-1} \angle \theta_{I_{in-1}}) \right| \qquad (4)$$

Figure 3:
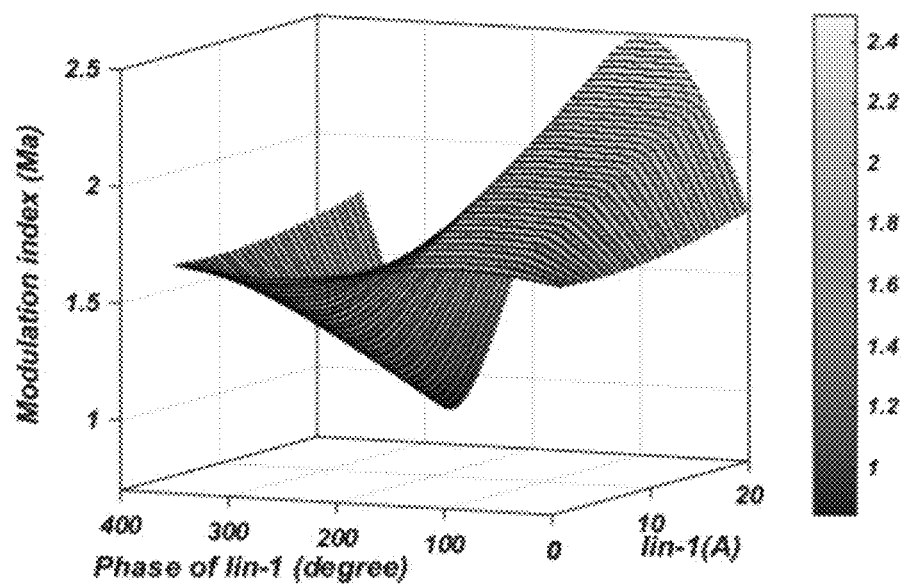
FIG. 3 shows a required modulation index for a four-quadrant CHB converter.

FIG. 3 shows a required modulation index for a four-quadrant CHB converter. In equation (4), if the grid voltage is taken as the reference, by changing the magnitude and phase of $i_{in-1}$ ($0<I_{in-1}<I_L$, $0 \le \theta_{I_{in-1}} <2\pi$), the required modulation indices are derived as FIG. 3, for the circuit parameters in Table II. Referring to FIG. 3, the CHB converter can process four-quadrant active and reactive power at steady state when modulation index changes from 0.85 to 2.485.

The conventional constraints of the switching angles used to solve switching angles for the equation set in equation (3) are, $$0 < \theta_{11} < \theta_{12} < \ldots < \theta_{in_i} < \frac{\pi}{2} \qquad (5)$$

The constraints in equation (5) undesirably restrict the optimization techniques used to solve equation (3). The switching angle solution range of SHCM-PWM technique can be significantly improved by modifying the constraints to, $$0 < \theta_{11} < \frac{\pi}{2}, 0 < \theta_{12} < \frac{\pi}{2}, \ldots, 0 < \theta_{in_i} < \frac{\pi}{2} \qquad (6)$$

Figure 4:
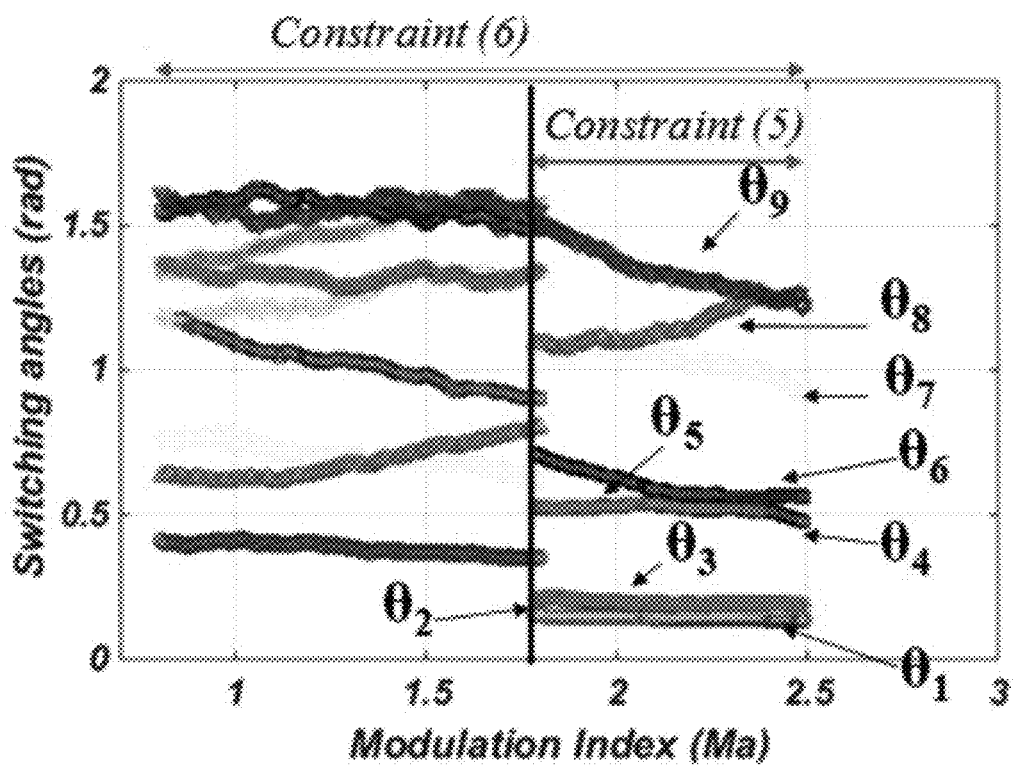
FIG. 4 shows a graph of switching angle solution vs. modulation index with SHCM-PWM technique.

The multi-objective particle swarm optimization (MOPSO) technique, as in Reyes-Sierra et al. [12] (which is hereby incorporated by reference herein in its entirety), can be used to solve equation (3). The modulation index ranges of using the switching angle constraints in equations (5) and (6) for equation (3) are compared in FIG. 4. FIG. 4 shows a graph of switching angle solution vs. modulation index with a SHCM-PWM technique. Referring to FIG. 4, the switching angle solution with conventional constraints in equation (5) limits the modulation index to [1.78, 2.495]. The modulation index is greatly extended to [0.8, 2.495] with the modified switching angle constraints in equation (6); it covers all of the required modulation indices in FIG. 3.

By changing the modulation index, the magnitude of $v_{ac-CHB-1}$ in equation (2) can be controlled. However, in order to track desired active and reactive power for four-quadrant operations, the phase of CHB voltage should also be controlled. Because of this, if the phase of the CHB voltage is $\theta$ and $0<\theta<2\pi$, (2) can be rewritten as, $$v_{ac-CHB}(t) = \sum_{h=1}^{\infty} \frac{4V_{dc}}{\pi h} b_h \sin(h\omega t + h\theta) \qquad (7)$$

or, $$v_{ac-CHB}(t) = \sum_{h=1}^{\infty} \frac{4V_{dc}}{\pi h} b_h (\cos(h\theta)\sin(h\omega t) + \sin(h\theta)\cos(h\omega t)) \qquad (8)$$

Because when the phases of both $I_{in-1}$ and $V_{ac-CHB}$ change from 0 to $2\pi$, there are switching angle solutions, the CHB can handle four-quadrant active and reactive power.

Figure 5:
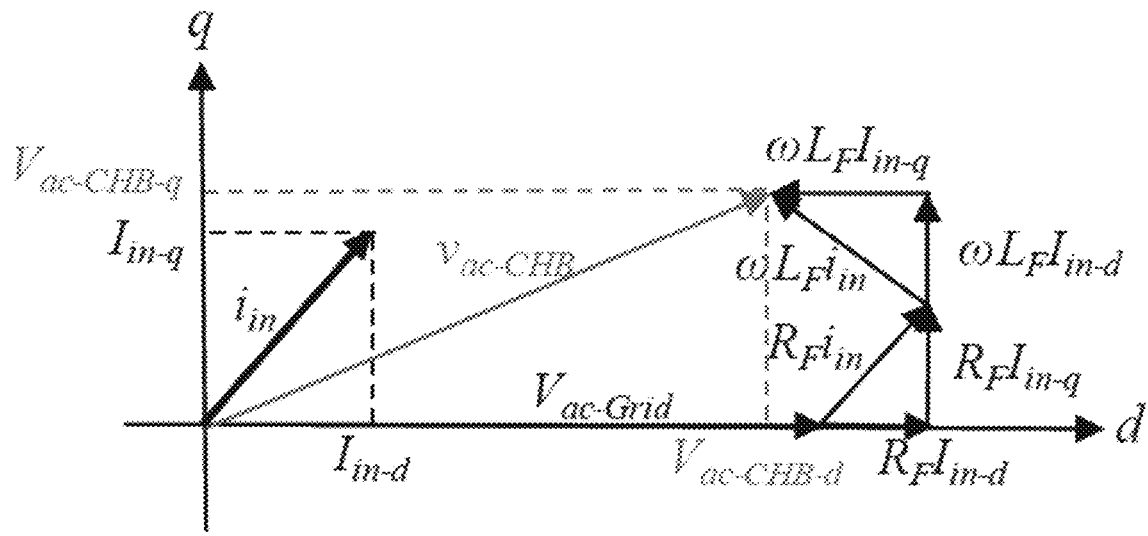
FIG. 5 shows a phase diagram of a grid-tied converter.

FIG. 5 shows a phase diagram of a grid-tied converter. The dq phasor diagram of equation (1) for the fundamental frequency is shown in FIG. 5.

The dq frame rotates counterclockwise with speed □. The injected current $i_{in}(t)$ is composed of dq components as, $$i_{in}(t) = I_{in-d} \sin(\omega t) + I_{in-q} \cos(\omega t) \qquad (9)$$

From FIG. 5, the CHB voltage is, $$v_{ac-CHB}(t) = V_{ac-CHB-d} \sin(\omega t) + V_{ac-CHB-q} \cos(\omega t),$$

$$V_{ac-CHB-d} = -L_F \omega I_{in-q} + R_F I_{in-d} + V_{ac-Grid},$$

$$V_{ac-CHB-q} = L_F \omega I_{in-d} + R_F I_{in-q}, \qquad (10)$$

In order to have the desired current in FIG. 5, the CHB voltage can be controlled with $b_1$ and $\theta$ in equation (8) by using the following equations, $$V_{ac-CHB-d} = \frac{4V_{dc}b_1}{\pi} \cos(\theta), \qquad (11)$$

$$V_{ac-CHB-q} = \frac{4V_{dc}b_1}{\pi} \sin(\theta).$$

In the time domain, if the changes of dq current references cause $v_{ac-CHB}(t)$ to change by $\Delta_{v_{ac-CHB}}(t)$ from $v_{ac\_CHB1}(t)$ to $v_{ac\_CHB2}(t)$, and $i_{in}(t)$ to change by $\Delta i_{in}(t)$ from $i_{in1}(t)$ to $i_{in2}(t)$, the following equations hold, $$i_{in2}(t) = i_{in1}(t) + \Delta i_{in}(t),$$

$$v_{ac-CHB2}(t) = v_{ac-CHB1}(t) + \Delta v_{ac-CHB}(t), \qquad (12)$$

It is assumed that the grid voltage does not change under the transient condition so $\Delta_{v_{ac-Grid}} = 0$. Based on FIG. 5, $\Delta i_{in}$ and $\Delta_{v_{ac-CHB}}$ can be derived as, $$\Delta V_{ac-CHB-d} = -L_F \omega \Delta I_{in-q} + R_F \Delta I_{in-d},$$

$$\Delta V_{ac-CHB-q} = L_F \omega \Delta I_{in-d} + R_F \Delta I_{in-q},$$

$$\Delta v_{ac-CHB}(t) = \Delta V_{ac-CHB-d} \sin(\omega t) + \Delta V_{ac-CHB-q} \cos(\omega t)$$

$$\Delta i_{in}(t) = \Delta I_{in-d} \sin(\omega t) + \Delta I_{in-q} \cos(\omega t) \qquad (13)$$

The differential equation under transient duration is, $$\Delta v_{ac-CHB}(t) = L_F \frac{d\Delta i_{in}(t)}{dt} + R_F \Delta i_{in}(t) \qquad (14)$$

If the current changes at $t=t0$, from equations (13) and (14), the $\Delta i_{in}$ can be solved as, $$\Delta i_{in}(t) = ce^{\frac{-R_F}{L_F}t} + (\Delta I_{in-d} \sin(\omega t) + \Delta I_{in-q} \cos(\omega t)) \qquad (15)$$

where c depends on both $\Delta v_{ac-CHB}$ and the initial condition of $\Delta i_{in}$. If the control signal of $\Delta I_{in-d}$ and $\Delta I_{in-q}$ change at $t=t_0$ and $\Delta i_{in}(t0-)=0$, c can be derived as, $$c = -e^{\frac{R_F}{L_F}t_0} (\Delta I_{in-d} \sin(\omega t_0) + \Delta I_{in-q} \cos(\omega t_0)) \qquad (16)$$

The second term in equation (15) is the steady state term of $\Delta i_{in}$. The first term in equation (15) is an undesirable transient current. In order to remove undesirable transient current, in equation (16), c should be always equal to zero. Because of this, $\Delta I_{in-d}$ or $\Delta I_{in-q}$ should only change when $\sin(\omega t_0)$ or $\cos(\omega t_0)$ are equal to zero. This indicates if dq currents in equation (16) change under the following conditions, $i_{in}$ will have no transient currents.

$$\begin{cases} \omega t_0 = k\pi, & \Delta I_{in-d} \text{ should change} \\ \omega t_0 = k\pi + \dfrac{\pi}{2}, & \Delta I_{in-q} \text{ should change} \end{cases} \quad (17)$$

To have the fast transient response in practice, the active power, which is determined by $\Delta I_{in-d}$, and reactive power, which is determined by $\Delta I_{in-q}$, must change at times defined in equation (17). Therefore, the currents can have 2 to 4 changes within one cycle. At the same time, the existing technique uses only the PSPWM technique to improve the transient condition. However, the mitigation of low order current harmonics using the PSPWM technique needs more switching transitions than low frequency modulation techniques such as SHE-PWM. As a result, the PSPWM technique has a high switching power loss. Hybrid SHCM-PWM and PSPWM techniques of embodiments of the subject invention solve these issues. In embodiments of the subject invention, the SHCM-PWM technique is employed under the steady state condition and the PSPWM technique is employed under the transient condition.

Figure 6:
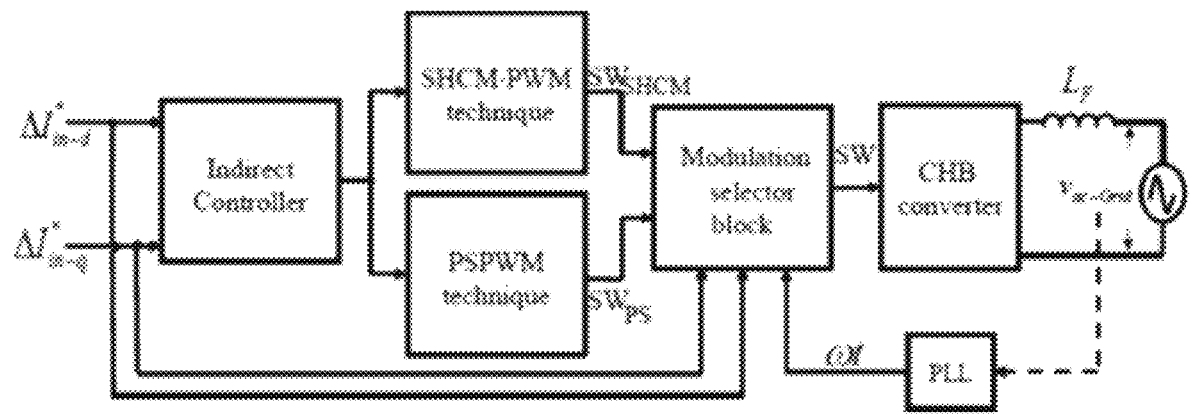
FIG. 6 shows a hybrid CHB converter according to an embodiment of the subject invention.

FIG. 6 shows a hybrid CHB converter according to an embodiment of the subject invention. The block diagram in FIG. 6 shows the hybrid SHCM-PWM and PSPWM technique. In this embodiment, when current references $\Delta I^*_{in-d}$ and $\Delta I^*_{in-q}$ change, the following conditions must be used by the modulation selector to select the modulation technique for the CHB converter, If $|\Delta I^*_{in-d}|>0$ & $\omega t=k\pi$, use PSPWM ($SW_{PS}$) until $\omega t=(k+2)\pi$ If $|\Delta I^*_{in-q}|>0$ & $\omega t=k\pi+\pi/2$, use PSPWM ($SW_{PS}$) until $\omega t=(k+2)\pi$ Otherwise, use SHCM-PWM.

Figure 7:
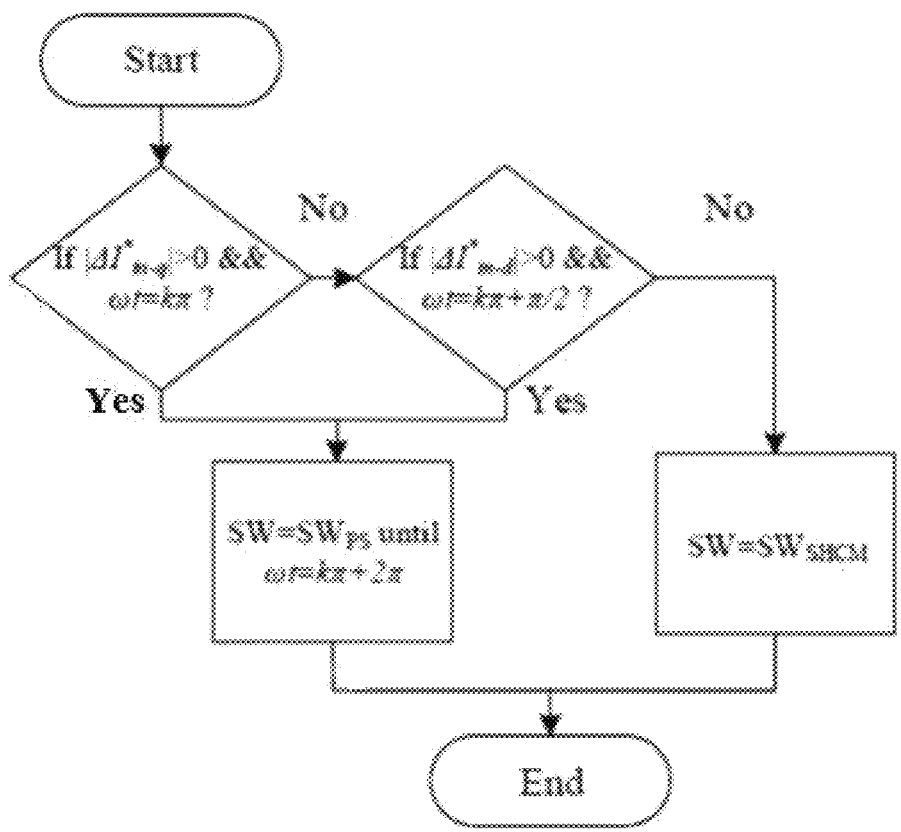
FIG. 7 shows a flowchart of a modulation selector block according to an embodiment of the subject invention.
Figure 8:
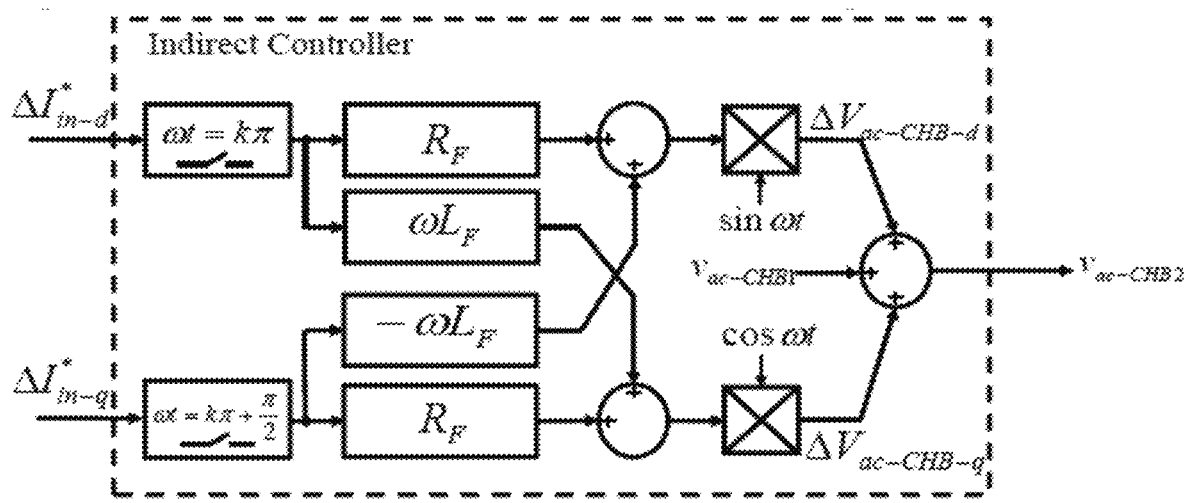
FIG. 8 shows an indirect controller generating $v_{ac\text{-}CHB}$.

FIG. 7 shows a flowchart of a modulation selector block according to an embodiment of the subject invention, and FIG. 8 shows an indirect controller generating $v_{ac\text{-}CHB}$. The flowchart for the modulation selector block in FIG. 6 is shown in FIG. 7. The block diagram of the indirect controller based on equations (12), (13), and (17) is shown in FIG. 8. The output of the indirect controller in FIG. 8 is $v_{ac\text{-}CHB2}$. Because the PSPWM technique does not use FFT to change $v_{ac\text{-}CHB}$, it is possible to change $v_{ac\text{-}CHB}$ several times in a fundamental period. On the other hand, the SHCM-PWM technique needs to use the FFT block to obtain the modulation index $M_a$, which is needed for checking look up tables and changing the output voltage of the CHB converter. Because the FFT block has time delays, the SHCM-PWM technique needs at least one cycle to change $v_{ac\text{-}CHB}$. However, equation (17) requires changing the $v_{ac\text{-}CHB}$ at least twice in a fundamental period so both active and reactive power can be controlled for a four-quadrant grid-tied converter. Therefore, the PSPWM technique is an appropriate technique for dynamic response improvement.

Figure 9:
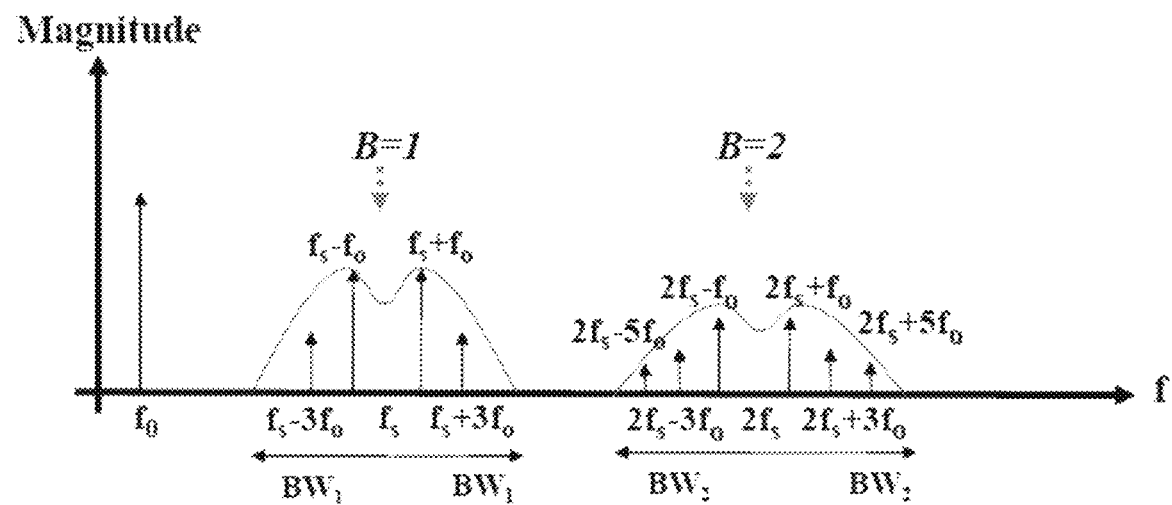
FIG. 9 shows a harmonic spectrum of the $v_{ac\text{-}CHB}$ with a phase shift pulse width modulation (PSPWM) technique.

The switching frequency of the PSPWM technique must be designed to have both good dynamic response and low switching power loss. To reduce the switching power loss, the switching frequency of PSPWM must be chosen as low as possible when the dynamic response is greatly improved. However, reducing the switching frequency of PSPWM may lead to undesirably-high low-order voltage harmonics, which includes the fundamental $v_{ac\text{-}CHB\text{-}1}$. Because of this, the lowest PSPWM switching frequency, which does not affect $v_{ac\text{-}CHB\text{-}1}$, can be explored. The output voltage of an i-cell CHB converter with the PSPWM technique can be written as, $$v_{ac-CHB-PSPWM}(t) = iV_{dc}M\cos(\omega_0 t + \theta_0) + \quad (18)$$
$$\dfrac{4V_{dc}}{\pi}\sum_{B=1}^{\infty}\sum_{A=-\infty}^{\infty}\left(\dfrac{1}{2B}J_{2A-1}(iB\pi M)\right)\times$$
$$\sin\left((2iB+2A-1)\dfrac{\pi}{2}\right)\cos(2iB\omega_c t + (2A-1)(\omega_0 t + \theta_0))\Big)$$

where, $\omega_0=2\pi f_0$, $f_0$ and $\theta_0$ are the fundamental frequency and phase of CHB voltage. M is the modulation index of each cell of CHB. The total modulation index $M_a$ of the CHB converter is iM. $\omega_c=2\pi f_c$ and $f_c$ is the average carrier frequency of each cell. B is the baseband, and A is the sideband harmonics of each baseband harmonic as shown in FIG. 9. FIG. 9 shows the harmonic spectrum of the $v_{ac\text{-}CHB}$ with PSPWM technique. J is the Bessel function of first kind. The bandwidth of $B^{th}$ baseband harmonic in FIG. 9 can be obtained with the following equation, $$BW_B \approx 2(iMB\pi+2)f_0 \quad (19)$$

In equation (18), the switching frequency fs of the $v_{ac\text{-}CHB}$ with PSPWM is equal to $2if_c$. In order not to generate sideband harmonics overlapping and influencing $v_{ac\text{-}CHB\text{-}1}$, the carrier frequency of the CHB converter for the first baseband (B=1) can be derived based on following equation, $$f_z-BW_1>f_0 \Rightarrow f_s>f_0+BW_1 \Rightarrow f_s>(2iMB\pi+5)f_0 \quad (20)$$

Based on equation (20), when i=3, M=1 (the maximum modulation index for each cell) and in the worst scenario, the lowest $f_s$ and $f_c$ are therefore 1440 Hz and 240 Hz respectively.

The subject invention includes, but is not limited to, the following exemplified embodiments.

Embodiment 1

A hybrid Cascaded H-Bridge (CHB) converter, comprising:
a selective harmonic current mitigation pulse width modulation (SHCM-PWM) unit coupled to an input current and providing an output signal $SW_{SHCM}$;
a phase shift pulse width modulation (PSPWM) unit coupled to the input current and providing an output signal $SW_{PS}$; and
a CHB converter selectively coupled to the SHCM-PWM unit and the PSPWM unit.

Embodiment 2

The hybrid CHB converter according to embodiment 1, wherein the CHB converter is coupled to the SHCM-PWM unit under steady state condition and the CHB converter is coupled to the PSPWM unit under dynamic condition.

Embodiment 3

The hybrid CHB converter according to embodiment 2, wherein the CHB converter is coupled to the PSPWM unit under transient condition.

Embodiment 4

The hybrid CHB converter according to any of embodiments 2-3, wherein the input current includes an active current reference $\Delta I^*_{in-d}$ and a reactive current reference $\Delta I^*_{in-q}$, and the CHB converter is selectively coupled to the SHCM-PWM unit and the PSPWM unit based on the active current reference $\Delta I^*_{in-d}$ and the reactive current reference $\Delta I^*_{in-q}$.

Embodiment 5

The hybrid CHB converter according to embodiment 4, wherein the CHB converter is selectively coupled to the PSPWM unit in case the input current satisfies the following Formula 1:

$$|\Delta I^*_{in-d}|>0 \;\&\; \omega t=k\pi, \text{ until } \omega t=(k+2)\pi. \quad \text{Formula 1}$$

Embodiment 6

The hybrid CHB converter according to embodiment 5, wherein the CHB converter is selectively coupled to the PSPWM unit in case the input current satisfies the following Formula 2:

$$|\Delta I^*_{in-q}|>0 \;\&\; \omega t=k\pi+\pi/2, \text{ until } \omega t=(k+2)\pi. \quad \text{Formula 2}$$

Embodiment 7

The hybrid CHB converter according to embodiment 6, wherein the CHB converter is selectively coupled to the SHCM-PWM unit in all cases where the input current does not satisfy either of Formula 1 and Formula 2.

Embodiment 8

The hybrid CHB converter according to any of embodiments 2-7, further comprising an indirect controller coupled to the input current and providing an output current $v_{ac-CHB2}$ to the SHCM-PWM unit and the PSPWM unit.

Embodiment 9

A hybrid Cascaded H-Bridge (CHB) converter, comprising:
a selective harmonic current mitigation pulse width modulation (SHCM-PWM) unit coupled to an input current and providing an output signal $SW_{SHCM}$;
a phase shift pulse width modulation (PSPWM) unit coupled to the input current and providing an output signal $SW_{PS}$;
a modulation selector coupled to the output signal $SW_{SHCM}$ of the SHCM-PWM unit and the output signal $SW_{PS}$ of the PSPWM unit and providing an output signal SW; and
a CHB converter coupled to the output signal SW of the modulation selector.

Embodiment 10

The hybrid CHB converter according to embodiment 9, wherein the modulation selector is connected to the input current.

Embodiment 11

The hybrid CHB converter according to embodiment 10, wherein the modulation selector selects one of the output signal $SW_{SHCM}$ and the output signal $SW_{PS}$ as the output signal SW based on the input current.

Embodiment 12

The hybrid CHB converter according to embodiment 11, further comprising an indirect controller coupled to the input current and providing an output current $v_{ac-CHB2}$ to the SHCM-PWM unit and the PSPWM unit.

Embodiment 13

The hybrid CHB converter according to embodiment 12, wherein the input current includes an active current reference $\Delta I^*_{in-d}$ and a reactive current reference $\Delta I^*_{in-q}$, and the modulation selector selects one of the output signal $SW_{SHCM}$ and the output signal $SW_{PS}$ based on the active current reference $\Delta I^*_{in-d}$ and the reactive current reference $\Delta I^*_{in-q}$.

Embodiment 14

The hybrid CHB converter according to embodiment 13, wherein the modulation selector selects the output signal $SW_{PS}$ in case the input current satisfies the following Formulas 3 and 4:

$$|\Delta I^*_{in-d}|>0 \;\&\; \omega t=k\pi, \text{ until } \omega t=(k+2)\pi, \quad \text{Formula 3}$$

$$|\Delta I^*_{in-q}|>0 \;\&\; \omega t=k\pi+\pi/2, \text{ until } \omega t=(k+2)\pi. \quad \text{Formula 4}$$

Embodiment 15

The hybrid CHB converter according to embodiment 14, the modulation selector selects the output signal $SW_{SHCM}$ in all cases where the input current does not satisfy both Formula 3 and Formula 4.

Embodiment 16

The hybrid CHB converter according to any of embodiments 12-15, further comprising a phase lock loop (PLL) coupled to the modulation selector and an output of the CHB converter.

Embodiment 17

The hybrid CHB converter according to any of embodiments 9-16, wherein switch angles of the CHB converter are modified such that each of the switch angles has a range of 0 to $\pi/2$ (alternatively, or in addition, each of the switch angles is in a range of 0 to $\pi/2$).

Embodiment 18

The hybrid CHB converter according to embodiment 17, wherein the switch angles of the CHB are calculated and stored in a look up table.

Embodiment 19

The hybrid CHB converter according to embodiment 18, wherein the SHCM-PWM unit uses a FFT block.

Embodiment 20

The hybrid CHB converter according to embodiment 19, wherein the SHCM-PWM unit obtains a modulation index for checking the look up table.

Embodiment 21

A four-quadrant Cascaded H-Bridge (CHB) converter, comprising:
a selective harmonic current mitigation pulse width modulation (SHCM-PWM) unit receiving an active power and a reactive power from a power grid;
a phase shift pulse width modulation (PSPWM) unit receiving the active power and the reactive power from the power grid; and
a CHB converter selectively coupled to the SHCM-PWM unit at steady state and the PSPWM unit at transient state.

Embodiment 22

The four-quadrant CHB converter according to embodiment 21, wherein the active power and the reactive power are changed separately within one cycle.

Embodiment 23

The four-quadrant CHB converter according to any of embodiments 21-22, wherein a switching frequency of the PSPWM unit is 240 Hertz (Hz).

Embodiment 24

The four-quadrant CHB converter according to any of embodiments 21-23, wherein a modulation index with the SHCM-PWM unit is in a range of 0.8 to 2.495.

Embodiment 25

A grid-tied converter, comprising:
a selective harmonic current mitigation pulse width modulation (SHCM-PWM) unit coupled to an input current and providing an output signal $SW_{SHCM}$;
a phase shift pulse width modulation (PSPWM) unit coupled to the input current and providing an output signal $SW_{PS}$;
a modulation selector coupled to the output signal $SW_{SHCM}$ of the SHCM-PWM unit and the output signal $SW_{PS}$ of the PSPWM unit and providing an output signal SW; and
a H bridge converter coupled to the output signal SW of the modulation selector.

Embodiment 26

The grid-tied converter according to embodiment 25, wherein the modulation selector is connected to the input current.

Embodiment 27

The grid-tied converter according to any of embodiments 25-26, wherein the modulation selector selects one of the output signal $SW_{SHCM}$ and the output signal $SW_{PS}$ as the output signal SW based on the input current.

Embodiment 28

The grid-tied converter according to any of embodiments 25-27, further comprising an indirect controller coupled to the input current and providing an output current $v_{ac-CHB2}$ to the SHCM-PWM unit and the PSPWM unit.

Embodiment 29

The grid-tied converter according to any of embodiments 25-28, further comprising a phase lock loop (PLL) coupled to the modulation selector and an output of the grid-tied converter.

Embodiment 30

The grid-tied converter according to any of embodiments 25-29, further comprising an inductor connected to the H bridge converter.

Embodiment 31

A motor, comprising:
a selective harmonic current mitigation pulse width modulation (SHCM-PWM) unit coupled to an input current and providing an output signal $SW_{SHCM}$;
a phase shift pulse width modulation (PSPWM) unit coupled to the input current and providing an output signal $SW_{PS}$;
a modulation selector coupled to the output signal $SW_{SHCM}$ of the SHCM-PWM unit and the output signal $SW_{PS}$ of the PSPWM unit and providing an output signal SW;
a H bridge converter coupled to the output signal SW of the modulation selector; and
a motor connected to the H bridge converter.

Embodiment 32

The motor according to embodiment 31, wherein the motor is a single phase asynchronous motor or a three phase asynchronous motor.

Embodiment 33

A filter, comprising:
a selective harmonic current mitigation pulse width modulation (SHCM-PWM) unit coupled to an input current and providing an output signal $SW_{SHCM}$;
a phase shift pulse width modulation (PSPWM) unit coupled to the input current and providing an output signal $SW_{PS}$;
a modulation selector coupled to the output signal $SW_{SHCM}$ of the SHCM-PWM unit and the output signal $SW_{PS}$ of the PSPWM unit and providing an output signal SW;
a H bridge converter coupled to the output signal SW of the modulation selector; and
a passive filter connected to the H bridge converter.

Embodiment 34

The filter according to embodiment 33, wherein the passive filter includes at least one of an L filter, an LC filter, and an LCL filter.

A greater understanding of the present invention and of its many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

EXAMPLE 1

For performance evaluation of the hybrid SHCM-PWM and PSPWM technique, MATLAB Simulink was used for the simulations. The circuit parameters, which were used in both simulation and experimental results, are shown in Table II. The DC voltage of battery for each cell in the simulation and experimental results was 65V. The obtained solutions in FIG. 4 can still be used for $V_{dc}=65$ V because low DC link voltages result in low voltage harmonics in equations (2) and (3).

The purposes of the simulations and experiments were to: (a) validate whether $i_{in}$ can meet the IEEE 519 current harmonic limits with the extended solution range in equation (6); (b) validate whether the hybrid SHCM-PWM and PSPWM technique based on FIG. 6 can achieve high dynamic response and the transient current can be significantly reduced; and (c) validate whether the CHB converter can process four-quadrant active and reactive power. The active and reactive powers can be either injected to or absorbed from the power grid.

Figure 10A:
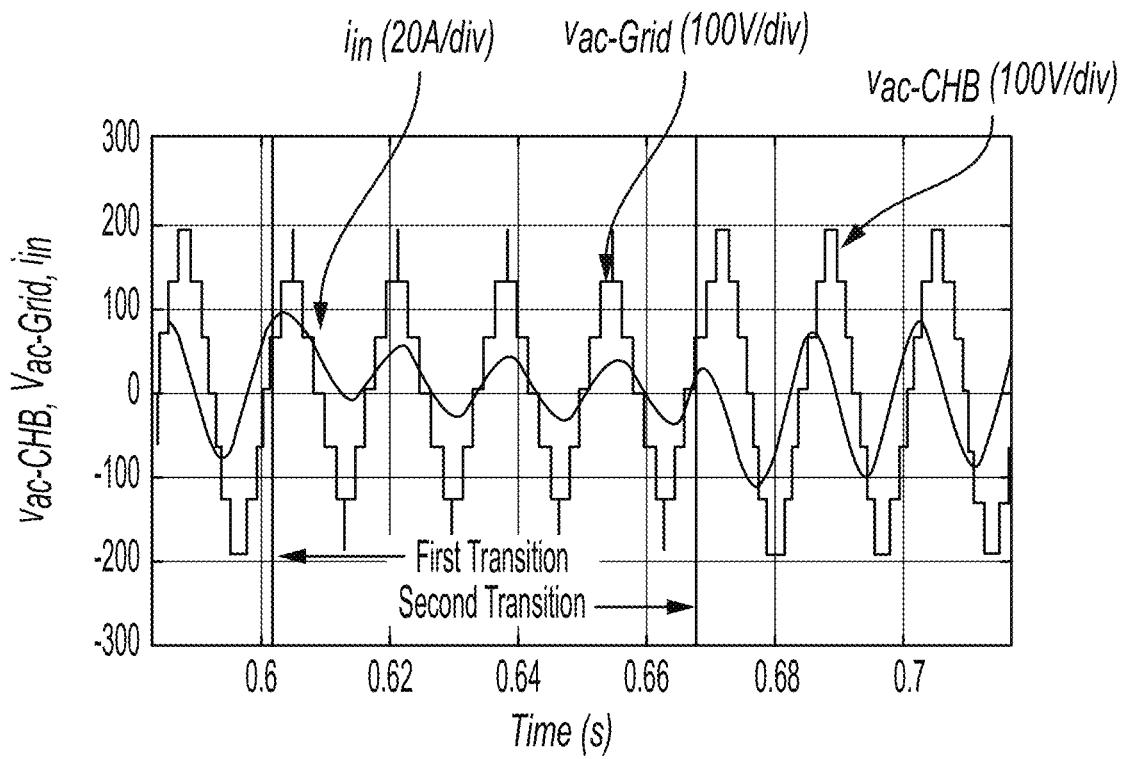
FIG. 10(a) shows a first simulation result of $V_{ac\text{-}CHB}$, $V_{ac\text{-}Grid}$, and $I_{in}$ for a conventional four-quadrant converter.
Figure 10B:
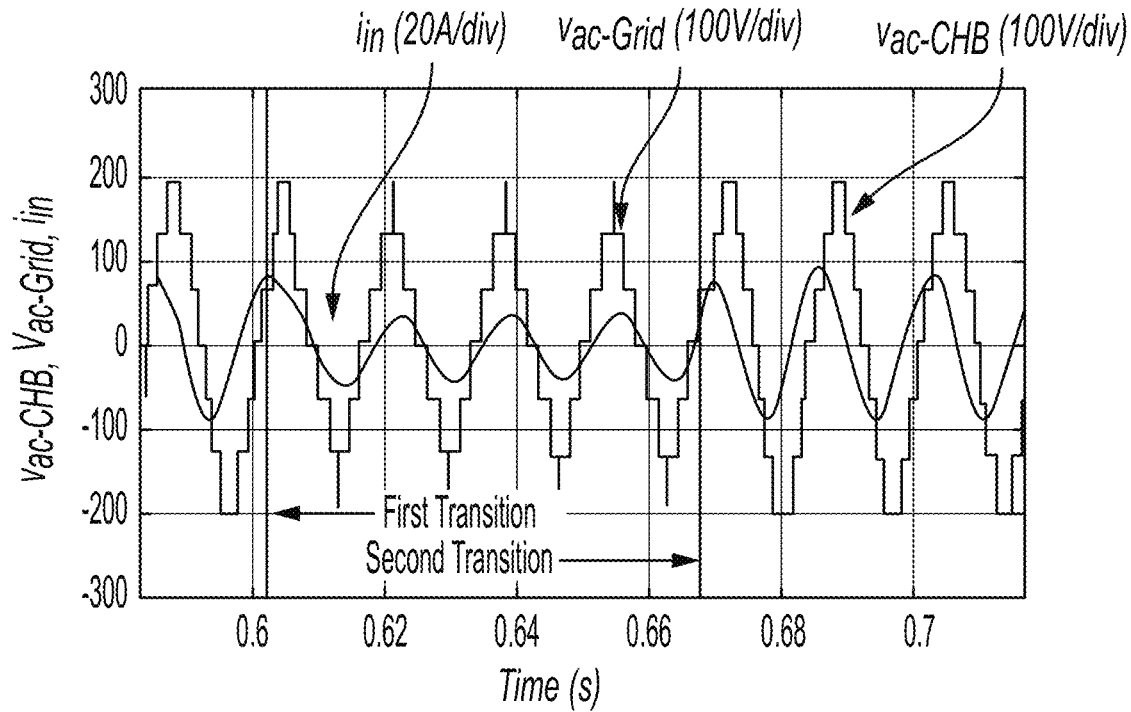
FIG. 10(b) shows a first simulation result of $V_{ac\text{-}CHB}$, $V_{ac\text{-}Grid}$, and $I_{in}$ for a four-quadrant converter according to an embodiment of the subject invention.
Figure 10C:
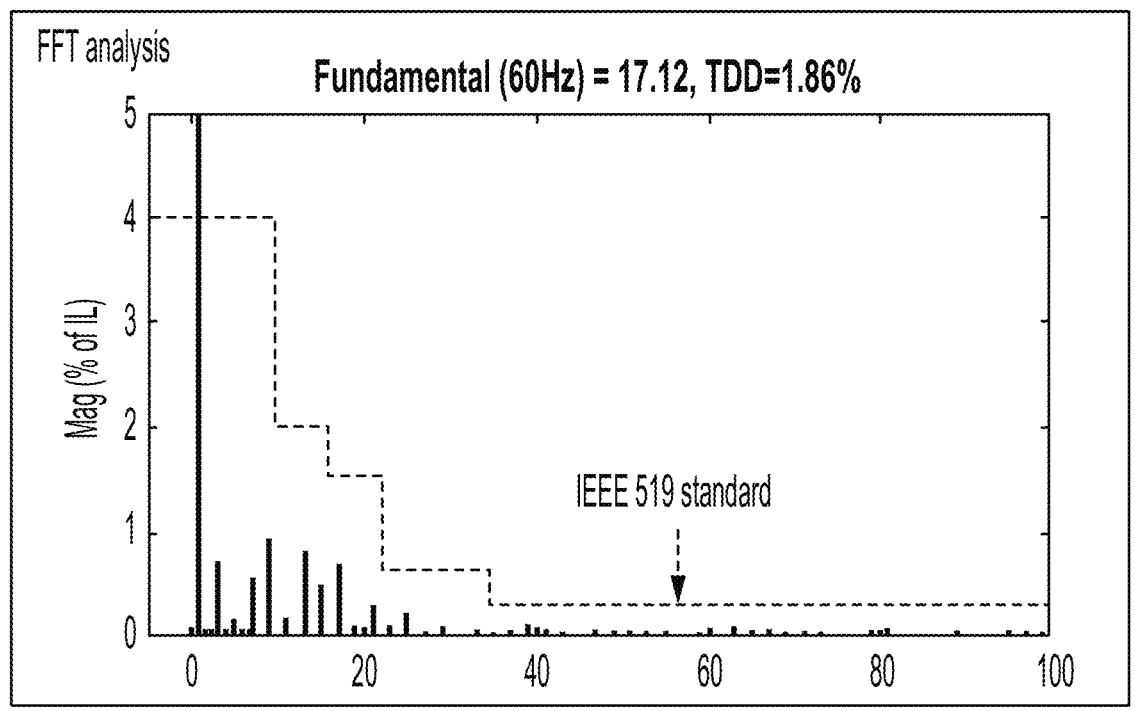
FIG. 10(c) shows a first simulation result of harmonic spectrum at 1000 W−1000VAR for a four-quadrant converter according to an embodiment of the subject invention.
Figure 10D:
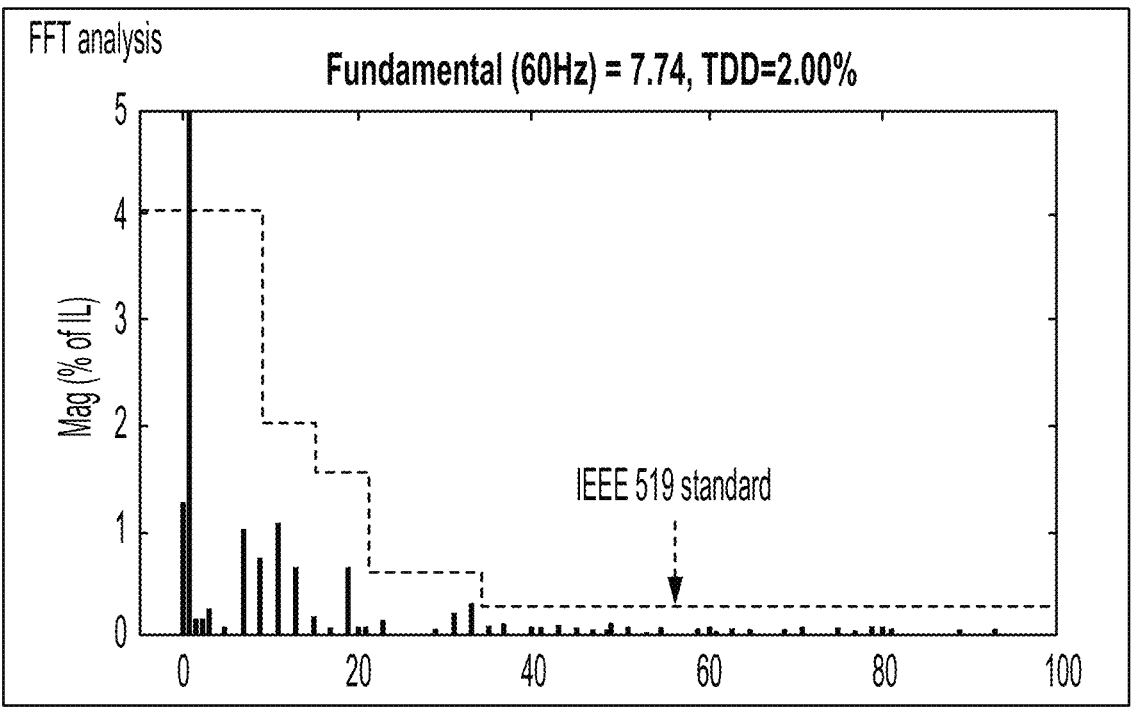
FIG. 10(d) shows a first simulation result of harmonic spectrum at 200 W+250VAR for a four-quadrant converter according to an embodiment of the subject invention.

FIGS. 10(a)-10(d) show first simulation results for a conventional four-quadrant converter and a four-quadrant converter according to an embodiment of the subject invention. In the first comparative simulations, the active and reactive power flowing from power grid to the converter changed from 1000 W−1000VAR to 200 W+250VAR at t=0.60231 seconds (s) and then changed back to 1000 W−1000VAR at t=0.6667 s. In the first simulation in FIG. 10(a) for a conventional SHCM-PWM technique, during the transient condition, when the active and reactive powers are changed, more than two fundamental cycles are required to reach steady state. The DC offset of the current $i_{in}$ lasts for more than two cycles. The maximum DC offset shown in Table III is 43%-78%. This DC offset can lead to instability. The waveforms in FIG. 10(b) are for a hybrid technique of an embodiment of the subject invention. During the transient condition, the active power and reactive power are changed separately within one cycle with the conditions defined in equation (17). Referring to FIG. 10(b), $i_{in}$ reaches the steady state within less than one cycle. The maximum 1.75%-8.5% DC offset is negligible as shown in Table III. The carrier frequency of the PSPWM technique under dynamic condition is 240 Hz as derived in equation (20). The harmonic spectrum of $i_{in}$ with the embodiment, when the active and reactive power is 1000 W-1000VAR, is shown in FIG. 10(c). The modulation index of $v_{ac\text{-}CHB}$ is 2.399, which is within the modulation index range of the conventional technique in FIG. 4. The harmonic spectrum of $i_{in}$ with the embodiment of the subject invention, when the active and reactive power is 200 W+250VAR, is shown in FIG. 10(d). The modulation index is 1.647, which is inside the extended modulation index range in FIG. 4. As shown in FIGS. 10(c) and 10(d), with the embodiment of the subject invention, the harmonic spectra of $i_{in}$ can meet IEEE 519 current harmonic limits.

TABLE III

THE MAXIMUM DC OFFSET OF $I_{IN}$ IN SIMULATIONS WITH EITHER CONVENTIONAL OR PROPOSED TECHNIQUES

| Comparative Simulations | 1st transition (conventional) | 1st transition (proposed) | 2nd transition (conventional) | 2nd transition (proposed) |
|---|---|---|---|---|
| 1 | 78% | 8.5% | 43% | 1.75% |
| 2 | 92% | 3.8% | 94% | 1.4% |

Figure 11A:
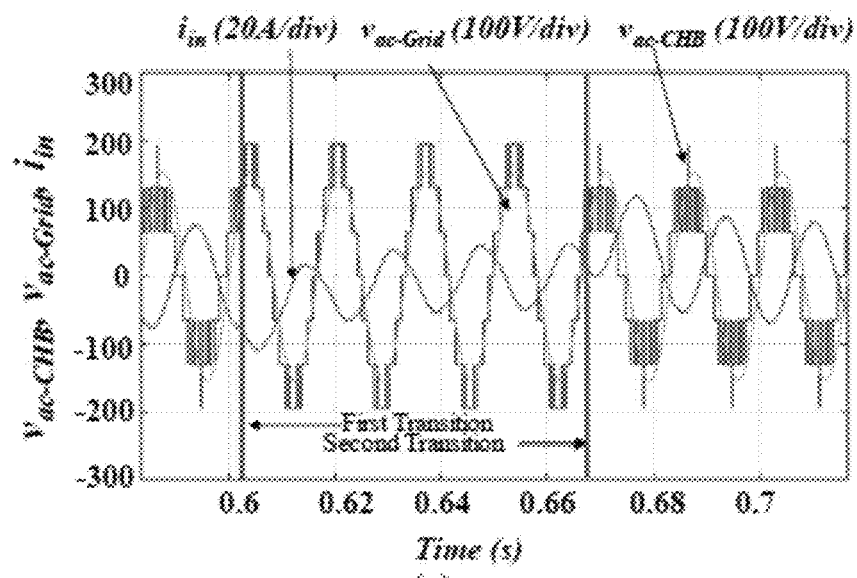
FIG. 11(a) shows a second simulation result of $V_{ac\text{-}CHB}$, $V_{ac\text{-}Grid}$, and $I_{in}$ for a conventional four-quadrant converter.
Figure 11B:
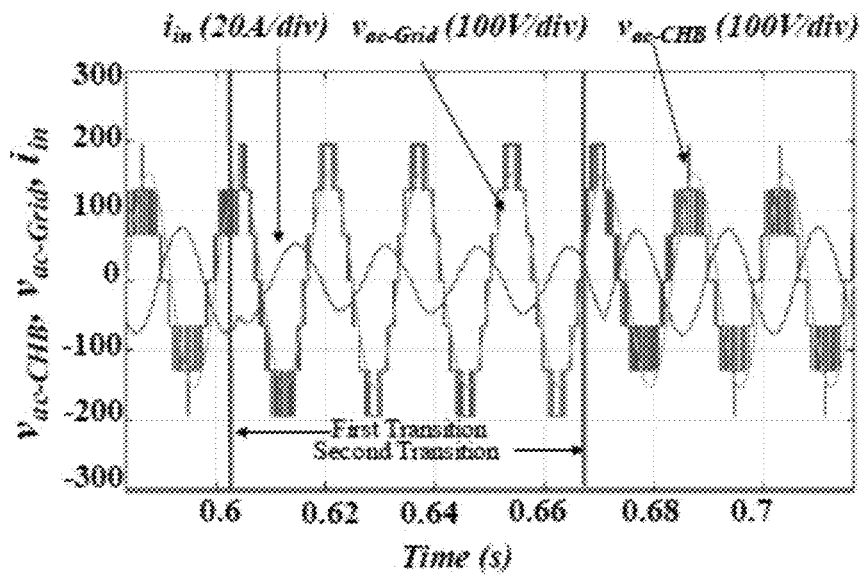
FIG. 11(b) shows a second simulation result of $V_{ac\text{-}CHB}$, $V_{ac\text{-}Grid}$, and $I_{in}$ for a four-quadrant converter according to an embodiment of the subject invention.
Figure 11C:
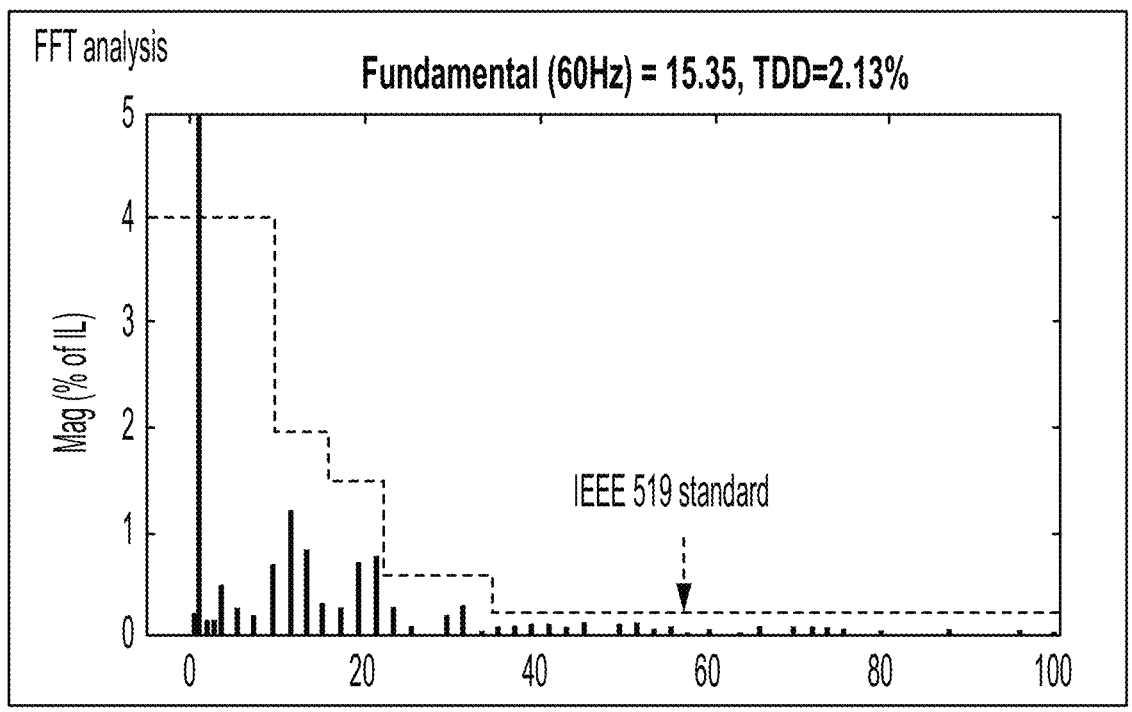
FIG. 11(c) shows a second simulation result of harmonic spectrum at −850 W+825VAR for a four-quadrant converter according to an embodiment of the subject invention.
Figure 11D:
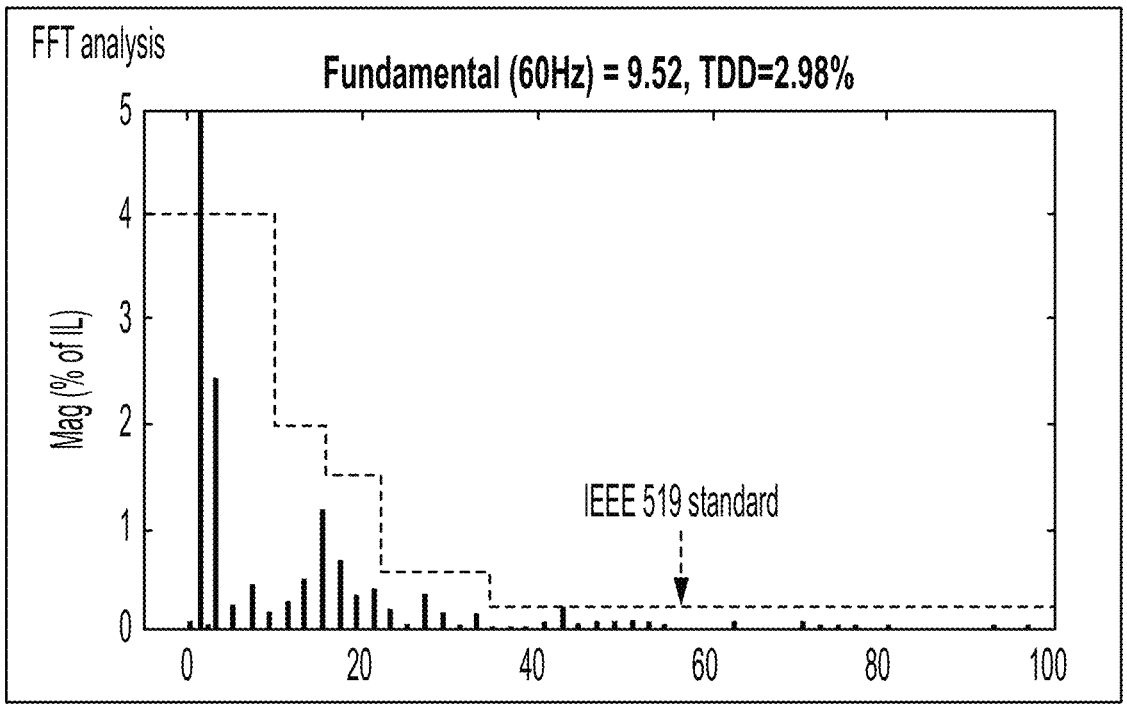
FIG. 11(d) shows a second simulation result of harmonic spectrum at −500 W−600VAR for a four-quadrant converter according to an embodiment of the subject invention.

FIGS. 11(a)-11(d) show second simulation results for a conventional four-quadrant converter and a four-quadrant converter according to an embodiment of the subject invention. In the second comparative simulations, the active and reactive power flowing from power grid to the converter change from −850 W+825VAR to −500 W−600VAR at t=0.6023 s and then change back to −850 W+825VAR at t=0.6667 s. In FIG. 11(a), for the conventional SHCM-PWM technique, during the transient condition, when the active and reactive powers are changed, more than two fundamental cycles are required to reach steady state. A huge 92%-94% DC offset shown in Table III is observed in the current $i_{in}$, and it lasts for more than two cycles. This DC offset can lead to instability on the controller. FIG. 11(b) shows a second simulation result of $V_{ac\text{-}CHB}$, $V_{ac\text{-}Grid}$, and $I_{in}$ for a four-quadrant converter according to an embodiment of the subject invention. During the transient condition, the active power and reactive power are changed separately within one cycle with the conditions defined in equation (17). Referring to FIG. 11(b), $i_{in}$ reaches the steady state within less than one cycle. The maximum 1.4%-3.8% DC offset is negligible as shown in Table III. The carrier frequency of the PSPWM technique under dynamic condition is 240 Hz as derived in equation (20). The harmonic spectrum of $i_{in}$ at −850 W+825VAR with a 1.52 modulation index, which is inside the extended modulation index range in FIG. 4, is shown in FIG. 11(c). The harmonic spectrum of $i_{in}$ at −500 W−600VAR is shown in FIG. 11(d). The modulation index is 2.274, which is inside the conventional modulation index range in FIG. 4. It is apparent that the harmonics of $i_{in}$ for both conditions meet the current harmonic limits of IEEE 519.

EXAMPLE 2

Figure 12:
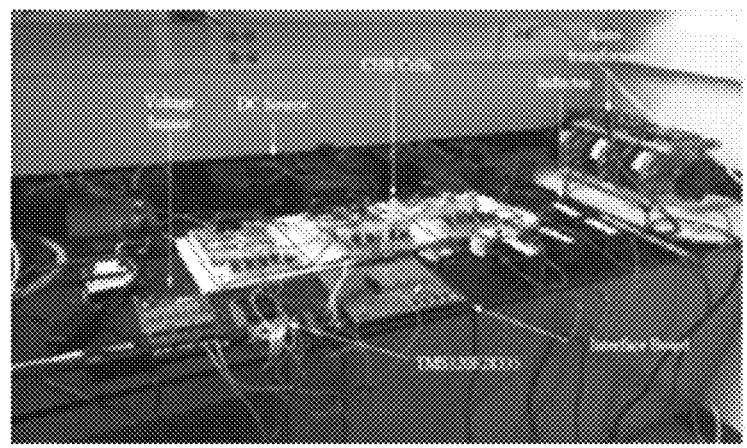
FIG. 12 shows a hardware prototype of a four-quadrant CHB.

A 7-level four-quadrant CHB converter according to an embodiment of the subject invention, having the same parameters as in the simulations, was fabricated and investigated. FIG. 12 shows a hardware prototype of such a four-quadrant CHB. The TMS320F28335 DSP was used in the prototype. Similar to FIGS. 10(a)-10(d), in the first comparative experiments, the active and reactive power flowing from power grid to the converter changed from 1000 W−1000VAR to 200 W+250VAR and then changed back to 1000 W−1000VAR. The transient periods are between the two red (vertical) lines in FIGS. 13(a), 13(b), 14(a), and 14(b).

Figure 13A:
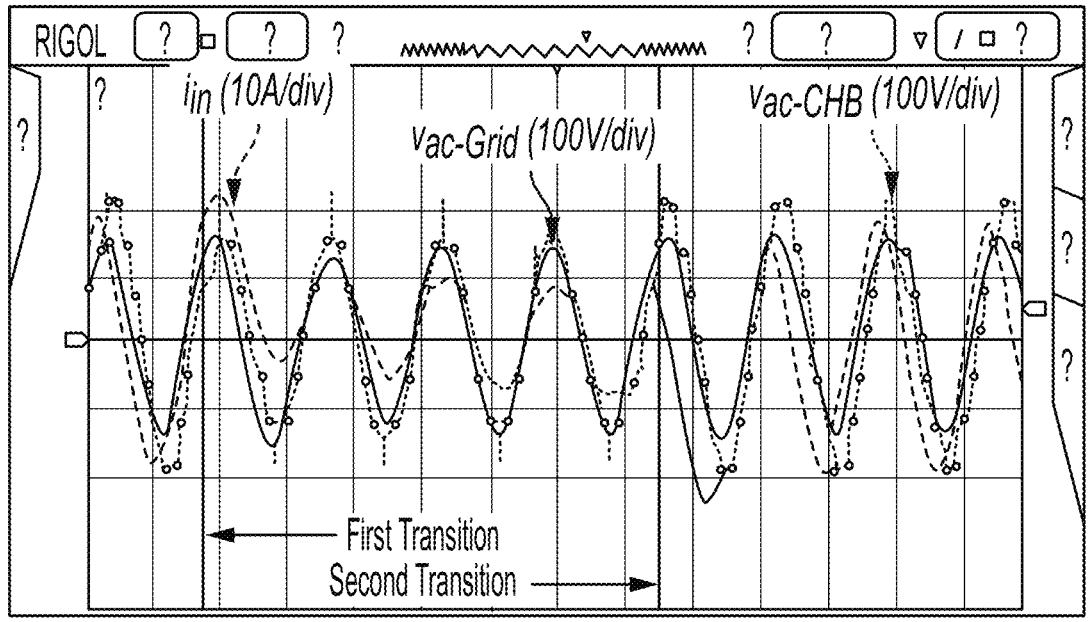
FIG. 13(a) shows a first experimental result of $V_{ac\text{-}CHB}$, $V_{ac\text{-}Grid}$, and $I_{in}$ for a conventional four-quadrant converter.
Figure 13B:
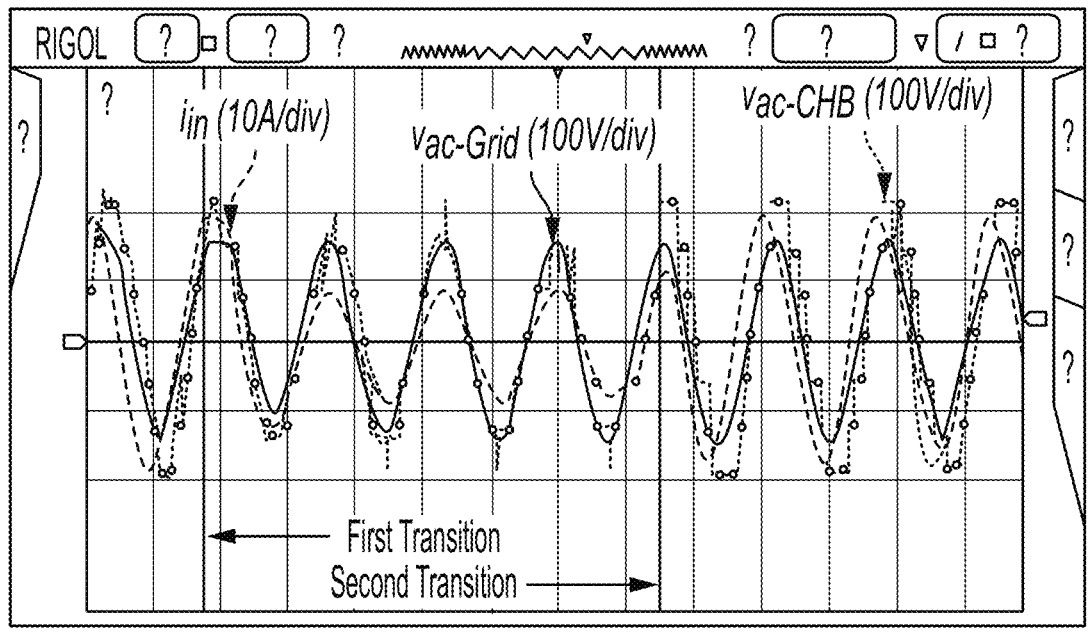
FIG. 13(b) shows a first experimental result of $V_{ac\text{-}CHB}$, $V_{ac\text{-}Grid}$, and $I_{in}$ for a four-quadrant converter according to an embodiment of the subject invention.
Figure 13C:
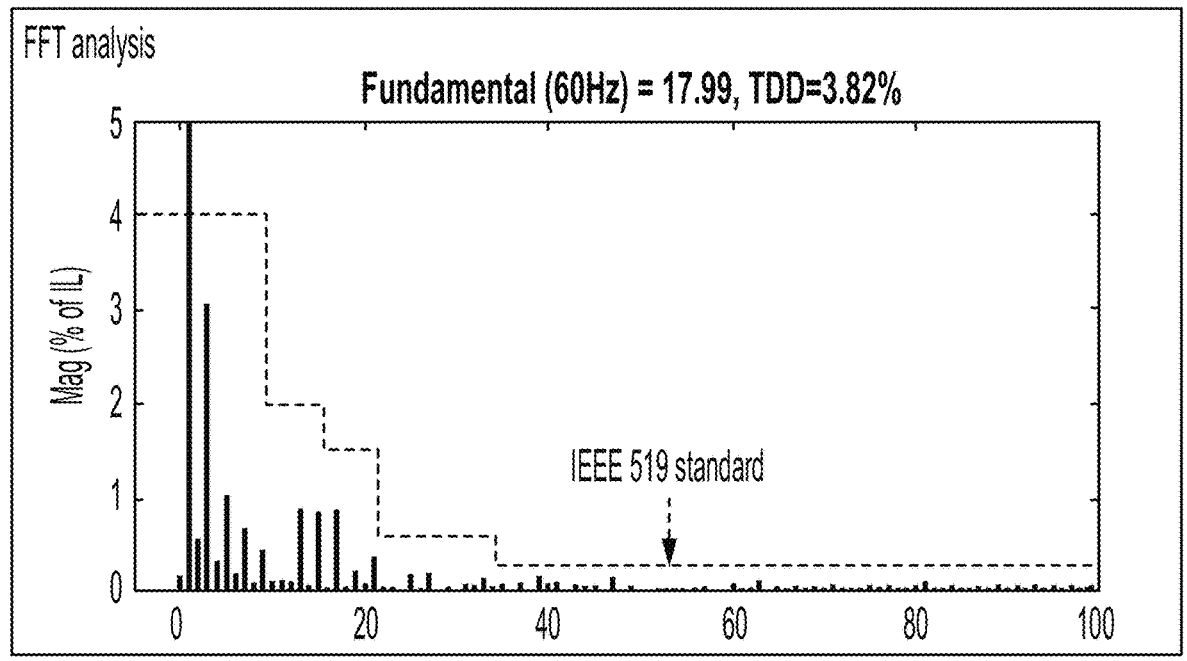
FIG. 13(c) shows a first experimental result of harmonic spectrum at 1000 W−1000VAR for a four-quadrant converter according to an embodiment of the subject invention.
Figure 13D:
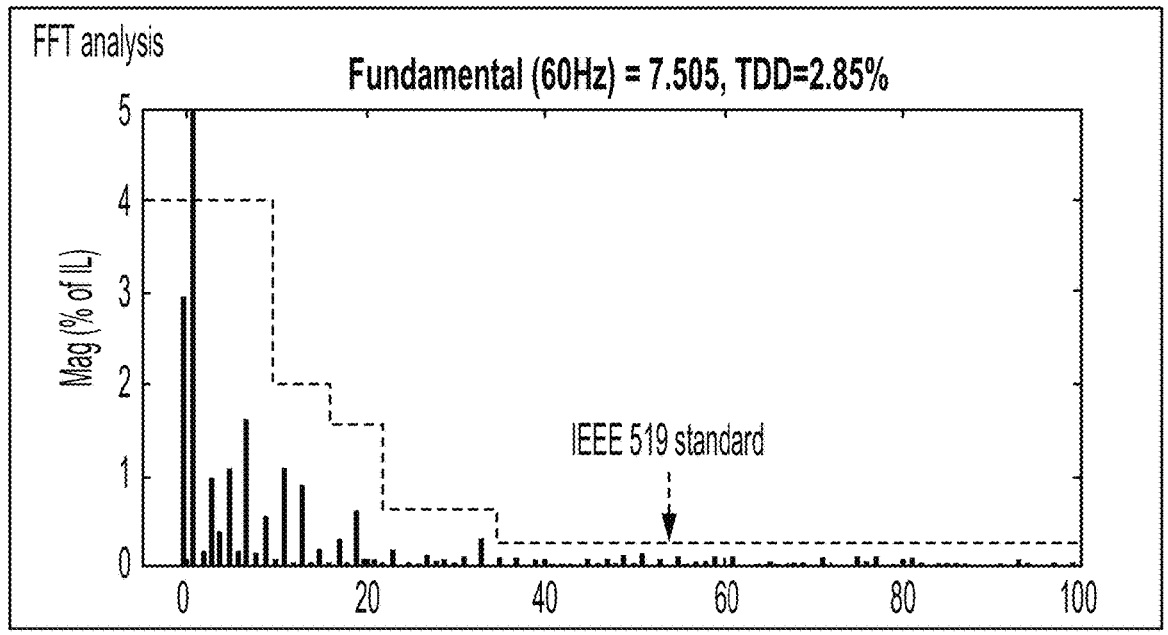
FIG. 13(d) shows a first experimental result of harmonic spectrum at 200 W+250VAR for a four-quadrant converter according to an embodiment of the subject invention.
Figure 14A:
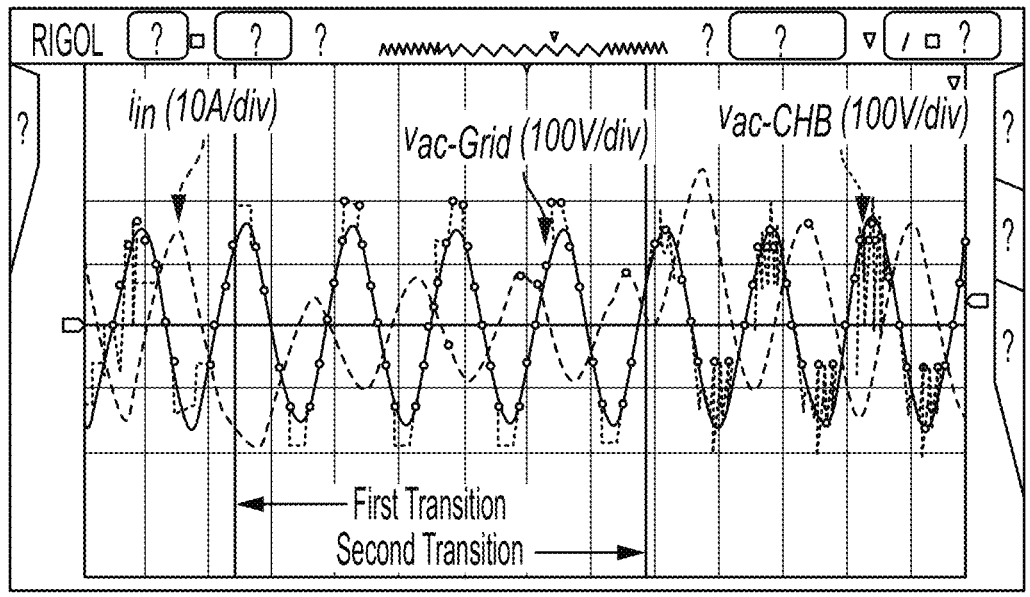
FIG. 14(a) shows a second experimental result of $V_{ac\text{-}CHB}$, $V_{ac\text{-}Grid}$, and $I_{in}$ for a conventional four-quadrant converter.
Figure 14B:
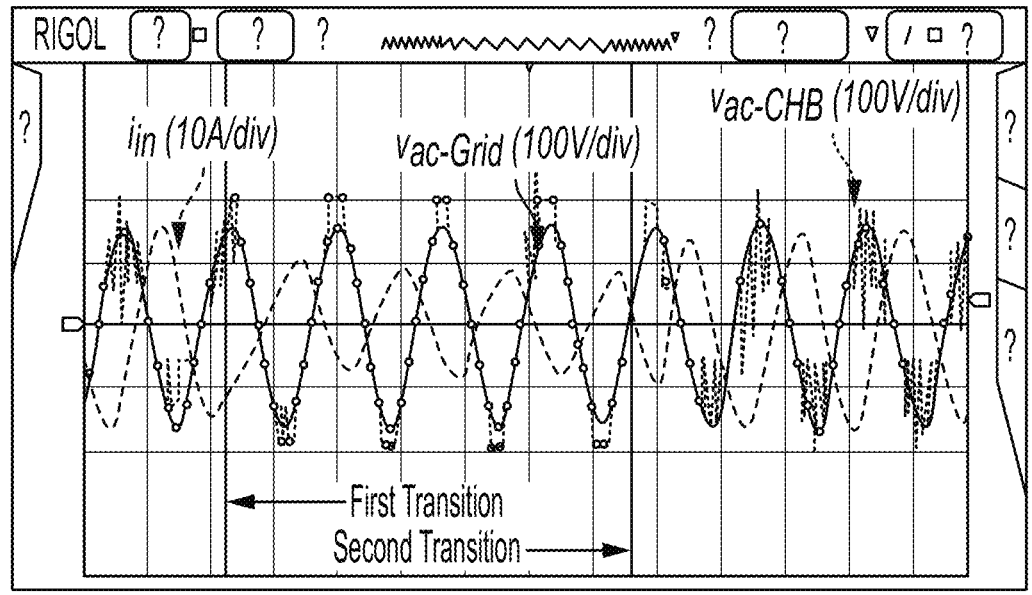
FIG. 14(b) shows a second experimental result of $V_{ac\text{-}CHB}$, $V_{ac\text{-}Grid}$, and $I_{in}$ for a four-quadrant converter according to an embodiment of the subject invention.
Figure 14C:
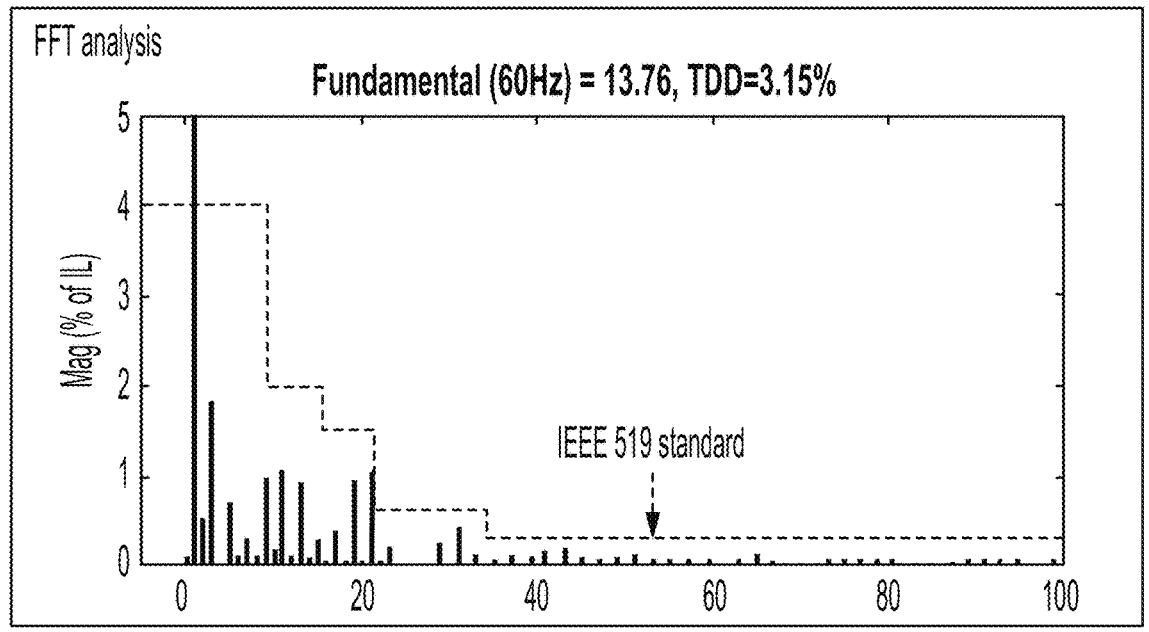
FIG. 14(c) shows a second experimental result of harmonic spectrum at −850 W+825VAR for a four-quadrant converter according to an embodiment of the subject invention.
Figure 14D:
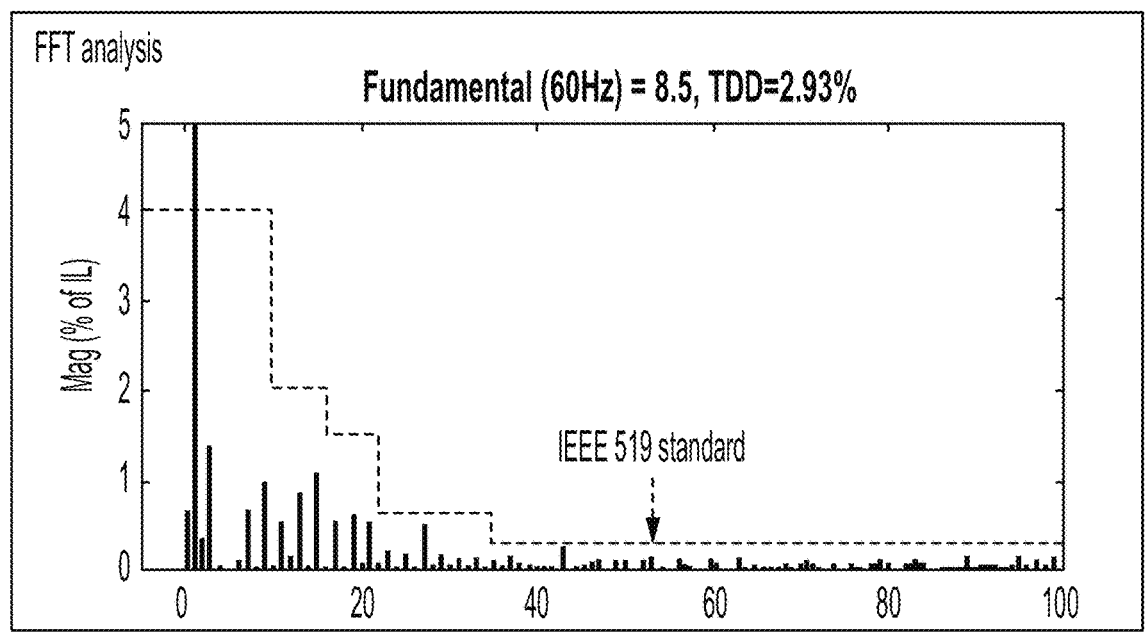
FIG. 14(d) shows a second experimental result of harmonic spectrum at −500 W−600VAR for a four-quadrant converter according to an embodiment of the subject invention.

FIGS. 13(a)-13(d) show first experimental results for a conventional four-quadrant converter and a four-quadrant converter according to an embodiment of the subject invention. In FIG. 13(a), the conventional technique with SHCM-PWM takes at least two fundamental cycles to reach the steady state. A 35%-65% DC offset is observed in $i_{in}$ in Table IV during the transient. This large DC offset can lead to instability of the controller and can reduce the reliability of the semiconductor switches. FIG. 13(b) shows a first experimental result of $V_{ac\text{-}CHB}$, $V_{ac\text{-}Grid}$, and $I_{in}$ for a four-quadrant converter according to an embodiment of the subject invention. In FIG. 13(b), for the hybrid technique of an embodiment of the subject invention, which complies with the condition derived in equation (17), each of the d and q components changes once in one cycle. It takes less than one cycle to reach steady state. The 2.5%-12% DC offset is much smaller than that of the conventional technique as shown in Table IV. The switching frequency of the PSPWM technique is 240 Hz as derived in equation (20). The current harmonic spectra of $i_{in}$ in steady state at both 1000 W−1000VAR and 200 W+250VAR are shown in FIGS. 13(c) and 13(d), respectively. Both harmonic spectra can meet the IEEE 519 current harmonic limits. The modulation indices for both conditions are the same as the simulation results. This confirms the extended modulation index range in FIG. 4.

TABLE IV

THE MAXIMUM DC OFFSET OF $I_{IN}$ IN EXPERIMENTS WITH EITHER CONVENTIONAL OR PROPOSED TECHNIQUES

| Experiment number | First transition (conventional) | First transition (proposed) | Second transition (conventional) | Second transition (proposed) |
|---|---|---|---|---|
| First | 65% | 12% | 35% | 2.5% |
| Second | 60% | 5% | 37% | 5.8% |

FIGS. 14(a)-14(d) show second experimental results for a conventional four-quadrant converter and a four-quadrant converter according to an embodiment of the subject invention. In the second comparative experiments, the active and reactive power flowing from power grid to the converter change from −850 W+825VAR to −500 W−600VAR and then change back to −850 W+825VAR.

Referring to FIG. 14 (a), the conventional technique takes at least two fundamental cycles to achieve steady state. A 37%-60% DC offset is observed during the transient in Table IV. In FIG. 14 (b), the hybrid technique of the embodiment of the subject invention takes less than one cycle to reach steady state with only a 5%-5.8% DC offset during the transient condition. FIGS. 14(c) and 14(d) show that the current harmonic spectra of izn meet IEEE 519 current harmonic limits under both conditions.

As demonstrated by both experimental and simulation results, with the hybrid techniques of embodiments of the subject invention, the CHB rectifier can process four-quadrant active and reactive power with the extended modulation index, achieve fast dynamic response, and meet IEEE-519 current harmonic limits.

The hybrid techniques of embodiments of the subject invention can achieve a transient free dynamic response because of the non-ideal component parameters, such as the variations of the DC link voltages, the resistance of the inductor, and the impedance of power grid (as well as possibly others), while maintaining a small DC offset during the transient condition. In addition, compared with conventional techniques, the hybrid techniques of embodiments of the subject invention significantly improve the dynamic response.

EXAMPLE 3

Figure 15A:
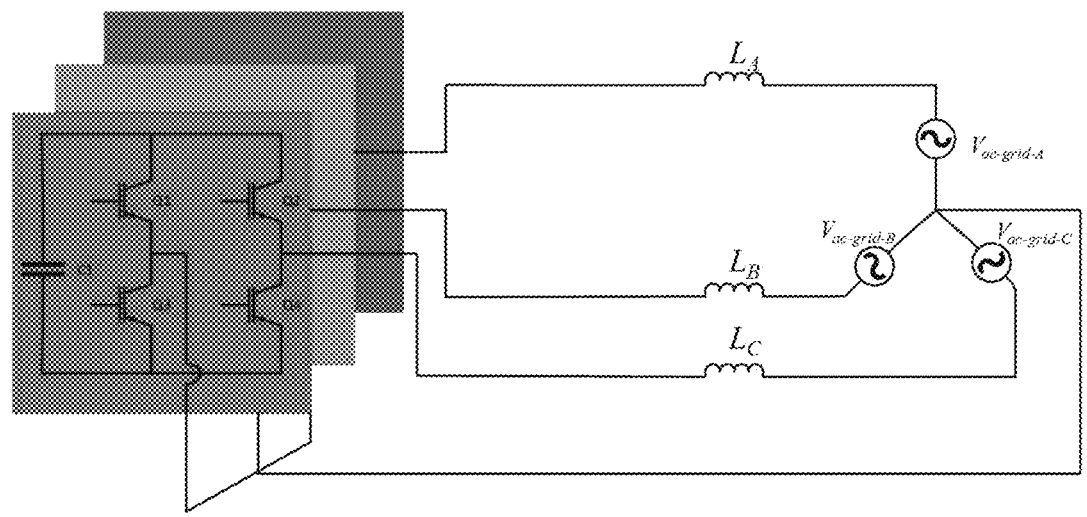
FIG. 15(a) shows a grid-tied converter according to an embodiment of the subject invention.
Figure 15B:
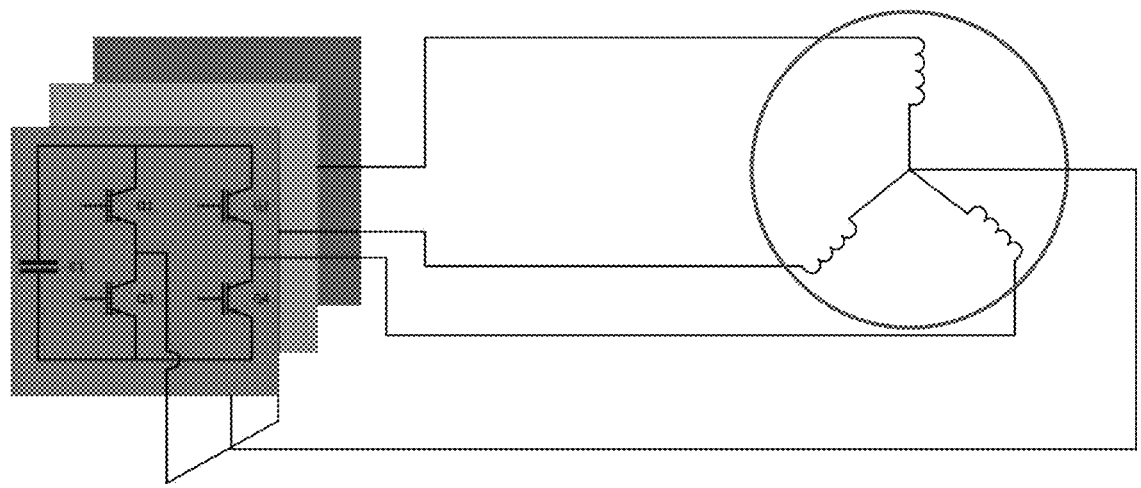
FIG. 15(b) shows a three-phase asynchronous motor according to an embodiment of the subject invention.
Figure 15C:
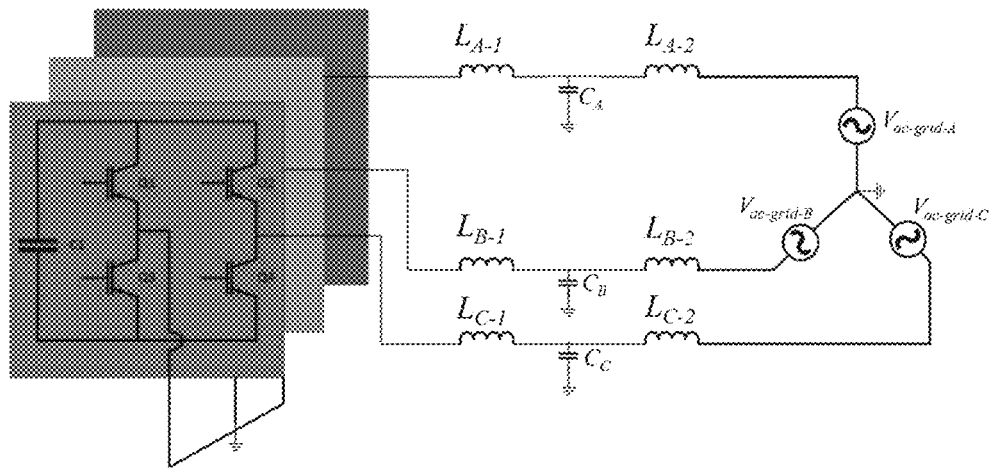
FIG. 15(c) shows a filter, according to an embodiment of the subject invention.

FIGS. 15(a)-15(c) show another example according to an embodiment of the subject invention. FIG. 15(a) shows a grid-tied converter that selectively uses a selective harmonic current mitigation pulse width modulation (SHCM-PWM) unit and a phase shift pulse width modulation (PSPWM) unit. Referring to FIGS. 6 and 15(a), the grid-tied converter of FIG. 15(a), indicated as colored H bridges, replaces the position of the CHB converter of FIG. 6, thereby providing high efficiency and high dynamic performance. The grid-tied converter further includes inductors $L_A$, $L_B$, and $L_C$ connected to a grid such as Neutral Point Clamped (NPC) and Flying Capacitor (FC).

FIG. 15(b) shows a three-phase asynchronous motor according to an embodiment of the subject invention. Similar to FIG. 15(a), the three-phase asynchronous motor replaces the position of the CHB converter of FIG. 6, thereby improving the dynamic performance in drive appli-cation using the three-phase asynchronous motor. The motor can be a single phase asynchronous motor.

FIG. 15(c) shows a filter according to an embodiment of the subject invention. Similar to FIGS. 15(a) and 15(b), the filter replaces the position of the CHB converter of FIG. 6, thereby improving dynamic performance in any kind of passive filter. The filter includes any kind of passive filters including an L filter, an LC filter, and an LCL filter.

In addition to above described examples, a hybrid PS-PWM and asymmetric SHCM-PWM technique is developed to reduce the switching frequency and inductance of the PS-PWM technique and meet the limits of IEEE 519 2014. To reach this goal, the voltage harmonics due to the PS-PWM technique are mitigated with the harmonics generated from the low-frequency asymmetric SHCM-PWM technique. Consequently, the switching frequency is reduced. Moreover, a general equation set for the hybrid PS-PWM and asymmetric SHCM-PWM technique is derived based on the equations of the PS-PWM and asymmetric SHCM-PWM techniques.

Guidelines are developed for the design of critical parameters such as the coupling inductance and the switching frequency of the hybrid modulation technique. The hybrid modulation technique increases power efficiency, reduces inductance, meets the limits of IEEE 519, and can achieve four-quadrant operation for grid-tied CHB converters.

Moreover, the best and worst scenarios for changing the active and reactive current of the grid-tied converter are derived. So, instead of changing the active and reactive current twice in a fundamental cycle as discussed, the active and reactive current can be changed just once in each half-period. Also, the effects of low-order current harmonics of the grid-tied converter on the DC transient response will be discussed and the conditions which can cause the best and worst scenarios for the DC transient response will be derived. Using high-switching frequency modulation techniques such as PS-PWM can achieve a high-dynamic performance due to eliminating the low-order harmonics and simplicity of controlling the fundamental and low-order harmonics of the CHB. Also, using the asymmetric SHCM-PWM can increase the efficiency of the converter. So the hybrid technique can be used for different types of grid-tied converters such as electric vehicle charging stations and smart grids to have both advantages.

Hybrid PS-PWM and Asymmetric SHCM-PWM Technique

PS-PWM Technique

Figure 16:
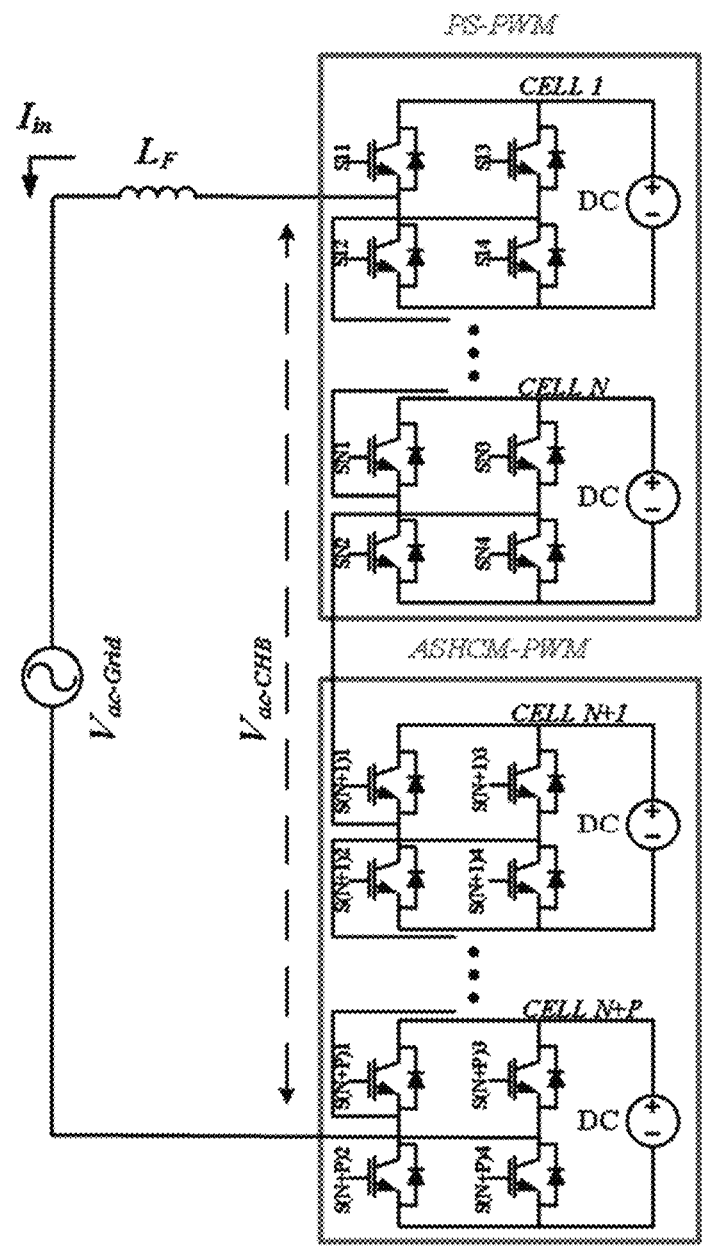
FIG. 16 shows a converter circuit, according to an embodiment of the subject invention.

The configuration of a power grid-tied CHB converter is shown in FIG. 16, where N plus P H-bridge cells are cascaded to generate the CHB voltage $v_{ac\text{-}CHB}(t)$ in equation (21) below to control the AC current $i_{in}(t)$ injected to the power grid $v_{ac\text{-}Grid}(t)$. Here, the N cells of the CHB grid-tied converter is modulated by the PS-PWM and P cells are modulated by the asymmetric SHCM-PWM technique. The DC link voltage of each cell is $V_{dc}$. L is the coupling inductance between $v_{ac\text{-}CHB}(t)$ and $v_{ac\text{-}Grid}(t)$. In this technique, the CHB converter includes i number of cells, i=N+P, they are modulated with the PS-PWM to achieve better dynamic performance than low-frequency modulation techniques. P cells are modulated with the asymmetric SHCM-PWM to meet current harmonic limits. It is derived the magnitudes and phases for the harmonic voltages of N CHB cells with the PS-PWM.

$$v_{ac-CHB-PSPWM}(t) = \quad (21)$$

$$NV_{dc}M\cos(\omega_o t + \theta_o) + \frac{4V_{dc}}{\pi}\prod_{B=1}^{\infty}\sum_{A=-\infty}^{\infty}\frac{1}{2B}J_{2A-1}(NB\pi M) \times$$

$$\sin\left((2NB + 2A - 1)\frac{\pi}{2}\right)\cos(2NB\omega_c t + (2A-1)(\omega_o t + \theta_o))$$

where B and A are the baseband and sideband harmonic orders, respectively. $v_{ac-CHB-PSPWM}(t)$ is the voltage of the N-cell CHB with the PS-PWM technique, J is the Bessel function of the first kind. $\omega_c=2\pi f_c$ is the carrier frequency (radian) and $f_c$ is the carrier frequency (Hz). $\omega_o=2\pi f_o$, $\theta_o$, $f_o$ are the frequency (radian), phase and frequency (Hz) of the fundamental of $v_{ac-CHB-PSPWM}(t)$. The total modulation index of the CHB converter is $M_a=M(N+P)$, where M is the average modulation index of all cells. The DC links of these CHB cells can be connected to DC/DC converters.

Figure 17:
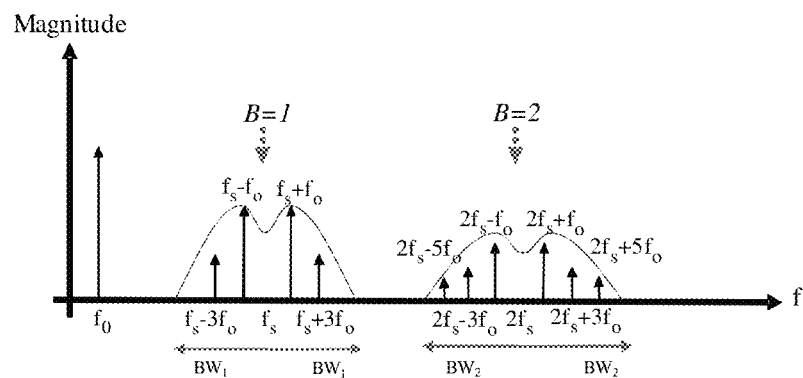
FIG. 17 shows a harmonic diagram, according to an embodiment of the subject invention.

The harmonic magnitudes of (21) are shown in FIG. 17 where $f_s$ is the switching frequency of $v_{ac-CHB-PSPWM}(t)$ in each half-period and $f_s=2Nf_c$. By expanding $\sin((2NB+2A-1)\pi/2)$ in (21), the following equation (22) can be derived, $$v_{ac-CHB-PSPWM}(t) = \quad (22)$$

$$NV_{dc}M\cos(\omega_o t + \theta_o) + \frac{4V_{dc}}{\pi}\prod_{B=1}^{\infty}\sum_{A=-\infty}^{\infty}\frac{1}{2B}J_{2A-1}(NB\pi M)\cos(NB\pi) \times$$

$$\sin\left((2A-1)\frac{\pi}{2}\right)\cos(2NB\omega_c t + (2A-1)(\omega_o t + \theta_o))$$

By shifting fundamental by −90° and harmonics by −(2A−1) 90°, the second term in (22) can be further written as, $$v_{ac-CHB-PSPWM}(t) = \quad (23)$$

$$NV_{dc}M\sin(\omega_o t + \theta_o) + \frac{4V_{dc}}{\pi}\prod_{B=1}^{\infty}\sum_{A=-\infty}^{\infty}\frac{1}{2B}J_{2A-1}(NB\pi M)\cos(NB\pi)$$

$$\sin\left((2A-1)\frac{\pi}{2}\right)\cos\left(2NB\omega_c t + (2A-1)\left(\omega_o t + \theta_o - \frac{\pi}{2}\right)\right)$$

The second term in (23) consists of the harmonic components of the CHB voltage. It can be decomposed into the sine and cosine components as;

$$v_{ac-CHB-PSPWM}(t) = \quad (24)$$

$$NV_{dc}M\sin(\omega_o t + \theta_o) + \frac{4V_{dc}}{\pi}\sum_{B=1}^{\infty}\sum_{A=-\infty}^{\infty}\frac{1}{2B}J_{2A-1}(NB\pi M)\cos(NB\pi)$$

$$\sin((2A-1)\theta_o)\cos(2NB\omega_c t + (2A-1)(\omega_o t)) +$$

$$\frac{4V_{dc}}{\pi}\sum_{B=1}^{\infty}\sum_{A=-\infty}^{\infty}\frac{1}{2B}J_{2A-1}(NB\pi M)\cos(NM\pi)\cos((2A-1)\theta_o)$$

$$\sin(2NB\omega_c t + (2A-1)(\omega_o t)),$$

As shown in (24), the magnitudes of the sine and cosine components depend on the phase $\theta_0$ of the fundamental. As a result, the magnitudes of the harmonics of the PS-PWM cannot be controlled if the fundamental is controlled. The asymmetric SHCM-PWM technique can control both the magnitude and phase of each harmonic, so it is employed in the hybrid modulation technique to mitigate the harmonics to meet IEEE 519. The magnitudes of the harmonics in (24) when B is less than or equal to 2 are shown in FIG. 17, which shows the magnitude versus bandwidth. The bandwidth $BW_B$ of the $B^{th}$ order baseband in FIG. 17 is given by Carlson's rule:

$$BW_B \approx 2(NMB\pi+2)f_0 \quad (25)$$

In FIG. 17, the overlap of $BW_1$ and $f_0$ should be avoided because switching harmonics will influence the fundamental. At the same time, $f_s$ which is equal to $2Nf_c$, should be as low as possible to minimize switching power loss. To achieve these two goals, the following condition should be met, $$f_s - BW_1 > f_0 \Rightarrow f_s > f_0 + BW_1 \quad (26)$$

Asymmetric SHCM-PWM Technique

Figure 18:
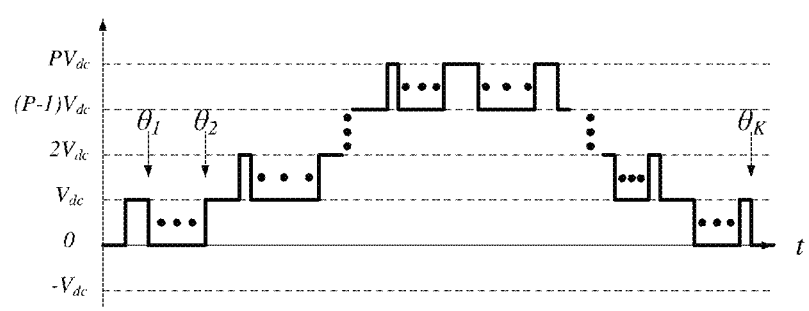
FIG. 18 shows a time domain waveform, according to an embodiment of the subject invention.

For P cells that use the asymmetric SHCM-PWM in FIGS. 16 and 18, if the fundamental phase of the P-cell CHB voltage $v_{ac-CHB-ASHCM}(t)$ is equal to $\theta_o$, its Fourier series is, $$v_{ac-CHB-ASHCM}(t) = \quad (27)$$

$$\sum_{h=1}^{\infty}\left(\frac{2V_{dc}}{\pi h}(-\sin(h\theta_1) + \sin(h\theta_2) - \ldots + \sin(h\theta_K))\cos(h\omega_o t + h\theta_o) + \right.$$

$$\left.\frac{2V_{dc}}{\pi h}(\cos(h\theta_1) - \cos(h\theta_2) + \ldots - \cos(h\theta_K))\sin(h\omega_o t + h\theta_o)\right),$$

where h is the harmonic order, K is the number of switching transitions in each half-period for the P-cell CHB. Because of the asymmetric waveform generated by the asymmetric SHCM-PWM in FIG. 3 has a half-wave symmetry, the even order harmonics in (7) are equal to zero. $\theta_1, \theta_2, \ldots,$ and $\theta_K$ are switching angles representing the switching transitions of the asymmetric SHCM-PWM in each half-period. By expanding $\cos(h\omega_o t + h\theta_o)$ and $\sin(h\omega_o t + h\theta_o)$ in (27) and using mathematical manipulations, (27) can be rewritten as, $$v_{ac-CHB-ASHCM}(t) = \quad (28)$$

$$\sum_{h=1}^{\infty}\left(\frac{2V_{dc}}{\pi h}(-\sin(h\theta_1 - h\theta_o) + \sin(h\theta_2 - h\theta_o) - \ldots + \sin(h\theta_K - h\theta_o))\right.$$

$$\cos(h\omega_o t) + \frac{2V_{dc}}{\pi h}(\cos(h\theta_1 - h\theta_o) -$$

$$\left.\cos(h\theta_2 - h\theta_o) + \ldots - \cos(h\theta_K - h\theta_o))\sin(h\omega_o t)\right),$$

In (28), the sine and cosine terms of the harmonics are decomposed. By controlling the switching angles $\theta_1$, $\theta_2$, and $\theta_K$, the low-order harmonics due to the PS-PWM in N-cell CHBs can be compensated with the harmonics generated by the asymmetric SHCM-PWM in (28).

Derivation of Equations for Hybrid PS-PWM and Asymmetric SHCM-PWM Technique

In FIG. 16, the $h^{th}$ order current harmonic $I_{in-h}$ can be calculated as, $$|I_{in-h}| = \left|\frac{V_{ac-CHB-PSPWM-h}\angle\theta_{PSPWM-h} + V_{ac-CHB-ASHCM-h}\angle\theta_{ASHCM-h}}{j\omega_o hL}\right|, \quad (29)$$

where $V_{ac-CHB-PSPWM-h}$, $V_{ac-CHB-PSPWM-h}$, $\theta_{PSPWM-h}$ and $\theta_{ASHCM-h}$ are the magnitudes and phases of the $h^{th}$ order voltage harmonic due to the PS-PWM and asymmetric SHCM-PWM respectively. $I_{in-h}$ must meet the total demand distortion (TDD) and harmonic limits up to $50^{th}$ order specified by IEEE 519 2014 in Table I. $I_L$ is the maximum demand load current and $I_{sc}$ is the short circuit current at the PCC. To meet the current limits of IEEE 519, the following equation must be met, $$\left|\frac{I_{in-h}}{I_L}\right| = \left|\frac{V_{ac-CHB-PSPWM-h}\angle\theta_{PSPWM-h} + V_{ac-CHB-ASHCM-h}\angle\theta_{ASHCM-h}}{j\omega_o hLI_L}\right| \leq C_h, \quad (30)$$

where $C_h$ is the limit of the $h^{th}$ order current harmonic in Table I in the worst scenario based on the short circuit ratio. Based on IEEE519 2014, TDD must also meet the standard below, $$T_{DD} = \sqrt{\left(\frac{I_{in-3}}{I_L}\right)^2 + \left(\frac{I_{in-5}}{I_L}\right)^2 + \ldots + \left(\frac{I_{in-49}}{I_L}\right)^2} \leq C_{TDD}, \quad (31)$$

where $C_{TDD}$ is the TDD limit of IEEE 519. It is worth to mention that the grid voltage harmonic requirements of IEEE-519 is not considered here.

TABLE I

| HARMONIC LIMITS OF IEEE 519 | | | | | |
|---|---|---|---|---|---|
| $I_{sc}/I_L \leq 20$ | <11 | $11 \leq h < 17$ | $17 \leq h < 23$ | $23 \leq h < 35$ | $35 \leq h < 50$ | $C_{TDD}$ |
| $C_{h\ \&\ TDD}$ | 4% | 2% | 1.5% | 0.6% | 0.3% | 5% |

Based on (24), (28), (30) and (31), the equation set which is going to be used to calculate switching angles using optimization techniques for the hybrid modulation technique is therefore becoming, $$\begin{cases} V_{ac-CHB-1} = \frac{1}{\sqrt{2}}\sqrt{\begin{array}{c}\left(\frac{2V_{dc}}{\pi}(\cos(\theta_1-\theta_o)-\cos(\theta_2-\theta_o)+\ldots - \cos(\theta_k-\theta_o))+NMV_{dc}\cos(\theta_o)\right)^2 + \\ \left(\frac{2V_{dc}}{\pi}(-\sin(\theta_1-\theta_o)+\sin(\theta_2-\theta_o)-\ldots + \sin(\theta_k-\theta_o))+NMV_{dc}\sin(\theta_o)\right)^2\end{array}}, \\ \\ \sqrt{\begin{array}{c}\left(\frac{4V_{dc}}{\pi}\sum_{B=1}^{\infty}\sum_{A=-\infty}^{\infty}\left(\frac{1}{2B}J_{2A-1}(NB\pi M)\cos(NB\pi)\right.\right.\\ \left.\left.\sin((2A-1)\theta_o)\right)+\frac{2V_{dc}}{\pi h}(-\sin(h(\theta_1-\theta_o))+\\ \sin(h(\theta_2=\theta_o))-\ldots + \sin(h(\theta_k-\theta_o)))\right)^2 + \\ \left(\frac{4V_{dc}}{\pi}\sum_{B=1}^{\infty}\sum_{A=-\infty}^{\infty}\left(\frac{1}{2B}J_{2A-1}(NB\pi M)\cos(NB\pi)\right.\right.\\ \left.\left.\cos(2A-1)\theta_o)\right)+\frac{2V_{dc}}{\pi h}(\cos(h(\theta_1-\theta_o))-\\ \cos(h(\theta_2-\theta_o))+\ldots - \cos(h(\theta_k-\theta_o)))\right)^2\end{array}} \Big/ |\omega_o hLI_L| \leq C_h, h=3,5,7,\ldots, \end{cases} \quad (32)$$

$$\sqrt{\left(\frac{I_{in-3}}{I_L}\right)^2 + \left(\frac{I_{in-5}}{I_L}\right)^2 + \ldots + \left(\frac{I_{in-49}}{I_L}\right)^2} \leq C_{TDD}$$

In (32), the first equation (31) is used to generate the desired fundamental CHB voltage. The second and the third equations are conditions to meet the limits of current harmonics and TDD, respectively. For the sideband harmonics outside the bandwidth defined in (25), because their magnitudes are small, they will be ignored. Only the sideband harmonics within the bandwidth will be considered in (32). Therefore, the number of sideband harmonics of each baseband harmonic in (32) is a function of its bandwidth (25). The switching angles in (32) can be solved using optimization technique such as particle swarm optimization technique, if critical parameters such as $V_{dc}$, $I_L$, K, N, P, and L are determined first.

Parameter Design for the Hybrid Modulation Technique

In (32), $V_{dc}$, $I_L$, K, N, P, and L must be designed for the hybrid modulation technique. To achieve reactive power compensation, the magnitude of the fundamental CHB voltage should be higher than the amplitude of the grid voltage $V_{ac-Grid-1}$, so $$\frac{4V_{dc}(N+P)}{\pi} \geq \sqrt{2}V_{ac-Grid-1} \Rightarrow V_{dc} \geq \frac{\sqrt{2}\pi V_{ac-Grid-1}}{4(N+P)} \quad (33)$$

$I_L$ is determined based on the maximum volt-ampere of the grid-tied CHB converter. $I_L$ is 14.14 A, $V_{ac-Grid-1}$ is 110V and volt-ampere is 1.555 kVA. Because N cells use the PS-PWM and P cells use the asymmetric SHCM-PWM, there is a trade-off between choosing N and P in different applications. If N≥P, the converter has better a dynamic performance as will be discussed later than N≤P [20], however, the switching power loss is higher than N≤P, and the inductance which can mitigate the current harmonics is bigger than N≤P. If N≤P, the converter can mitigate more number of current harmonics with lower switching loss than N≥P while the dynamic performance is not as good as N≥P. The objective is to use a 3-cell CHB converter to demonstrate that the hybrid modulation technique is better than the conventional PS-PWM technique in meeting harmonic limits with smaller switching frequency and L, so N=1 and P=2. In (25), because M=1, N=1 and B=1, $BW_B$=10.28$f_0$. Based on (6), $f_s$>677 Hz, so $f_s$ is selected as 720 Hz. The switching transitions in each half-period is therefore 12.

To solve inductance and switching angles from equation set (32) for the desired fundamental and meeting both the current harmonic and TDD limits of IEEE 519, the range of K and L should be determined. In (30), in the worst scenario, the harmonic mitigation due to $v_{ac-CHB-ASHCM-h}$ is ignored, so the worst inductance $L_{worst}$ is given by (34). Because of the harmonic mitigation due to $v_{ac-CHB-ASHCM-h}$, the actual inductance is smaller than $L_{worst}$ as shown in (34).

$$L \leq L_{worst} = \max\left(\frac{|V_{ac-CHB-PSPWM-h}|}{\omega_o hI_L C_h}\right), \text{ for } h=3,5,7,\ldots \quad (34)$$

Also, to meet TDD limit without the contribution from the asymmetric SHCM-PWM, based on (31), inductance L should meet, $$L \geq \frac{1}{C_{TDD}} \sqrt{\sum_{h=3}^{49} \left(\frac{\max(V_{ac-CHB-PSPWM-h})}{2\pi h f_o I_L}\right)^2} \quad (35)$$

(34) and (35) give the range of the inductance L when solving equation set (32). In equation set (32), due to the fact that significant harmonics, which could be over the limit of the PS-PWM are within the sidebands of carrier fundamental and harmonics, the low-order voltage harmonics: 3rd, 5th, . . . , (($f_s$−$BW_1$−60)/60)$^{th}$, of the PS-PWM are very low in FIG. 17. The asymmetric SHCM-PWM can mitigate the significant harmonics generated by the PS-PWM within the sidebands of carrier fundamental and harmonics.

FIG. 18 shows a time domain waveform of the asymmetric SHCM-PWM within a half-period, according to an embodiment of the subject invention.

Figure 19:
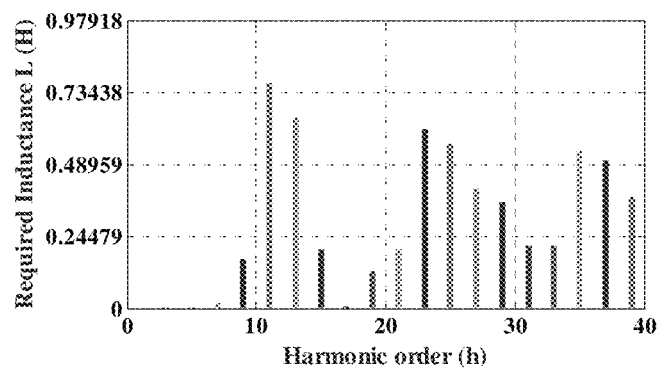
FIG. 19 shows calculated inductance of harmonics, according to an embodiment of the subject invention.

FIG. 19 shows the calculated highest inductance to meet harmonic limits for each order of harmonics based on (24) and (34). The maximum inductance 0.766 pu happened at 11$^{th}$ order harmonic.

Figure 20:
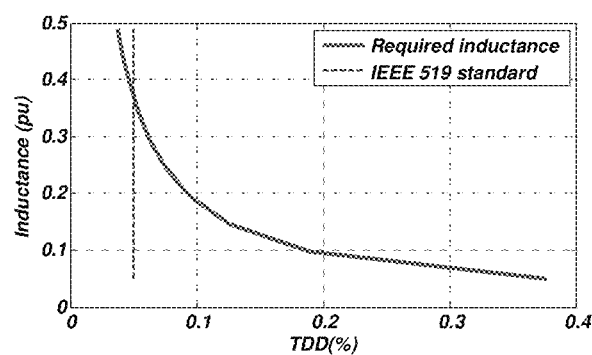
FIG. 20 shows calculated inductance, according to an embodiment of the subject invention.

FIG. 20 shows the calculated lowest inductances based on (34) and (35) at different TDDs. For IEEE 519, the inductance is 0.363 pu.

FIGS. 21(a) and 21(b) show phase diagrams of h$^{th}$ order harmonics. The phasor diagram of (29) and (30) is shown in FIG. 21 (a) for the h$^{th}$ order harmonic when $|V_{ac-CHB-PSPWM-h}| \geq |j\omega_o h C_h L I_L|$. $\theta_{PSPWM-h}$ is from 0 to $2\pi$. To meet the harmonic limit $C_h$ in (30), the head of vector $V_{ac-CHB-PSPWM-h}$ should always be located within the circle, which centers at the end of vector $V_{ac-CHB-PSPWM-h}$, with radius $|j\omega_o h C_h L I_L|$. In FIG. 21 (b), when $|V_{ac-CHB-PSPWM-h}| < |j\omega_o h C_h L I_L|$, the magnitude of the $V_{ac-CHB-ASHCM-h}$, no matter what phase it has, only needs to be less than $|j\omega_o h C_h L I_L| - |V_{ac-CHB-PSPWM-h}|$ to meet the current harmonic limit. It is relatively easy to meet the harmonic limit for this case and it has been discussed.

The range of $V_{ac-CHB-ASHCM-h}$, in which $I_{in-h}$ can meet the harmonic limit, when $|V_{ac-CHB-PSPWM-h}| \geq |j\omega_o h C_h L I_L|$, is given by the red circle which centers at the origin with the radius equal to $\max(|V_{ac-CHB-PSPWM-h}| + |j\omega_o h C_h L I_L|)$. The range is given by (36).

$$|V_{ac}\text{-CHB-ASHCM-}h| \leq \max(|\omega_o h L I_L C_k| + |V_{ac\text{-CHB-PSPWM-}h}|) \quad (36)$$

Figure 22:
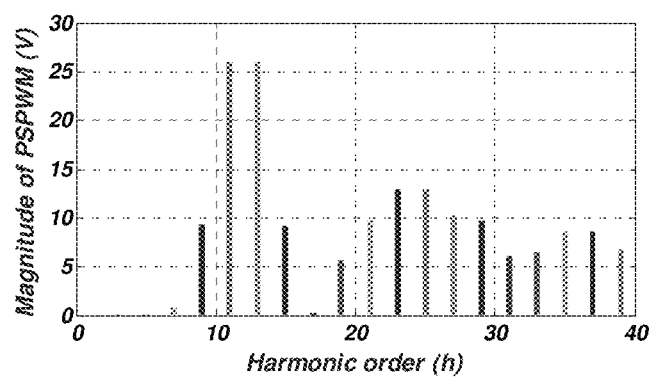
FIG. 22 illustrates voltage harmonics, according to an embodiment of the subject invention.

At N=1, when the modulation index is within the PS-PWM's normal modulation index range [0, 0.785], the maximum magnitudes of the voltage harmonics of the PS-PWM in the normal modulation index range can be calculated from (34) and are shown in FIG. 22. In FIG. 22, $|V_{ac-CHB-PSPWM-h}| \geq |j\omega_o h C_h L I_L|$ at the 11th, 13th, 23rd, 25th, 27th, 35th, 37th, and 39th harmonics. So, for these orders, (36) should be used to design the asymmetric SHCM-PWM. Also, the maximum harmonic magnitude $|v_{ac-CHB-ASHCM-h}|_{max}$ of the asymmetric SHCM-PWM is, $$|V_{ac-CHB-ASHCM-h}|_{max} = \frac{2V_{dc}K}{\pi h} \quad (37)$$

Based on (36) and (37), when $|v_{ac-CHB-PSPWM-h}| > |j\omega_o h C_h L I_L|$, for h$^{th}$ harmonic, the switching transitions K of the asymmetric SHCM-PWM in each half-period should meet the condition below, $$K \leq \frac{\pi h}{2V_{dc}}(\max(|\omega_o h L I_L C_h| + |V_{ac-CHB-PSPWM-h}|)) \quad (38)$$

(38) gives a maximum initial K to solve equation set (32).

Figure 23:
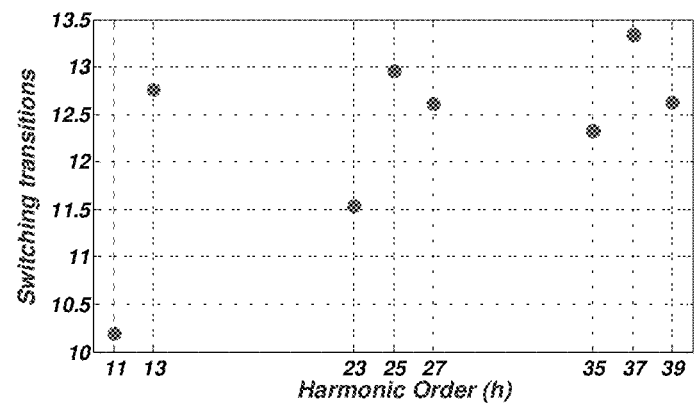
FIG. 23 shows calculated switching transitions in a half-period for a P-cell asymmetric SHCM-PW, according to an embodiment of the subject invention.

FIG. 23 shows the calculated maximum switching transitions in a half-period for a P-cell asymmetric SHCM-PWM based on (38) for different harmonic orders. The 37$^{th}$ harmonic requires the highest number of calculated transitions (13.4). Based on (38) and FIG. 23, because 12 is the largest even number below 13.4, the initial K of the asymmetric SHCM-PWM to solve (32) should be 12. K should always be an even number and can be further reduced as long as (32) has solutions during the optimization process.

After finding all of these important parameters for (32), for four-quadrant active and reactive power operation in FIG. 1, the desired modulation index $M_a$ and the initial phase $\theta_o$ of the CHB voltage are $$M_a = \left| \frac{\sqrt{2}\,V_{ac-Grid-1} \angle 0 - (R + j\omega_o L)\sqrt{2}\,I_{in-1} \angle \theta_{in}}{4V_{dc}/\pi} \right| \quad (39)$$

$$\theta_o = \arg\left( \frac{\sqrt{2}\,V_{ac-Grid-1} \angle 0 - (R + j\omega_o L)\sqrt{2}\,I_{in-1} \angle \theta_{in}}{4V_{dc}/\pi} \right) \quad (40)$$

where $\theta_m$ is the desired phase of the fundamental AC current.

Figure 24:
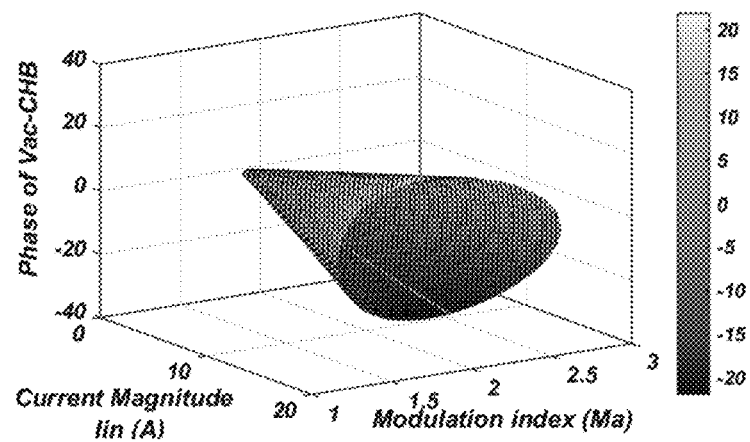
FIG. 24 shows solutions of the calculated phase and modulation index for the disclosed PS-PWM and asymmetric SHCM-PWM technique in four-quadrant active and reactive power operation, according to an embodiment of the subject invention.

FIG. 24 shows the calculated phases and modulation indices based on (39) and (40) for the four-quadrant active and reactive power operation PS-PWM and asymmetric SHCM-PWM technique when the magnitude of the AC current changes between 0 A and 20 A and the phase of the AC current changes between 0° and 360°.

Figure 25:
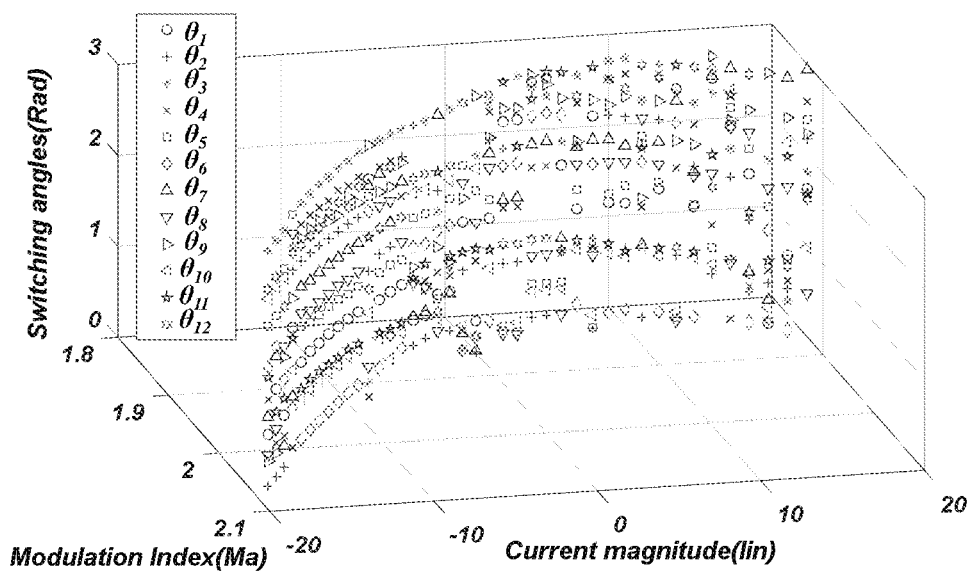
FIG. 25 shows solutions of the hybrid PS-PWM and asymmetric SHCM-PWM technique, according to an embodiment of the subject invention.

Due to the difficulties of showing all of the switching angle solutions for different current magnitudes and phases, FIG. 25 only shows sample solutions for 41 operating points of the hybrid PS-PWM and asymmetric SHCM-PWM technique, when the phase $\theta_{in}$ of the fundamental current is in phase or out of phase with the phase $\theta_{grid}$ of the fundamental grid voltage and the current magnitude $i_{in-1}(t)$ varies between 0 A and 20 A and is in phase or out of phase with $v_{ac-Grid-1}(t)$. The actual solutions of the technique are in a wide modulation index range as in FIG. 24.

Dynamic Response Analysis of the Grid-Tied Converters
The General Best and Worst Conditions of the Dynamic Response Due to the Fundamental Frequency for the Grid-Tied Converters To analyze the dynamic response of the grid-tied converters when the active and reactive power is changed, the time-domain equation of the AC input current ($i_{in}(t)$) which is derived during dynamic conditions is used as shown below, $$\Delta i_{in-1}(t) = c_1 e^{-\frac{R}{L}t} + (\Delta I_{in-1-d}\sin(\omega t) + \Delta I_{in-1-q}\cos(\omega t)) \quad (41)$$

where $\Delta I_{in-1-d}$ and $\Delta I_{in-1-q}$ are the change of the active and reactive current that is applied to the grid-tied converter. Also, L and R are the coupling inductance and the parasitic resistance of the coupling inductance. The term $c_1$ is the transient response constant for the fundamental frequency and can be obtained by the following equation, $$c_1 = -e^{\frac{R}{L}t_0}(\Delta I_{in-1-d}\sin(\omega t_0) + \Delta I_{in-1-q}\cos(\omega t_0)) \quad (42)$$

where $t_0$ is the time instant that $\Delta I_{in-1-q}$ and $\Delta I_{in-1-d}$ are applied to the grid-tied converter. As analyzed in [18],[19], to have a transient-free dynamic response based on (42), when $\sin(\omega t_0)$ is equal to zero, the active current ($\Delta I_{in-1-d}$) should be changed, and when $\cos(\omega t_0)$ is zero, the reactive current ($\Delta I_{in-1-q}$) should be changed. These conditions can be summarized as, $$\begin{cases} \Delta I_{in-1-d} \text{ should be changed} \to k\pi \\ \Delta I_{in-1-q} \text{ should be changed} \to k\pi + \frac{\pi}{2} \end{cases} \quad (43)$$

The above conditions are not the general condition (it is just one solution of (42) which can be used to change the active and reactive current twice in a fundamental period for the grid-tied converters. However, this reduces the speed of changing the AC current. To find a single time instant, (42) should be equal to zero as shown in (44), $$\frac{\Delta I_{in-1-q}}{\Delta I_{in-1-d}} = -\tan(\omega t_0) \to \omega t_0 = \tan^{-1}\left(-\frac{\Delta I_{in-1-q}}{\Delta I_{in-1-d}}\right). \quad (44)$$

From (44) it can conclude that when the active and reactive current is decided to be changed by the controller, there is only a single time instant where the AC current can be changed. If the active and reactive current is changed at the time instant that is derived in (44), the current does not show any transient DC offset. Otherwise, a huge DC offset is generated which can saturate the coupling inductor or cause serious issues for the controller or damage solid-state switches. The conditions that are obtained in (43) can be derived from (44).

The solution of (44) gives the best scenario for changing the active and reactive current of the grid-tied converters. However, there is also the worst scenario for changing the active and reactive current for the grid-tied converters. To find the worst scenario of the transient response of the grid-tied converter, the maximum of (42) can be found based on the first derivative of (42), $$\frac{dc_1}{dt_0} = 0 \Rightarrow -\frac{R}{L}e^{\frac{R}{L}t_0}(\Delta I_{in-1-d}\sin(\omega t_0) + \Delta I_{in-1-q}\cos(\omega t_0)) - \quad (45)$$
$$e^{\frac{R}{L}t_0}(\Delta I_{in-1-d}\omega\cos(\omega t_0) - \Delta I_{in-1-q}\omega\sin(\omega t_0)) = 0$$

By using some mathematical manipulation, the following time instant can be found for the worst scenario of changing the active and reactive current of the grid-tied converters, $$\omega t_0 = \tan^{-1}\left(\frac{\left(\frac{R}{L}\Delta I_{in-1-q} + \omega\Delta I_{in-1-d}\right)}{\left(-\frac{R}{L}\Delta I_{in-1-d} + \omega\Delta I_{in-1-q}\right)}\right) \quad (46)$$

To prove that (46) derives the worst scenario of the dynamic response of the grid-tied converters for the fundamental frequency, the second derivative of (42) also should be checked as follow, $$\frac{d^2c_1}{dt_0^2} = -\left(\frac{R}{L}\right)^2 e^{\frac{R}{L}t_0}(\Delta I_{in-1-d}\sin(\omega t_0) + \Delta I_{in-1-q}\cos(\omega t_0)) - \quad (47)$$
$$\left(\frac{R}{L}\right)^2 e^{\frac{R}{L}t_0}(\omega\Delta I_{in-1-d}\cos(\omega t_0) - \omega\Delta I_{in-1-q}\sin(\omega t_0)) -$$
$$\left(\frac{R}{L}\right)^2 e^{\frac{R}{L}t_0}(\omega\Delta I_{in-1-d}\cos(\omega t_0) - \omega\Delta I_{in-1-q}\sin(\omega t_0)) -$$
$$e^{\frac{R}{L}t_0}(-\omega^2\Delta I_{in-1-d}\sin(\omega t_0) - \omega^2\Delta I_{in-1-q}\cos(\omega t_0)).$$

From (47), it can conclude that the first and second lines are equal to zero based on (45). So, the second derivative of (47) when the first derivative in (45) is equal to zero can be simplified as, $$\frac{d^2c_1}{dt_0^2} = -\left(\frac{R}{L}\right)e^{\frac{R}{L}t_0}(\omega\Delta I_{in-1-d}\cos(\omega t_0) - \omega\Delta I_{in-1-q}\sin(\omega t_0)) - \quad (48)$$
$$e^{\frac{R}{L}t_0}(-\omega^2\Delta I_{in-1-d}\sin(\omega t_0) - \omega^2\Delta I_{in-1-q}\cos(\omega t_0)).$$

Replacing $\omega t_0$ which is obtained in (46) in (48) and using some mathematical manipulations, the following equation can be obtained for the second derivative of $c_1$, $$\frac{d^2c_1}{dt_0^2} = -\omega e^{\frac{R}{L}t_0}\cos(\omega t_0) \quad (49)$$
$$\left(\frac{\left(\frac{R}{L}\Delta I_{in-1-d} - \omega\Delta I_{in-1-q}\right)^2 + \left(\frac{R}{L}\Delta I_{in-1-q} + \omega\Delta I_{in-1-d}\right)^2}{\frac{R}{L}\Delta I_{in-1-d} - \omega\Delta I_{in-1-q}}\right).$$

As shown in (49), the second derivative of $c_1$ is not equal to zero when the first derivative in (46) is equal to zero. As shown in Table II, when the second derivative in (49) is positive and the reactive and active current is changed based on (46), the transient DC response shows the maximum negative DC transient offset (local minimum). Otherwise, when the second derivative in (49) is negative and the reactive and active current is changed based on (46), the DC transient response shows the maximum positive DC transient offset (local maximum).

Table II below shows status of the worst scenario of the dynamic response for the fundamental frequency of the AC current based on the second derivative in (49).

TABLE II

| Time instant of the dynamic response | The condition of the dynamic response | DC offset status |
|---|---|---|
| $-\pi/2 \leq \omega t_0 \leq \pi/2$ | $\frac{\Delta I_{in-1-d}}{\Delta I_{in-1-q}} > \frac{\omega L}{R}$ | Local maximum |
| | $\frac{\Delta I_{in-1-d}}{\Delta I_{in-1-q}} < \frac{\omega L}{R}$ | Local minimum |
| $\pi/2 \leq \omega t_0 \leq 3\pi/2$ | $\frac{\Delta I_{in-1-d}}{\Delta I_{in-1-q}} > \frac{\omega L}{R}$ | Local minimum |
| | $\frac{\Delta I_{in-1-d}}{\Delta I_{in-1-q}} < \frac{\omega L}{R}$ | Local maximum |

The Dynamic Response of Low Frequency Modulation Techniques

The low-frequency modulation techniques have two issues during the dynamic conditions. The first issue is the time delays of the low-frequency modulation techniques to obtain the modulation index from the sinusoidal waveform by using the fast Fourier transform (FFT) as discussed. To solve this issue, the high-frequency modulation technique (PS-PWM) is used in for all of the cells of the CHB converter during the transient period. However, the normal solution range of the PS-PWM technique is lower than the asymmetric SHCM-PWM technique. So, in some ranges, the PS-PWM technique cannot control the active and reactive current. To solve this issue, a hybrid PS-PWM and asymmetric SHCM-PWM technique is presented. To estimate the modulation index of the low-frequency asymmetric SHCM-PWM technique when a dynamic response is required by the controller, the following equation which is derived from the phasor diagram can be used, $$\Delta V_{ac-CHB-1} = (R\Delta I^*_{in-1-d} - \omega L \Delta I^*_{in-1-q}) + j(R\Delta I^*_{in-1-q} + \omega L \Delta I^*_{in-1-d}), \quad (50)$$

$$M_{a-new} = \frac{\pi|\Delta V_{ac-CHB-1}|}{4V_{dc}} + M_{a-old}, \quad (51)$$

$$\angle(V_{ac-CHB-1-new}) = \angle(\Delta V_{ac-CHB-1}) + \angle(V_{ac-CHB-1-old}), \quad (52)$$

where $\Delta I_{in-1-d}^*$ and $\Delta I_{in-1-q}^*$ are the references of the active and reactive current and $M_{a-new}$ and $M_{a-old}$ are the modulation indices of the CHB converter after and before the dynamic response, respectively. Also, $V_{ac-CHB-1-new}$ and $V_{ac-CHB-1-old}$ are the fundamental CHB voltage after and before applying the dynamic response, respectively. Although the equations in (50-52) depend on the parameters of the passive filter, they estimate the new modulation index fast during dynamic conditions.

The second issue of the low-frequency modulation techniques (which is also existed for the high-frequency modulation techniques) is the DC offset which is generated due to the low-order harmonics of the AC current. For analyzing the effects of low-order current harmonics, the equations of (51) and (52) can also be rewritten for the harmonics of $\Delta i_{in}(t)$, when it is assumed that the changes of grid voltage harmonics are negligible when the dynamic response is applied to the grid-tied converter, $$\Delta i_{in-h}(t) = c_h e^{-\frac{R}{L}t} + (\Delta I_{in-h-d}\sin(h\omega t) + \Delta I_{in-h-q}\cos(h\omega t)) \quad (53)$$

$$c_h = -e^{\frac{R}{L}t_0}(\Delta I_{in-h-d}\sin(h\omega t_0) + \Delta I_{in-1-q}\cos(h\omega t_0)) \quad (54)$$

where $c_h$ is the constant for hth order of the transient component of the AC current and $\Delta I_{in-h-q}$ and $\Delta I_{in-h-d}$ are the changes of the hth order harmonic of the q and d components of the AC current. As analyzed in (54), for the hth order harmonic of the AC current, the best scenario for changing the current harmonic is obtained when the $c_h$ is equal to zero as follows, $$c_h = 0 \Rightarrow \omega t_0 = \frac{1}{h}\tan^{-1}\left(-\frac{\Delta I_{in-h-q}}{\Delta I_{in-h-d}}\right), \quad (55)$$

Also, for the worst scenario of the DC transient response due to the current harmonics of the grid-tied converter, similar to (26) the following equation can be obtained by deriving (34) as follows, $$\frac{dc_h}{dt_0} = 0 \rightarrow \omega t_0 = \frac{1}{h}\tan^{-1}\left(\frac{\frac{R}{L}\Delta I_{in-h-q} + h\omega\Delta I_{in-h-d}}{-\frac{R}{L}\Delta I_{in-h-d} + h\omega\Delta I_{in-h-q}}\right), \quad (56)$$

The time instant that is obtained based on (56) gives the maximum and minimum DC offset of the hth order harmonic similar to (56) and (59). Similar to (59) and Table II, the following equation and Table III can be obtained based on the second derivative of (54) for the worst scenario of the dynamic response for the AC current harmonics, $$\frac{d^2 c_h}{dt_0^2} = -h\omega e^{(\frac{R}{L})t_0}\cos(h\omega t_0) \quad (57)$$

$$\left(\frac{\left(\frac{R}{L}\Delta I_{in-1-d} - h\omega\Delta I_{in-1-q}\right)^2 + \left(\frac{R}{L}\Delta I_{in-1-q} + h\omega\Delta I_{in-1-d}\right)^2}{\frac{R}{L}\Delta I_{in-1-d} - h\omega\Delta I_{in-1-q}}\right).$$

TABLE III

Status of the worst scenario of the dynamic response for the AC current harmonics based on the second derivative in (57).

| Time instant of the dynamic response | The condition of the dynamic response | DC offset status |
|---|---|---|
| $-\pi/2 \leq h\omega t_0 \leq \pi/2$ | $\frac{\Delta I_{in-h-d}}{\Delta I_{in-h-q}} > \frac{h\omega L}{R}$ | Local maximum |
|  | $\frac{\Delta I_{in-h-d}}{\Delta I_{in-h-q}} < \frac{h\omega L}{R}$ | Local minimum |
| $\pi/2 \leq h\omega t_0 \leq 3\pi/2$ | $\frac{\Delta I_{in-h-d}}{\Delta I_{in-h-q}} > \frac{h\omega L}{R}$ | Local minimum |
|  | $\frac{\Delta I_{in-h-d}}{\Delta I_{in-h-q}} < \frac{h\omega L}{R}$ | Local maximun |

Figure 26:
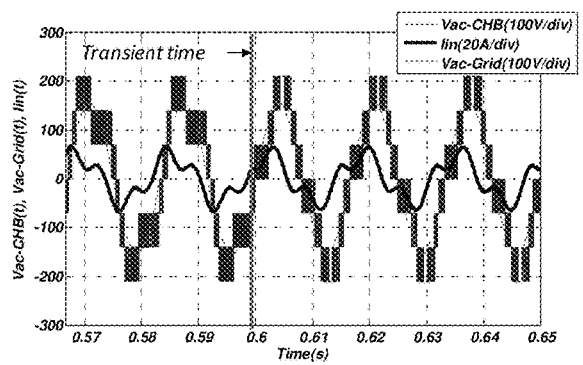
FIGS. 26(a)-(d) illustrate time-domain waveforms during dynamic response for the fundamental and $3^{rd}$ order of current harmonic, (a) best scenario for $3^{rd}$ order current harmonic dynamic response, (b) worst scenario for $3^{rd}$ order current harmonic dynamic response, (c) best scenarios of dynamic response for fundamental and $3^{rd}$ order current harmonic, (d) worst scenarios of dynamic response for fundamental and $3^{rd}$ order current harmonic, according to an embodiment of the subject invention.
Figure 26:
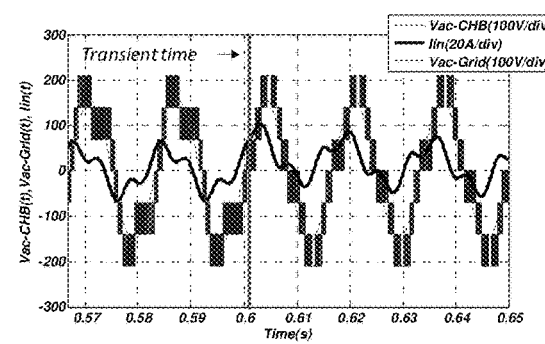
Figure 26:
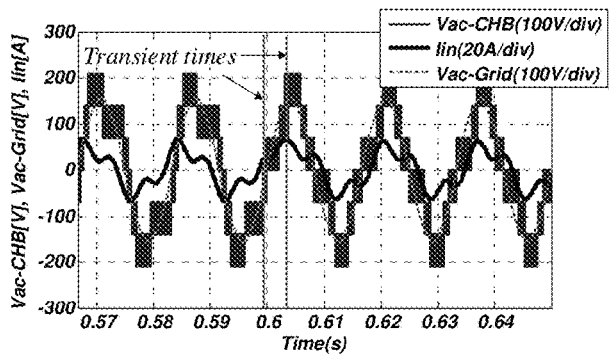
Figure 26:
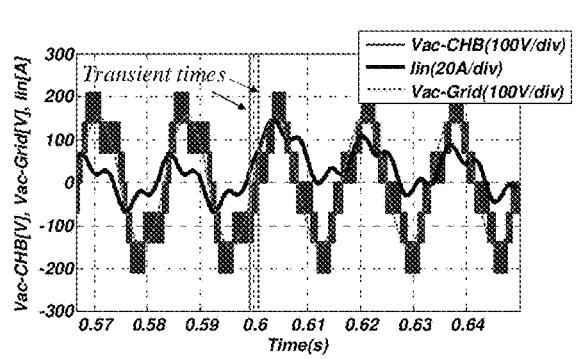

FIGS. 26 (a) and (b) show the time-domain waveforms of the $v_{ac-CHB}(t)$, $v_{ac-Grid}(t)$, and $i_{in}(t)$ when the 3rd order current harmonic is changed from 3+j3[A] to −3−j3[A] and the fundamental frequency current component is kept 7.09∠45° [A] for all of the simulation time. The parameters of the simulation results in FIG. 26 is similar to Table IV. However, all of the cells in FIG. 26 use the PS-PWM technique when the switching frequency of each switch is equal to 3.6 kHz. Also, the inductance is 0.4 pu. FIGS. 26 (a) and (b) show the best and worst scenarios for changing the 3rd order current harmonic based on (55) and (56), respectively. The maximum DC offset for the best and worst scenarios in FIGS. 26 (a) and (b) are equal to 1% and 60%, respectively. FIGS. 26 (c) and (d) show the time-domain waveforms of the $v_{ac-CHB}(t)$, $v_{ac-Grid}(t)$, and $i_{in}(t)$ for the best and worst scenarios of the fundamental (from 7.09∠45[A] to 7.09∠−20 [A]) and the third order current harmonic (from 3+j3[A] to −3−j3[A]), respectively. The maximum DC offset for the best and worst scenarios in FIGS. 26 (c) and (d) are equal to 0.5% and 111%, respectively. These simulations show that even though the PS-PWM technique uses a high-switching frequency to change the 3rd order current harmonic, the DC offset still is available when the fundamental and the low-order current harmonic are changed based on the worst scenarios in (46) and (56). However, in the conventional high-frequency PS-PWM technique due to eliminating almost all of the low-order current harmonics, the DC transient response cannot be seen in the time-domain waveform. Also, changing the current harmonics for the best scenario which is obtained based on (55) is so simple for the PS-PWM technique than the asymmetric SHCM-PWM techniques when the switching frequency is high. The low-frequency modulation techniques have the worst DC transient dynamic response due to having low-order current harmonics with different magnitudes and phases for different modulation indices. So, when the modulation index is changed to control the active and reactive current, a huge DC transient offset can be applied to the CHB converter. Also, the low-frequency modulation techniques have the complexity of finding a solution set when the phases and magnitudes of all low-order harmonics are controlled. To solve this issue, one of the best solutions is modulating some of the cells with a high-frequency modulation technique (such as the PS-PWM) to control the low-order current harmonics based on the best scenario which is obtained in (35) and the rest of the cells modulate with the low-frequency modulation technique to increase the efficiency of the converter. There are two main objectives in the simulation and experimental results for the hybrid PS-PWM and asymmetric SCHM-PWM technique. First, it will be shown the hybrid technique has a high efficiency when the current harmonics meet the requirements of IEEE 519. Also, the dynamic performance of the grid-tied converter will be shown during the time instants that are found for the best and worst scenarios in (54) and (56).

FIG. 27(a) illustrates a control block diagram and FIG. 27(b) shows an indirect controller of the hybrid PS-PWM and asymmetric SHCM-PWM technique, according to an embodiment of the subject invention.

Figure 27:
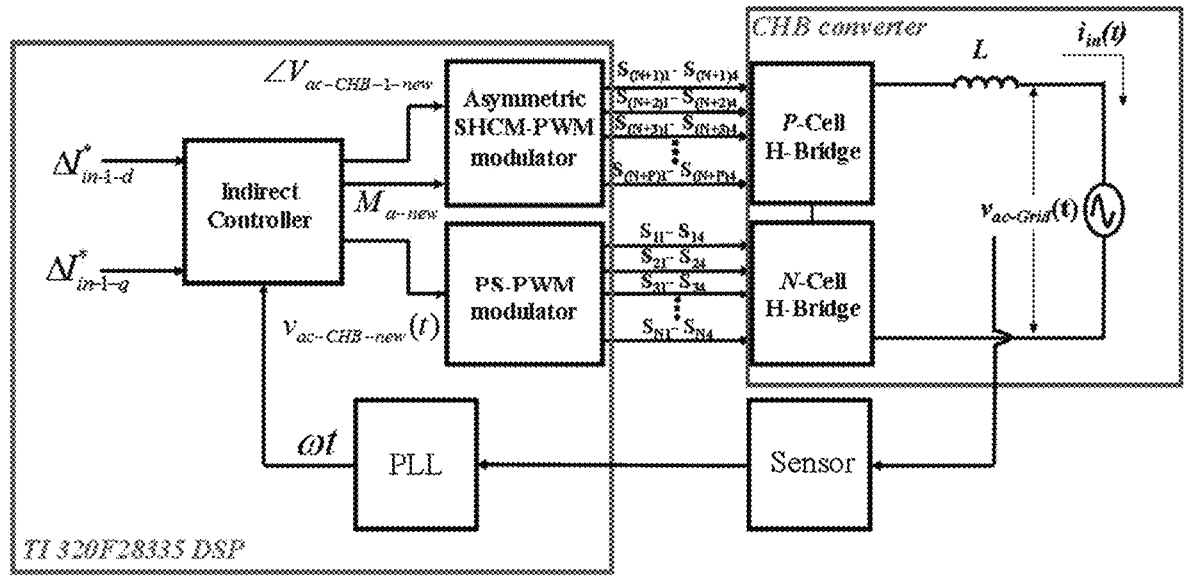
FIG. 27(a) illustrates a control block diagram of, and FIG. 27(b) shows an indirect controller, of the hybrid PS-PWM and asymmetric SHCM-PWM, according to an embodiment of the subject invention.
Figure 27:
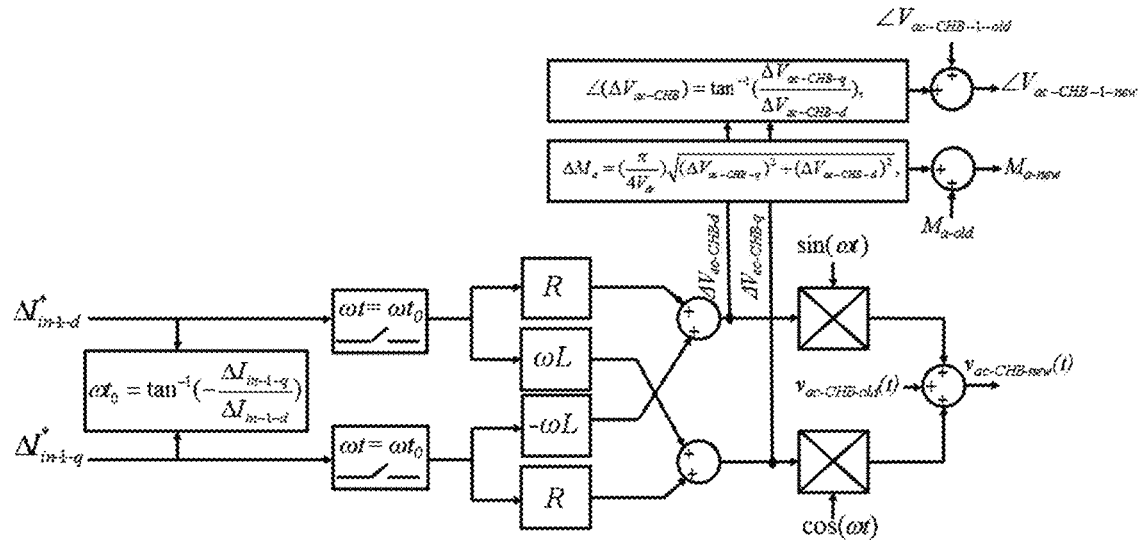

Referring to FIG. 27 (a), the open-loop control block is used to control the active and reactive current of the grid-tied converter based on (54). This control block is similar to the control block which is discussed before. To estimate the modulation index and the phase of the CHB converter (50)-(52) are used in the FIG. 27(b). FIG. 27(a) illustrates the control block diagram used in the simulation and experiment to implement the disclosed transient-free dynamic response with the disclosed hybrid modulation technique. Referring to FIG. 27(a), the switchings of the hybrid ASHCM-PWM and PSPWM technique are applied to control the N+P cells of the grid-tied converter. In addition, FIG. 27(a) also demonstrates how DSP generates the signals based on the measurements that are applied to the grid-tied converter.

FIG. 27(b) shows the indirect control block in the FIG. 27(a) which is used in simulation and experiment. The relationships in the block diagrams in FIG. 27(b) are obtained based on the equations (28), (29), (30), and (33). The block diagram in FIG. 27(b) is an open-loop control technique.

Simulation and Experimental Results
Simulation Verification

To verify the analysis and advantages of the hybrid PS-PWM and asymmetric SHCM-PWM technique, simulations were first conducted in MATLAB/Simulink for a grid-tied 3-cell, 7-level CHB converter. The circuit parameters are shown in Table IV. Three simulations were conducted. For the hybrid modulation, one cell uses PS-PWM with 12 switching transitions in a half-period as calculated. 2 cells use asymmetric SCHM-PWM with switching transitions K=10 (the switching angle solutions were found based on (32) when K is reduced from initial 12 to 10) in a half-period. The total number $N_{PSPWM\text{-}ASHCM}$ of switching transitions of the CHB converter is therefore 22. For conventional modulation, PS-PWM is used for three cells and the total number $N_{PSPWM}$ of switching transitions in half period is 24 ($f_s$=24×60=1440 Hz) based on (45) and (46).

TABLE IV

Circuit Parameters of a Grid tied Converter in Simulations

| Parameter | Symbol | Value |
| --- | --- | --- |
| Line frequency | $f_o$ | 60 Hz |
| AC grid Voltage (RMS) | $V_{ac\text{-}Grid\text{-}1}$ | 110 V |
| Total rated power | $S_{total}$ | 1.555 kVA |
| Maximum Demand Load (RMS) | $I_L$ | 14.14 A |
| Switching transitions in each half-period $N_{PSPWM\text{-}ASHCM}$ for N = 1, P = 2, | | 22 |
| Switching transitions in each half-period $N_{PSPWM}$ for N = 3, | | 24 |
| Number of H-bridge cells | I | 3 |
| DC bus voltage | $V_{dc}$ | 65 V |
| Coupling inductance | L | 0.363 pu |

In the first simulation, the average modulation index M of all cells is 0.524 and because N+P=3, the total modulation index $M_a$ of the converter is 1.572. The phase of the CHB fundamental voltage is −21.23°. The active and reactive power is 1395 W+635VAR.

Figure 28:
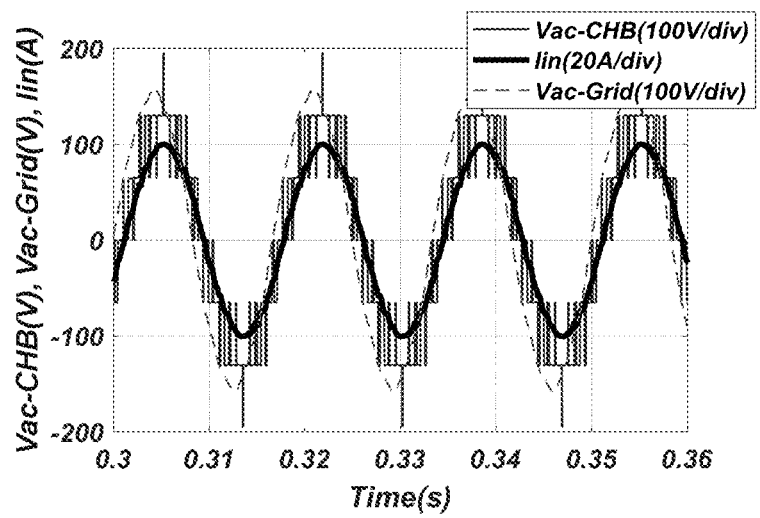
FIGS. 28(a), (c) and (e) illustrate waveform in (a), harmonic spectra in (c), and the minimum inductance in (e) of a conventional PS-PWM.
FIGS. 28(b) and (d) illustrate waveform in (b) and harmonic spectra in (d) of PS-PWM and asymmetric SHCM-PWM technique, according to an embodiment of the subject invention.
Figure 28:
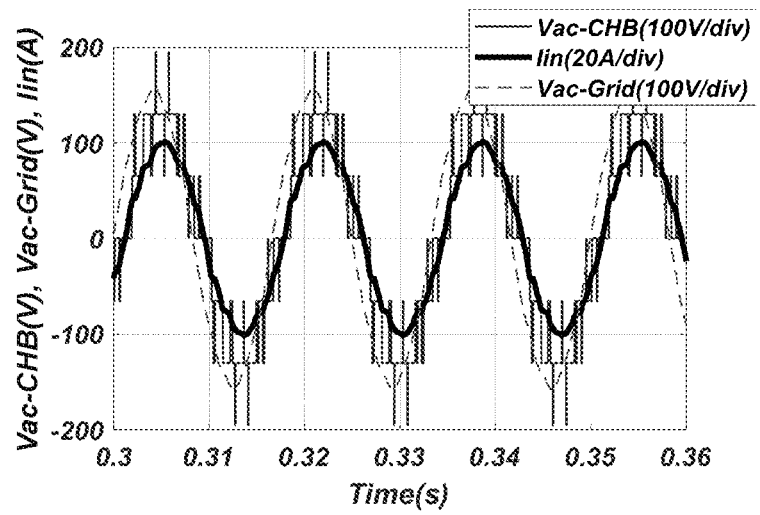
Figure 28:
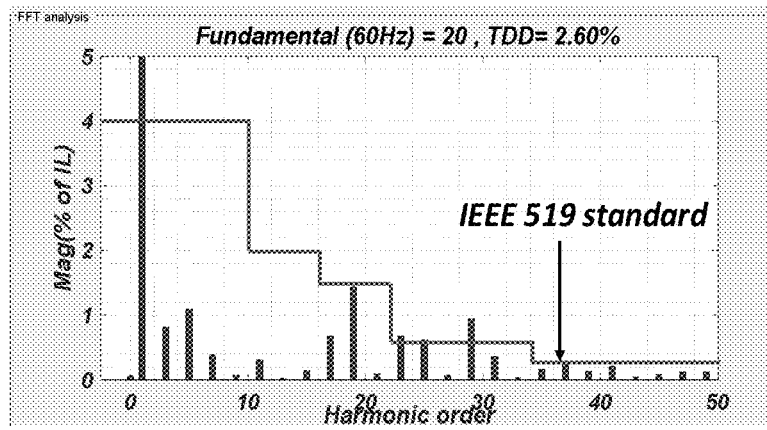
Figure 28:
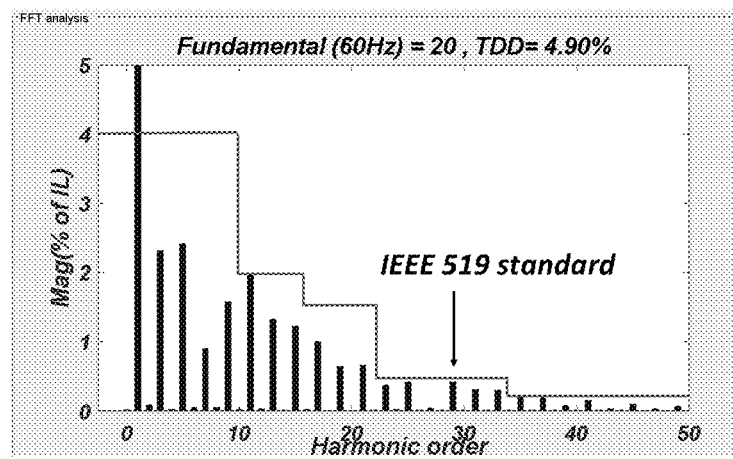
Figure 28:
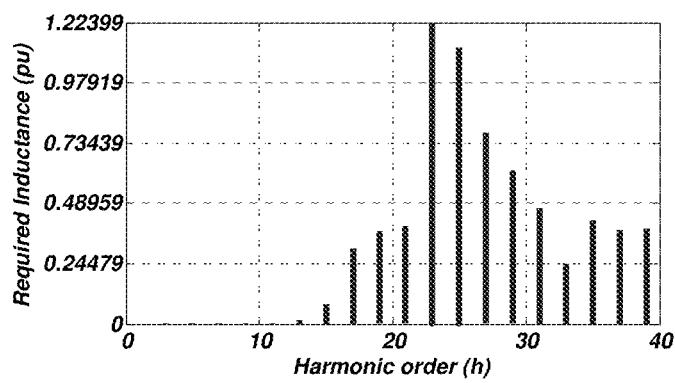

FIG. 28 (a) shows the time-domain waveforms of the grid-tied CHB converter with the conventional PS-PWM and FIG. 28 (b) shows time-domain waveforms of the hybrid PS-PWM and asymmetric SHCM-PWM, respectively. Calculations are based on waveforms of $v_{ac\text{-}CHB}(t)$, $v_{ac\text{-}Grid}(t)$, and $i_{in}(t)$ and the minimum inductance of PS-PWM, when M=0.524 and $\theta_0$=−21.23°. FIG. 28(c) shows the CHB current $i_{in}$ harmonic spectra with the conventional PS-PWM and FIG. 28 (d) shows the CHB current $i_{in}$ harmonic spectra of the hybrid PS-PWM and asymmetric SHCM-PWM respectively. All of the harmonic spectrums in simulation and experimental results are obtained by using the Matlab/Simulink. The red lines in FIGS. 28 (c) and (d) are the current harmonic limits of IEEE 519. As shown in FIG. 28 (c), the 23rd, 25th, 29th, and 37th current harmonics cannot meet the limits. However, as shown in FIG. 28 (d), all the current harmonics up to the $100^{th}$ order meet the limits with the hybrid PS-PWM and asymmetric SHCM-PWM technique although it has a smaller number of switching transitions in each half-period than the conventional PS-PWM technique as shown in Table II. The TDD with the hybrid modulation also meets the TDD limit (TDD≤5%). It is higher than the TDD of the PS-PWM because the objective of (42) is to meet, not to minimize TDD. This gives the hybrid modulation technique more freedom to mitigate more number of harmonics.

FIG. 28 (e) shows the calculated minimum inductance for the conventional PS-PWM at each harmonic to meet harmonic limits. It is shown that at least 1.22 pu inductance is needed to meet all harmonic limits while the hybrid modulation technique uses only 0.363 pu.

In the second simulation, the average modulation index M of all cells is 0.698. The total modulation index $M_a$ of the CHB converter is 2.096. Also, the phase of the CHB fundamental voltage is −3.2°. The active and reactive power is 570 W+32VAR.

Figure 29:
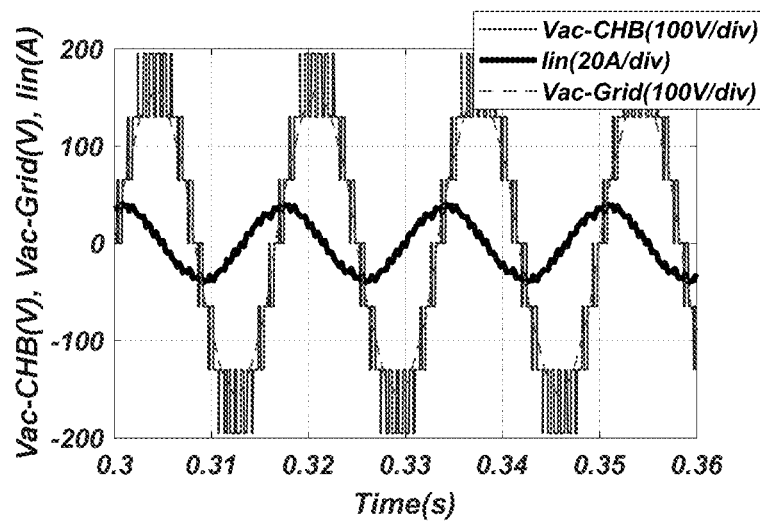
FIGS. 29(a) and (c) illustrate waveform in (a) and harmonic spectra in (b), of a conventional PS-PWM.
FIGS. 29(b) and (d) illustrate waveform in (b) and harmonic spectra in (d) for a hybrid modulation technique, according to an embodiment of the subject invention.
Figure 29:
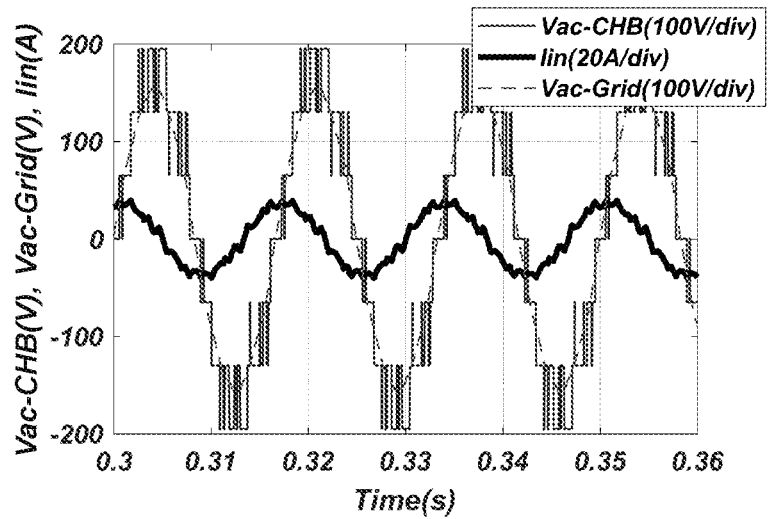
Figure 29:
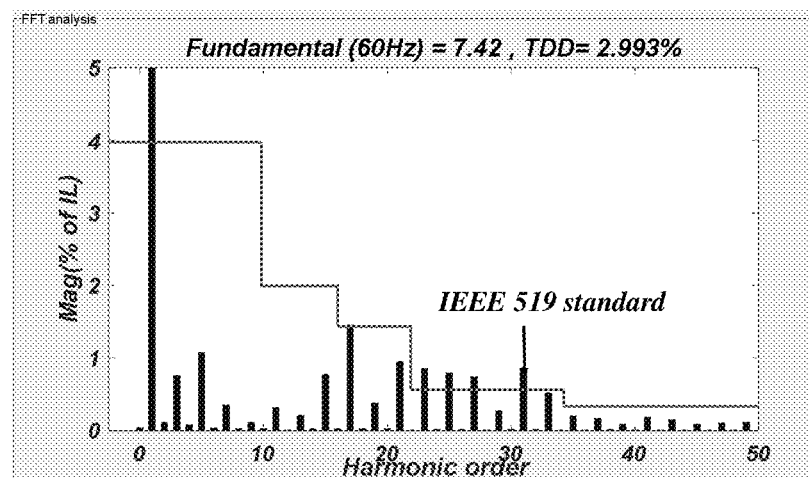
Figure 29:
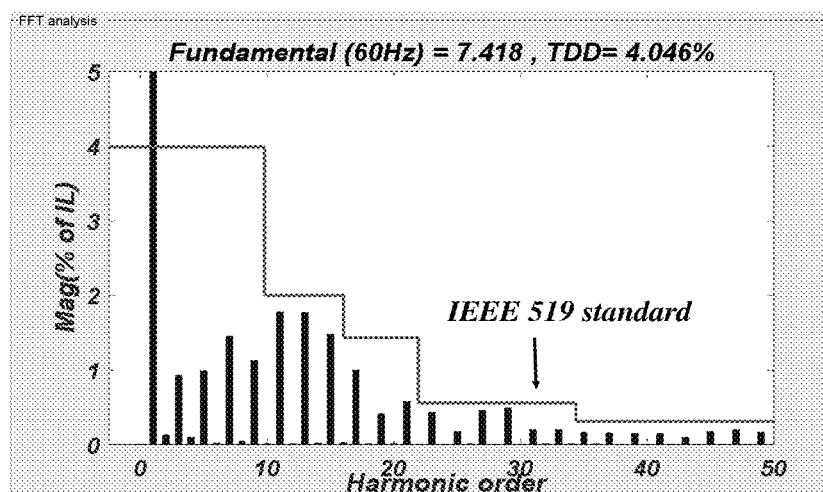

FIG. 29 (a) shows the time-domain waveforms of the CHB converter with the conventional PS-PWM technique. FIG. 29 (b) shows the time-domain waveforms of the CHB converter with the hybrid PS-PWM and asymmetric SHCM-PWM technique. Both waveforms $v_{ac\text{-}CHB}(t)$, $v_{ac\text{-}Grid}(t)$ are calculated when M=0.698 and $\theta_0$=−3.2°. As shown in FIG. 29 (b) there is an asymmetry between each half-period of the AC CHB voltage waveform.

FIG. 29 (c) shows current harmonic spectra $i_{in}(t)$ of the CHB converter for PS-PWM. FIG. 29 (d) shows current harmonic spectra $i_{in}(t)$ of the CHB converter of the hybrid modulation technique. In FIG. 29 (c), the conventional PS-PWM cannot meet the limits for the 23rd, 25th, 27th, and 31st harmonics. However, the hybrid modulation in FIG. 29 (d) can meet all of the current harmonic limits. The TDD of both techniques can meet the TDD limit of IEEE 519 in FIGS. 29 (c) and (d). It is worth to note that in FIGS. 28, 29 and 30, the actual background grid low-order voltage harmonics are considered in the $v_{ac\text{-}Grid}(t)$.

Figure 30:
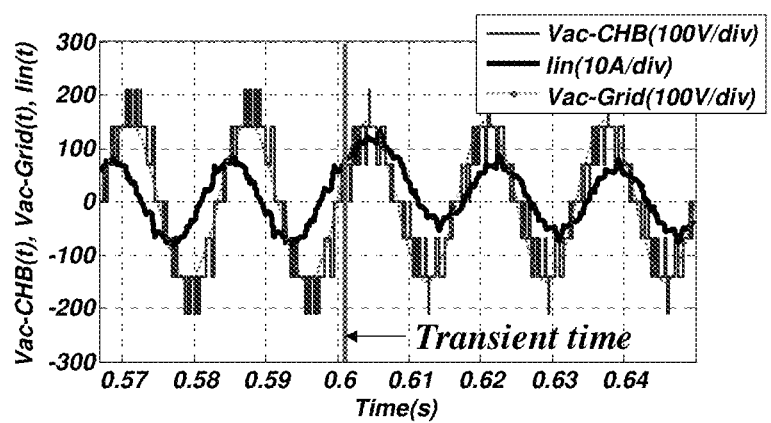
FIGS. 30(a), (b), (c) and (d) illustrate simulation results of the dynamic performance of the hybrid technique, (a) worst scenario, (b) best scenario, (c) current harmonic spectrum, and (d) current harmonic spectrum, according to an embodiment of the subject invention.
Figure 30:
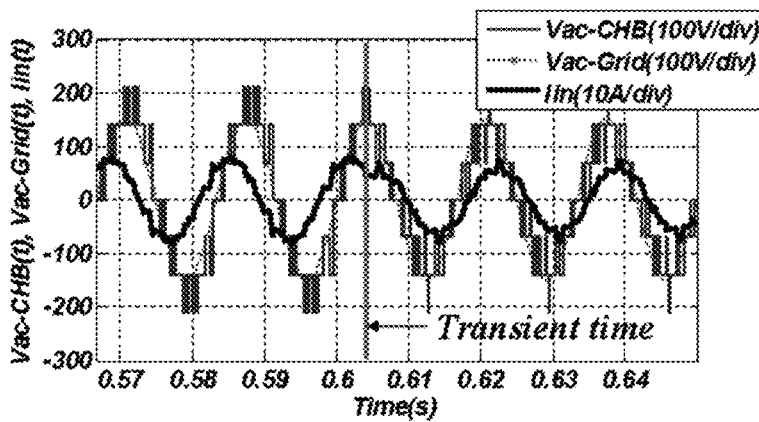
Figure 30:
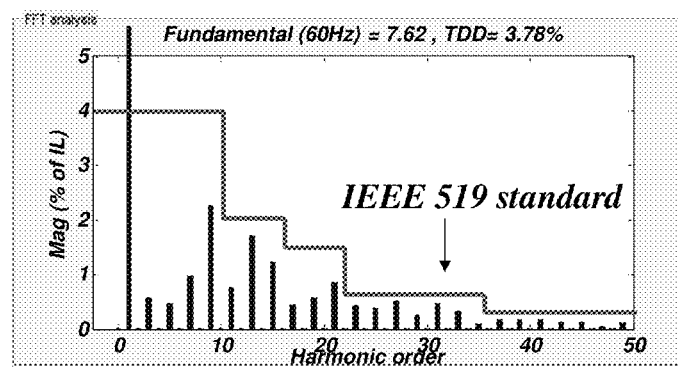
Figure 30:
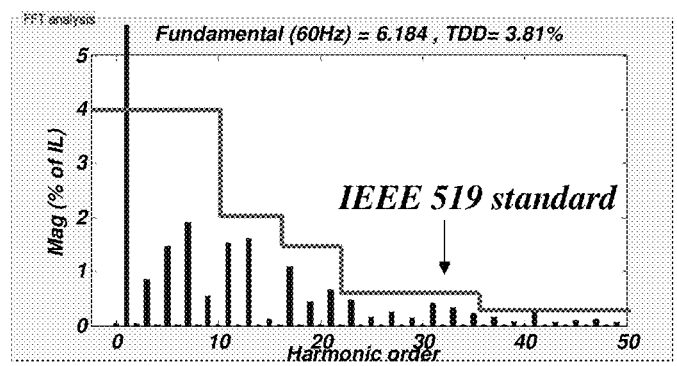

In the last simulation results, the dynamic performance of the hybrid PS-PWM and asymmetric SHCM-PWM technique is shown in FIG. 30 for the best and worst scenarios of (54) and (56) when the input current is changed from 7.09∠45° [A] to 5∠−45° [A]. The inductance L is 0.4 pu and the DC link voltage of each cell is 70V.

In FIG. 30, the dynamic performance of the proposed hybrid PS-PWM and asymmetric SHCM-PWM technique was simulated for the best and worst scenarios of (54) and (56) when the input current is changed from 7.62∠33.8° (A) to 6.184∠−36° (A). The inductance L is 0.484 pu and the DC link voltage of each cell is 70V. FIG. 30(a) shows the time-domain waveforms of $v_{ac\text{-}CHB}(t)$, $v_{ac\text{-}Grid}(t)$, and $i_{in}(t)$ for the worst scenario based on (56). As shown in FIG. 30(a) and Table V, the current has 55.4% transient DC offset. This huge transient DC offset in FIG. 30(a) may damage the solid-state switches or degrade the performance of the controller. It should be pointed out that in the simulations, because the grid has an estimated 0.5Ω grid resistance, it damps the transient response in the worst scenario. If the grid has higher inductance or lower resistance, the transient DC offset can be significantly higher. FIG. 30(b) shows the time-domain waveforms of the grid-tied CHB converter in the best scenario based on (54). The transient DC offset in FIG. 30(b) and Table V is around 8.2%. Condition (54) therefore guarantees small transient DC offset. Although the transient DC offset due to the greatly mitigated harmonics still exists as condition (33) could not be simultaneously met, it is much smaller than that in the worst scenario. FIGS. 30(c) and (d) show the current harmonic spectra of the input currents at 7.62∠33.8° (A) to 6.184∠−36° (A), respectively. All of the current harmonics and the TDD meet the requirements of the IEEE 519.

Experimental Verification

A test 3-cell, 7-level grid-tied CHB converter with the same parameters as in Table IV is developed. In the first experiment, the average modulation index of all cells of the CHB converter is 0.524, and the total modulation index of the converter is 1.572. The phase of the CHB fundamental voltage is −21.23°. The active and reactive power is 1395 W+635VAR.

Figure 31:
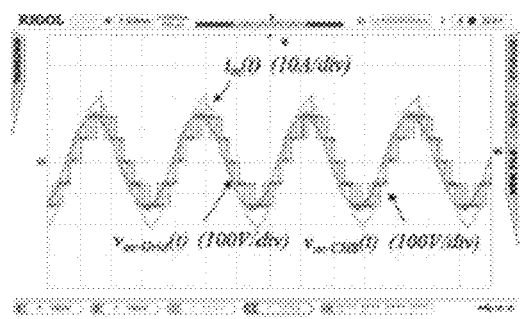
FIGS. 31(a) and (c) illustrate waveforms in (a) and harmonic spectra in (c), of a conventional PS-PWM.
FIGS. 31(b) and (d) illustrate waveforms in (b) and harmonic spectra in (d) for a hybrid modulation technique, according to another embodiment of the subject invention.
Figure 31:
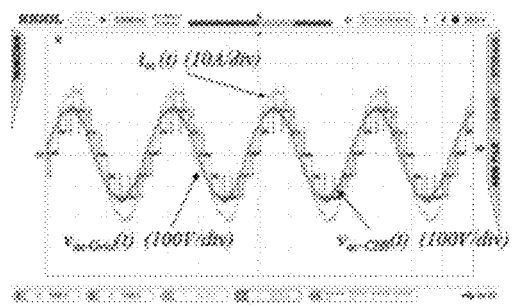
Figure 31:
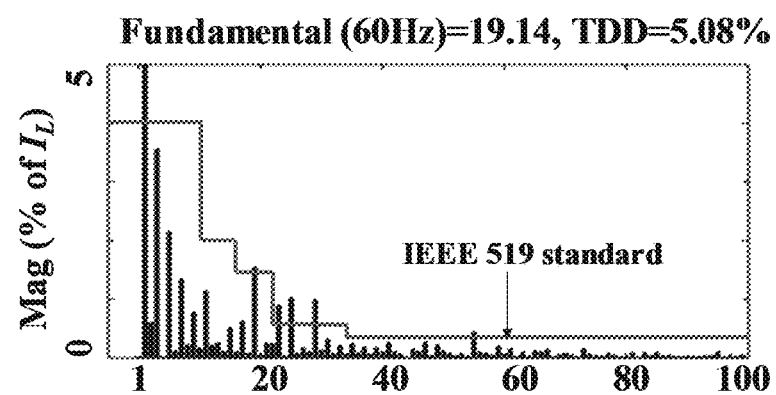
Figure 31:
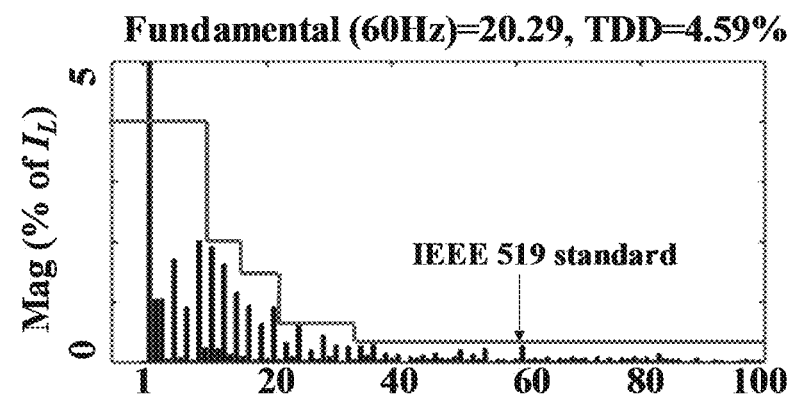

FIGS. 31 (a) and (b) show the time-domain waveforms $v_{ac\text{-}CHB}(t)$, $v_{ac\text{-}Grid}(t)$, and $i_{in}(t)$, when M=0.524 and $\theta_0$= −21.23°, of the grid-tied CHB converter with the conventional PS-PWM technique and the hybrid PS-PWM and asymmetric SHCM-PWM technique, respectively. FIGS. 31 (c) and (d) show the current harmonic spectra of the CHB converter with the conventional PS-PWM technique and the hybrid PS-PWM and asymmetric SHCM-PWM technique. The red lines in FIGS. 31 (c) and (d) are the current harmonic limits of IEEE 519. As shown in FIG. 31 (c), the 19th, 23rd, 25th, 29th, and 55th current harmonics cannot meet the limits of IEEE-519 with the conventional PS-PWM. Different from the simulation in FIG. 28 (c), the TDD with the PS-PWM in FIG. 31 (c) cannot meet the limits of IEEE 519 (TDD≤5%) due to the voltage harmonics of the actual grid. This problem is solved by applying the asymmetric switching angle control technique to the hybrid PS-PWM and asymmetric SHCM-PWM technique. In this technique, the magnitudes and phases of the CHB voltage harmonics are controlled based on the grid voltage harmonics. As a result, the TDD with the hybrid modulation can still meet the TDD limits. As shown in Table IV and FIG. 31 (d), even with the smaller number of switching transitions in the hybrid PS-PWM and asymmetric SHCM-PWM technique than the conventional PS-PWM technique, all the current harmonics up to $100^{th}$ order can meet the limits.

In the second experiment, the average modulation index M of all cells is 0.698 so the total modulation index $M_a$ of the CHB converter is 2.096. The phase of the CHB fundamental voltage is −3.2°. The active and reactive power is 570 W+32VAR.

Figure 32:
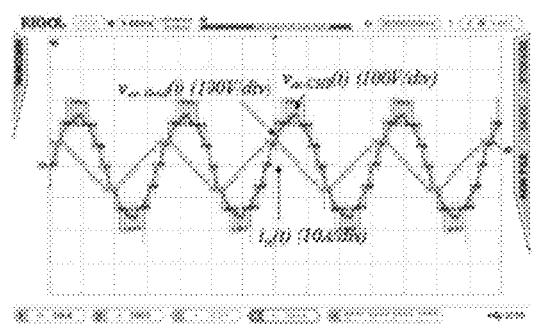
FIGS. 32(a) and (c) illustrate waveforms in (a) and harmonic spectra in (c), of a conventional PS-PWM.
FIGS. 32(b) and (d) illustrate waveforms in (b) and harmonic spectra in (d) for a hybrid modulation technique, according to yet another embodiment of the subject invention.
Figure 32:
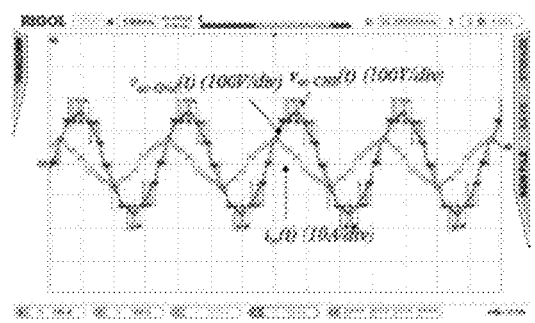
Figure 32:
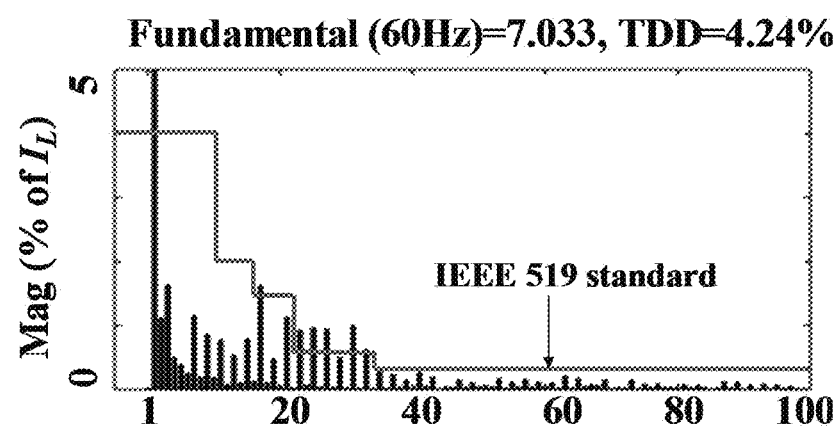
Figure 32:
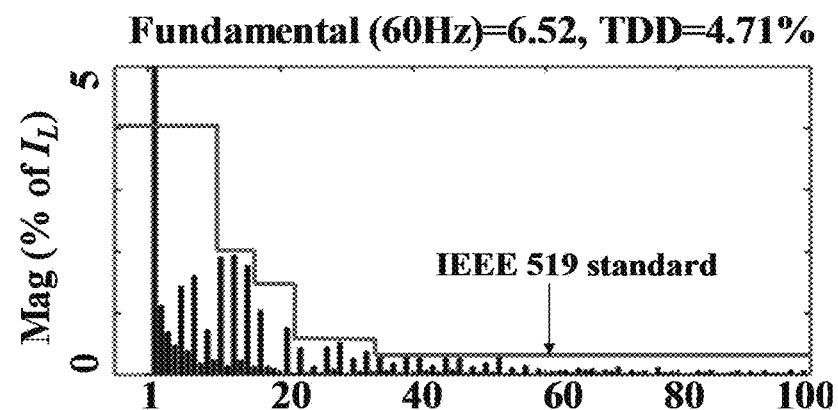

FIGS. 32 (a) and (b) show the time-domain waveforms $v_{ac\text{-}CHB}(t)$, $v_{ac\text{-}Grid}(t)$, of the CHB converter with the conventional PS-PWM technique and the hybrid PS-PWM and asymmetric SHCM-PWM technique, when M=0.698 and $\theta_0$=−3.2°. FIGS. 32 (c) and (d) show the current harmonic spectra of and $i_{in}(t)$ of the CHB converter with the conventional and the hybrid modulation techniques, also when M=0.698 and $\theta_0$=−3.2°. In FIG. 32 (c), the conventional PS-PWM technique cannot meet limits for the 17th, 23rd, 25th, 27th, and $31^{st}$ harmonics. However, the hybrid modulation technique in FIG. 32 (d) meets all of the current harmonic limits. The TDDs of both techniques meet the TDD limit of IEEE 519 in FIGS. 18 (c) and (d).

Figure 33:
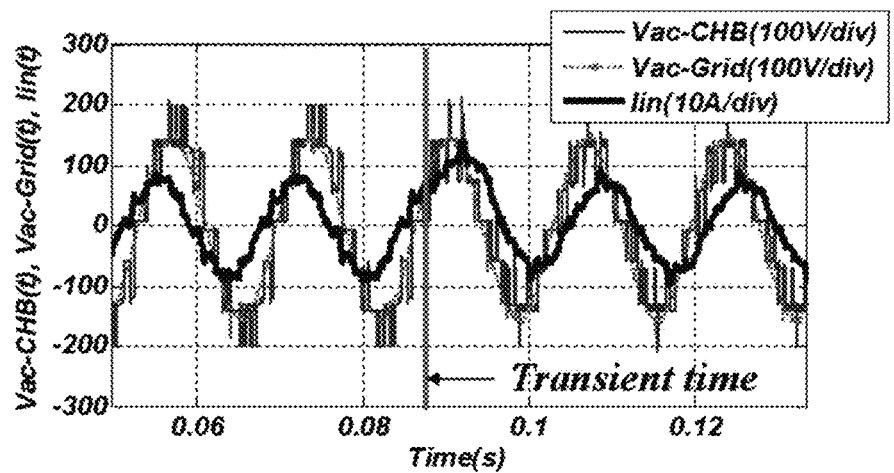
FIGS. 33(a), (b), (c) and (d) show experimental results of the dynamic performance of the hybrid technique, (a) worst scenario, (b) best scenario, (c) current harmonic spectrum, and (d) current harmonic spectrum, according to another embodiment of the subject invention.
Figure 33:
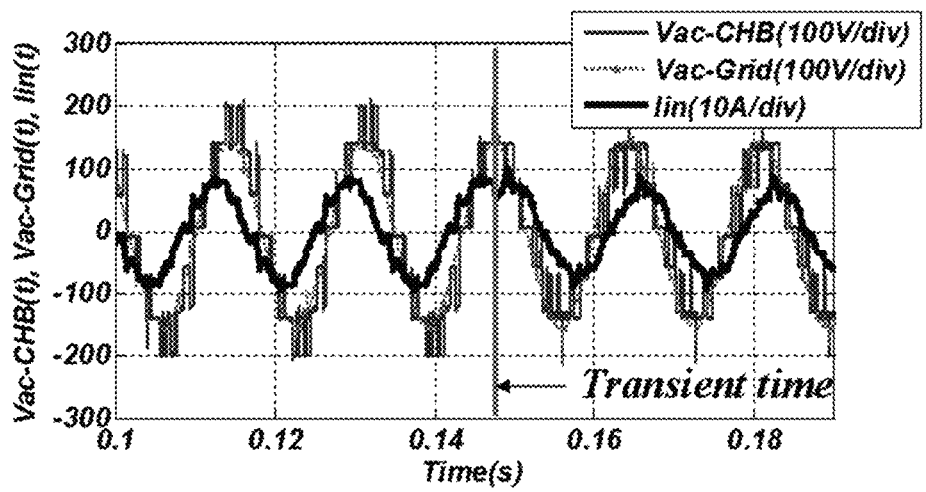
Figure 33:
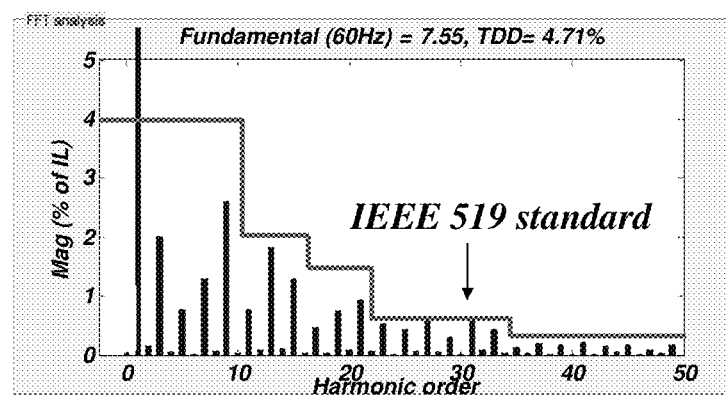
Figure 33:
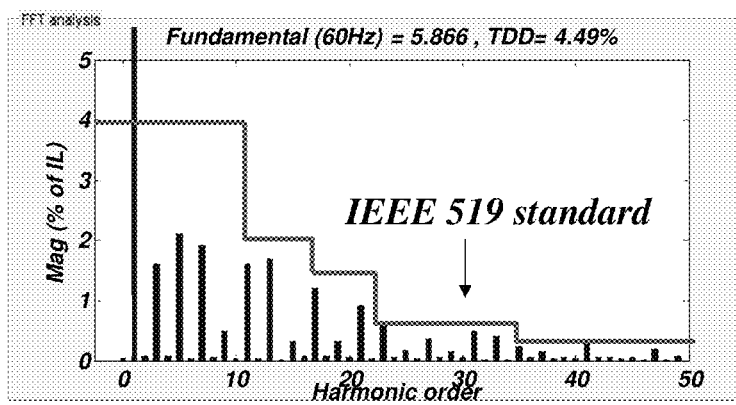

In the last experiment, the dynamic performance of the proposed hybrid PS-PWM and asymmetric SHCM-PWM technique is tested and compared in FIG. 33 for the best and worst scenarios of (54) and (56) when the input current is changed from 7.62∠33.8° (A) to 6.184∠−36° (A). The inductance L is 0.484 pu and the DC link voltage of each cell is around 70V. FIG. 19 (a) shows the time-domain waveforms of $v_{ac\text{-}CHB}(t)$, $v_{ac\text{-}Grid}(t)$, and $i_{in}(t)$ for the worst scenario of the dynamic performance based on (56). As shown in FIG. 19(a) and Table V, the current has 46% transient DC offset which is close to the DC transient in the simulation result. The estimated grid resistance is 0.5Ω and it damps the DC transient in the worst scenario. If the grid has higher inductance or lower resistance, the DC transient can be significantly higher. FIG. 33 (b) shows the time-domain waveforms of the grid-tied CHB converter in the best scenario based on (54). The transient DC offset in FIG. 33 and Table V is around 6.8%. This value is also close to the simulated transient DC offset in FIG. 33 (b). FIGS. 33 (c) and (d) show the current harmonic spectra of the input currents at 7.62∠33.8° (A) to 6.184∠36° (A), respectively. All of the current harmonics and the TDD meet the requirements of IEEE 519.

TABLE V

Comparison of transient DC offsets from simulations and experiments in FIGS. 29 and 33.

| Dynamic response | best scenario | worst scenario |
| --- | --- | --- |
| Simulation result in FIG. 29 | 8.2% | 55.4% |
| Experimental result in Fig. | 6.8% | 46% |

In summary, a hybrid PS-PWM and asymmetric SHCM-PWM technique is disclosed for cascaded multilevel converters. The technique utilizes asymmetric SHCM to mitigate the harmonics generated from PS-PWM to meet harmonic limits with a smaller number of switching transitions and smaller inductance than the conventional PS-PWM technique. Technique and guideline were developed for the designing of critical parameters, such as coupling inductance and the number of switching transitions, for the hybrid PS-PWM and asymmetric SHCM-PWM technique. Moreover, the dynamic performance of the grid-tied converter was discussed. As shown there are the best and worst scenarios for changing the fundamental and harmonics of AC current. As proven by simulation and experimental results, if the converter could change the AC current in the best scenarios for the fundamental and harmonics, the AC current does not show any DC transient response. Finally, the hybrid PS-PWM and asymmetric SHCM-PWM technique can meet both harmonic and TDD limits of IEEE 519 with a smaller number of switching transitions and smaller inductance than the conventional PS-PWM technique.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section, if present) are incorporated by reference in their entirety, including all figures and tables, to the extent they are not inconsistent with the explicit teachings of this specification.

REFERENCES

[1] Khomfoi, S., and Tolbert, L. M.: 'Multilevel Power Rectifiers', Power Electronics Handbook, The University of Tennessee, Department of Electrical and Computer Engineering, Knoxville, Tenn., USA.

[2] Dahidah, M. S. A.; Konstantinou, G.; Agelidis, V. G., "A Review of Multilevel Selective Harmonic Elimination PWM: Formulations, Solving Algorithms, Implementation and Applications," in *Power Electronics, IEEE Transactions on*, vol. 30, no. 8, pp. 4091-4106, August 2015.

[3] L. He, J. Xiong, H. Ouyang, P. Zhang and K. Zhang, "High-Performance Indirect Current Control Scheme for Railway Traction Four-Quadrant Converters," in IEEE Transactions on Industrial Electronics, vol. 61, no. 12, pp. 6645-6654, December 2014.

[4] Watson, A. J.; Wheeler, P. W.; Clare, J. C., "A Complete Harmonic Elimination Approach to DC Link Voltage Balancing for a Cascaded Multilevel Rectifier," in *Industrial Electronics, IEEE Transactions on*, vol. 54, no. 6, pp. 2946-2953, December 2007.

[5] Franquelo, L. G., Napoles, J., Guisado, R. C. P., Leon, J. I., and Aguirre, M. A.: 'A Flexible Selective Harmonic Mitigation Technique to Meet Grid Codes in Three-Level PWM Rectifiers' Industrial Electronics, IEEE Transactions on, December 2007, vol. 54, no. 6, pp. 3022-3029.

[6] A. Moeini, H. Zhao, and S. Wang "A Current Reference based Selective Harmonic Current Mitigation PWM Technique for Cascaded H-bridge Multilevel Active Rectifiers with Small Coupling Inductance, Extended Harmonic Reduction Spectrum and the Ability to Reduce the Harmonic Currents due to Grid Voltage Harmonics" IEEE Transaction on Industrial Electronics, 2017.

[7] A. Moeini, Z. Hui and S. Wang, "High efficiency, hybrid Selective Harmonic Elimination phase-shift PWM technique for Cascaded H-Bridge inverters to improve dynamic response and operate in complete normal modulation indices," 2016 IEEE Applied Power Electronics Conference and Exposition (APEC), Long Beach, C A, 2016, pp. 2019-2026.

[8] H. Zhao and S. Wang, "A four-quadrant modulation technique for Cascaded Multilevel Inverters to extend solution range for Selective Harmonic Elimination/Compensation," 2016 IEEE Applied Power Electronics Conference and Exposition (APEC), Long Beach, C A, 2016, pp. 3603-3610.

[9] A. Moeini, H. Iman-Eini and M. Bakhshizadeh, "Selective harmonic mitigation-pulse-width modulation technique with variable DC-link voltages in single and three-phase cascaded H bridge inverters," in IET Power Electronics, vol. 7, no. 4, pp. 924-932, April 2014.

[10] S. Wang, R. Crosier and Y. Chu, "Investigating the power architectures and circuit topologies for megawatt superfast electric vehicle charging stations with enhanced grid support functionality," *Electric Vehicle Conference (IEVC)*, IEEE International, Greenville, S.C., 2012, pp. 1-8.

[11] IEEE Std 519, IEEE Recommended Practices and Requirements for Harmonic Control in Electrical Power Systems, New York.

[12] Reyes-Sierra, Margarita, and CA Coello Coello. "Multi-objective particle swarm optimizers: A survey of the state-of-the-art." *International journal of computational intelligence research* 2.3 (2006): 287-308.

[13] V. G. Agelidis, A. I. Balouktsis and M. S. A. Dahidah, "A Five-Level Symmetrically Defined Selective Harmonic Elimination PWM Strategy: Analysis and Experimental Validation," in *IEEE Transactions on Power Electronics*, vol. 23, no. 1, pp. 19-26, January 2008.

[14] Holmes, D. G. and T. A. Lipo (2003). Pulse Width Modulation for Power Converters: Principles and Practice, John Wiley & Sons.

What is claimed is:

1. A hybrid Cascaded H-Bridge (CHB) converter, comprising:
a selective harmonic current mitigation pulse width modulation (SHCM-PWM) unit coupled to an input current and providing an output signal $SW_{SHCM}$;
a phase shift pulse width modulation (PSPWM) unit coupled to the input current and providing an output signal $SW_{PS}$; and
a CHB converter selectively coupled to the SHCM-PWM unit and the PSPWM unit,
wherein the CHB converter is coupled to the SHCM-PWM unit under steady state condition and the CHB converter is coupled to the PSPWM unit under dynamic condition; and wherein the input current includes an active current reference $\Delta I^*_{in-d}$ and a reactive current reference $\Delta I^*_{in-q}$, and the CHB converter is selectively coupled to the SHCM-PWM unit and the PSPWM unit based on the active current reference $\Delta I^*_{in-d}$ and the reactive current reference.

2. The hybrid CHB converter according to claim 1, wherein the CHB converter is coupled to the PSPWM unit under transient condition.

3. The hybrid CHB converter according to claim 1, wherein the CHB converter is selectively coupled to the PSPWM unit in case the input current satisfies the following Formula 1:

$$|\Delta I^*_{in-d}|>0 \ \& \ \omega t=k\pi, \text{ until } \omega t=(k+2)\pi. \quad \text{Formula 1}$$

4. The hybrid CHB converter according to claim 3, wherein the CHB converter is selectively coupled to the PSPWM unit in case the input current satisfies the following Formula 2:

$$|\Delta I^*_{in-d}|>0 \ \& \ \omega t=k\pi+\pi/2, \text{ until } \omega t=(k+2)\pi. \quad \text{Formula 2}$$

5. The hybrid CHB converter according to claim 4, wherein the CHB converter is selectively coupled to the SHCM-PWM unit in all cases where the input current does not satisfy either of Formula 1 and Formula 2.

6. The hybrid CHB converter according to claim 1, further comprising an indirect controller coupled to the input current and providing an output current $v_{ac\text{-}CHB2}$ to the SHCM-PWM unit and the PSPWM unit.

7. A hybrid Cascaded H-Bridge (CHB) converter, comprising:
- a selective harmonic current mitigation pulse width modulation (SHCM-PWM) unit coupled to an input current and providing an output signal $SW_{SHCM}$;
- a phase shift pulse width modulation (PSPWM) unit coupled to the input current and providing an output signal $SW_{PS}$;
- a modulation selector coupled to the output signal $SW_{SHCM}$ of the SHCM-PWM unit and the output signal $SW_{PS}$ of the PSPWM unit and providing an output signal SW, wherein the input current includes an active current reference $\Delta I^*_{in-d}$ and a reactive current reference $\Delta I^*_{in-q}$, and wherein the modulation selector selects one of the output signal $SW_{SHCM}$ and the output signal $SW_{PS}$ based on the active current reference $\Delta I^*_{in-d}$ and the reactive current reference $\Delta I^*_{in-q}$; and
- a CHB converter coupled to the output signal SW of the modulation selector.

8. The hybrid CHB converter according to claim 7, wherein the modulation selector is connected to the input current.

9. The hybrid CHB converter according to claim 7, further comprising an indirect controller coupled to the input current and providing an output current $v_{ac\text{-}CHB2}$ to the SHCM-PWM unit and the PSPWM unit.

10. The hybrid CHB converter according to claim 9, further comprising a phase lock loop (PLL) coupled to the modulation selector and an output of the CHB converter.

11. The hybrid CHB converter according to claim 7, wherein the modulation selector selects the output signal $SW_{PS}$ in case the input current satisfies the following Formulas 3 and 4:

$$\Delta I^*_{in-q}>0 \ \& \ \omega t=k\pi, \text{ until } \omega t=(k+2)\pi, \quad \text{Formula 3}$$

$$\Delta I^*_{in-q}>0 \ \& \ \omega t=k\pi+\pi/2, \text{ until } \omega t=(k+2)\pi. \quad \text{Formula 4}$$

12. The hybrid CHB converter according to claim 11, the modulation selector selects the output signal $SW_{SHCM}$ in all cases where the input current does not satisfy both Formula 3 and Formula 4.

13. A hybrid Cascaded H-Bridge (CHB) converter, comprising:
- an asymmetric selective harmonic current mitigation pulse width modulation (ASHCM-PWM) unit coupled to an input current and providing an output signal $SW_{ASHCM}$;
- a phase shift pulse width modulation (PSPWM) unit coupled to the input current and providing an output signal $SW_{PS}$;
- a P-cell H-Bridge coupled to the output signal $SW_{ASHCM}$ of the ASHCM-PWM unit; and
- a N-cell H-Bridge coupled to the output signal $SW_{PS}$ of the PSPWM unit.

14. The hybrid CHB converter according to claim 13, further comprising an indirect controller coupled to the input current and providing an output current to the ASHCM-PWM unit and the PSPWM unit.

15. The hybrid CHB converter according to claim 14, wherein the input current includes an active current reference $\Delta I^*_{in-1-d}$ and a reactive current reference $\Delta I^*_{in-1-q}$, and the P-cell inputs the output signal $SW_{ASHCM}$ active current reference $\Delta I^*_{in-1-d}$ and the N-cell inputs the output signal $SW_{PS}$ based on the reactive current reference $\Delta I^*_{in-1-q}$.

16. The hybrid CHB converter according to claim 13, wherein the P-cell H-Bridge is coupled to the ASHCM-PWM unit under steady state condition and the N-cell H-Bridge is coupled to the PSPWM unit under dynamic condition.

17. The hybrid CHB converter according to claim 15, wherein the active current reference $\Delta I^*_{in-1-d}$ and the reactive current reference $\Delta I^*_{in-1-q}$ are limited to change once in each half period.

18. The hybrid CHB converter according to claim 14, wherein the P-cell H-Bridge and the N-cell H-Bridge are connected to a coupling inductance.

* * * * *